United States Patent [19]

Fujikawa et al.

[11] Patent Number: 4,483,476
[45] Date of Patent: Nov. 20, 1984

[54] MULTI-SHIFT VEHICLE-BODY ASSEMBLING APPARATUS

[75] Inventors: Tsuneo Fujikawa, Ebina; Haruyoshi Takagishi, Yamato, both of Japan

[73] Assignee: Nissan Motor Company, Limited, Yokohama, Japan

[21] Appl. No.: 582,879

[22] Filed: Feb. 28, 1984

Related U.S. Application Data

[63] Continuation of Ser. No. 316,835, Oct. 30, 1981, abandoned.

[30] Foreign Application Priority Data

Nov. 11, 1980 [JP] Japan .................. 55-158355

[51] Int. Cl.³ .................. B21P 21/00; B23K 37/02
[52] U.S. Cl. .................. 228/4.1; 228/47; 228/45; 219/80
[58] Field of Search .................. 29/429, 430, 469; 228/4.1, 5.1, 47, 45, 6 R; 219/80, 86.25, 87

[56] References Cited

U.S. PATENT DOCUMENTS 3,968,558  7/1976  Sekine et al. .................. 29/429
4,267,424  5/1981  Shimatake et al. .................. 228/45
4,392,601  7/1983  Fujikawa et al. .................. 228/4.1

FOREIGN PATENT DOCUMENTS 1564669  4/1980  United Kingdom .

OTHER PUBLICATIONS

Journal "Automobil-Industrie", 4/18, pp. 55-61, particularly p. 61, left hand column, 2d section (translation of pertinent portion included).

Primary Examiner—Kenneth J. Ramsey
Attorney, Agent, or Firm—Lane, Aitken and Kananen

[57] ABSTRACT

A multi-shift vehicle-body assembling apparatus wherein a side body structure to be assembled to a floor structure to form part of a vehicle body is moved into a position ready to be assembled to the floor structure by means of a fixture assembly carried on a jig carrier structure rotatably mounted on a movable platform which is horizontally movable into and out of a predetermined position with respect to the floor structure or on a supporting base structure which is rockable between two angular position about a fixed axis.

4 Claims, 28 Drawing Figures

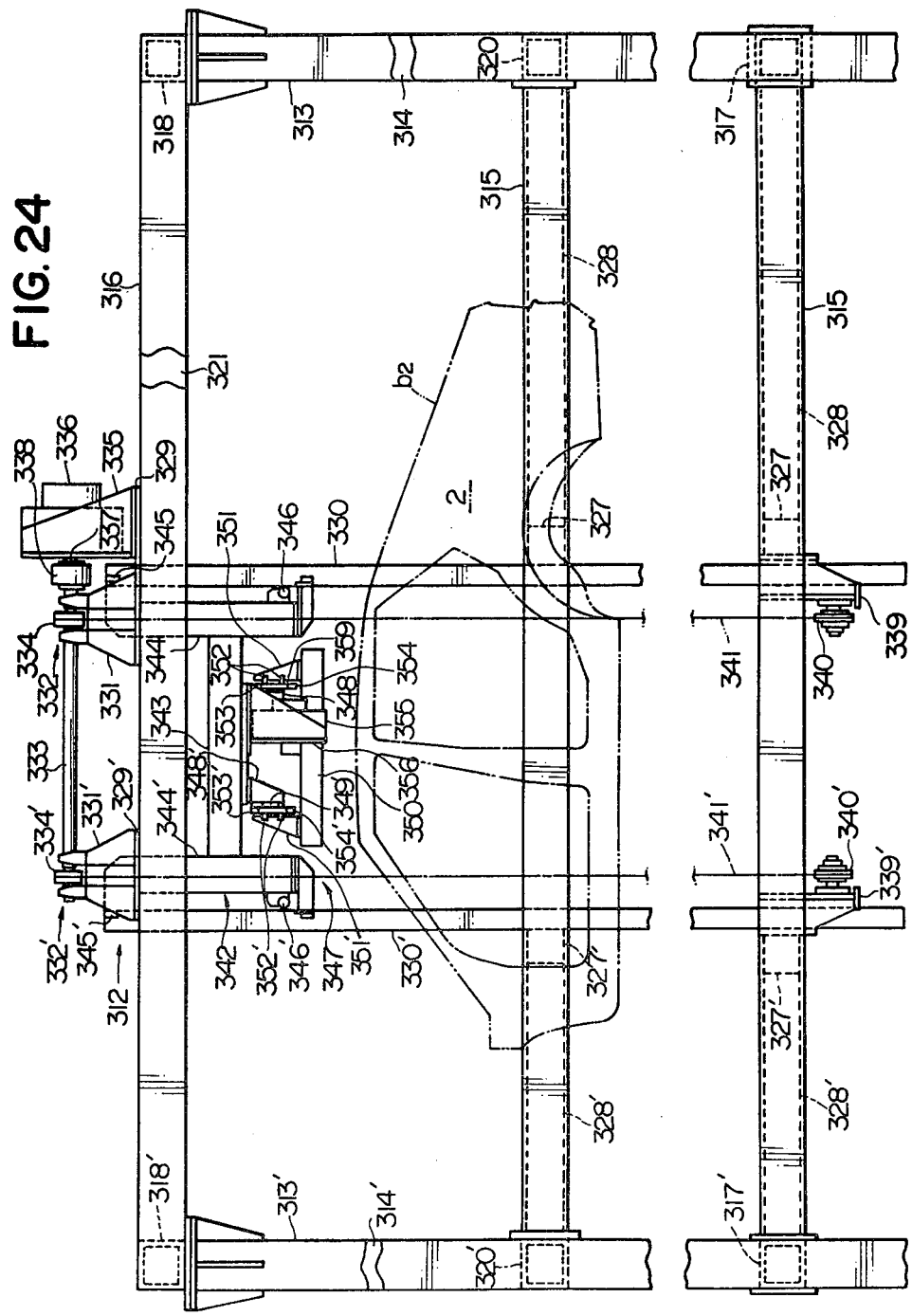

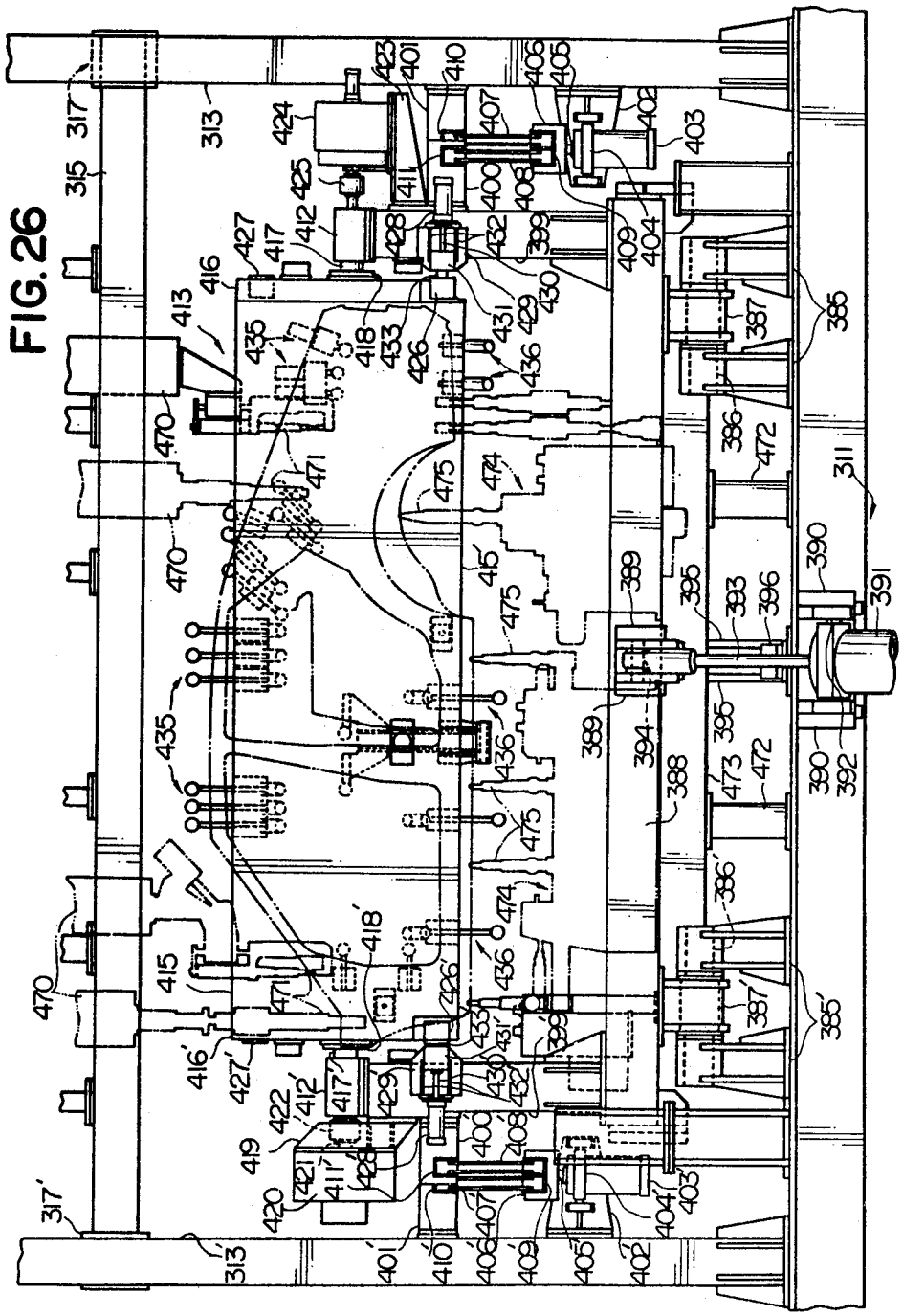

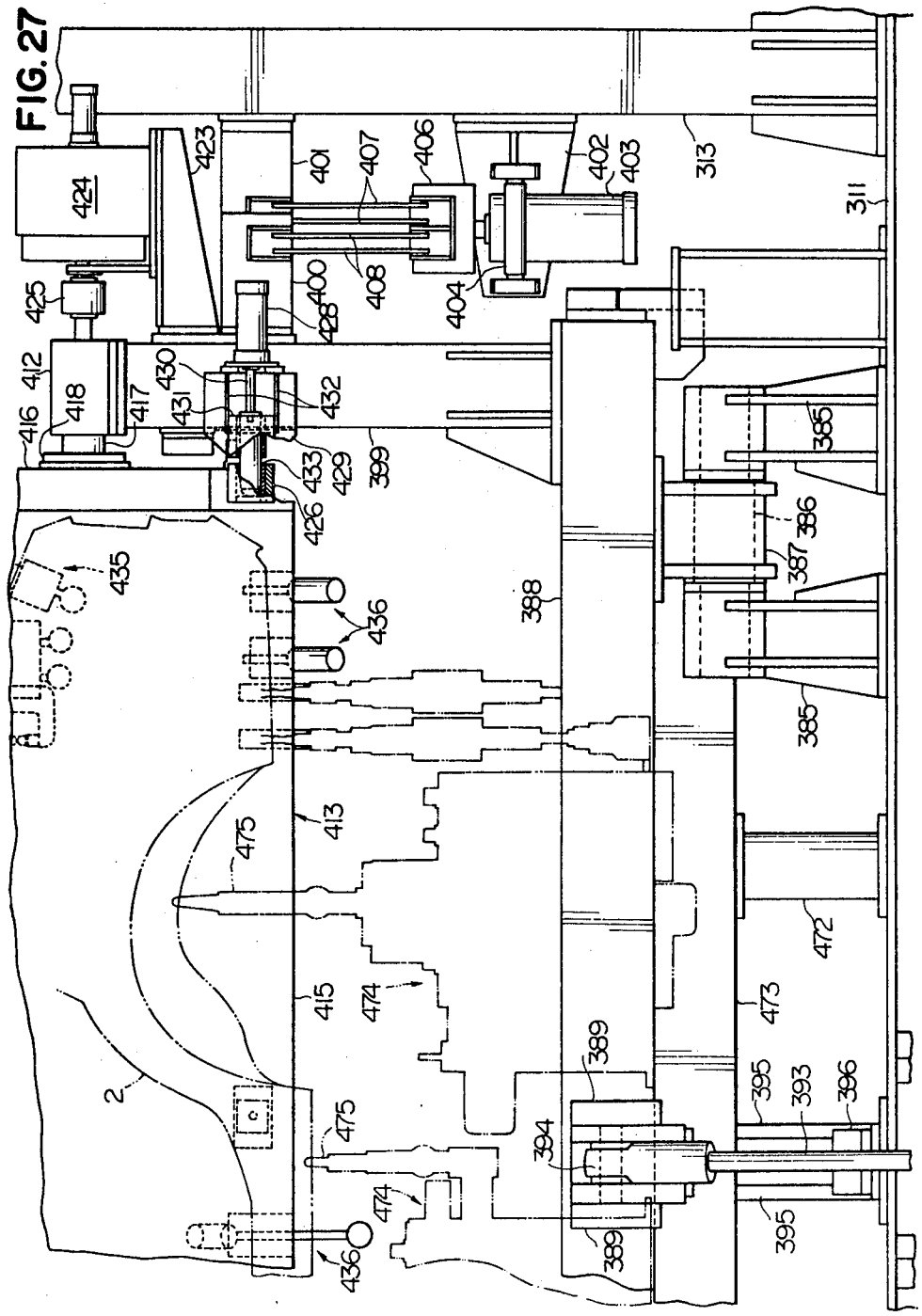

MULTI-SHIFT VEHICLE-BODY ASSEMBLING APPARATUS

This application is a continuation of application Ser. No. 316,835, filed 10/30/81, abandoned.

FIELD OF THE INVENTION

The present invention relates in general to an automatic vehicle-body assembling apparatus for automatically assembling a body structure of an automotive vehicle and, particularly, for automatically assembling side body structures to a floor structure to form part of a vehicle body structure. More particularly, the present invention is concerned with a multi-shift vehicle-body assembling apparatus adapted to assemble side body structures to floor structures to construct body structures for automotive vehicle of different models and/or types.

BACKGROUND OF THE INVENTION

A wide range of selection is open to the users of automotive vehicles among the models and types of the vehicles brought to market by an automotive manufacturer. Automotive manufacturers are therefore compelled to provide various assembly lines competent for the different models and types of vehicles to be manufactured. An attempt is however being made to provide an assembly line capable of handling two or more models and types of vehicles. An object of the present invention is to provide a multi-shift automatic vehicle-body assembling apparatus adapted to realize such an attempt.

SUMMARY OF THE INVENTION

In accordance with the present invention, the above mentioned object is accomplished by an automatic vehicle-body assembling apparatus for assembling a side body structure to a floor structure to form part of a body structure of an automotive vehicle, comprising a frame structure, floor-structure carrier means for conveying the floor structure into a first predetermined position within the frame structure, floor-structure positioning means for moving the floor structure from the first predetermined position to a second predetermined position within the frame structure, side-body transfer means for conveying the side body structure to a predetermined position within the frame structure, side-body positioning means comprising a carrier structure movable with respect to the frame structure and a plurality of fixtures carried on the carrier structure and operative to receive from the side-body transfer means the side body structure conveyed into the predetermined position thereof, the carrier structure being movable into and out of a predetermined position close to the floor structure in said second predetermined position thereof and having the side body structure held in a position ready to be assembled to the floor structure in the second predetermined position thereof, and fastening means operative to fasten the side body structure to the floor structure in the second predetermined position thereof after the side body structure is held in the position ready to be assembled to the floor structure.

BRIEF DESCRIPTION OF THE DRAWINGS

The features and advantages of an automatic vehicle-body assembling apparatus according to the present invention will be more clearly appreciated from the following description taken in conjunction with the accompanying drawings, in which:

FIG. 24 is a side end view of the side-body transfer means illustrated in FIG. 23;

FIG. 26 is a side elevation view showing side-body positioning means also forming part of the second embodiment of the apparatus according to the present invention;

FIG. 27 is a fragmentary side elevation view showing, to an enlarged scale, part of the side-body positioning means illustrated in FIG. 26.

DESCRIPTION OF THE EMBODIMENTS

Figure 1:
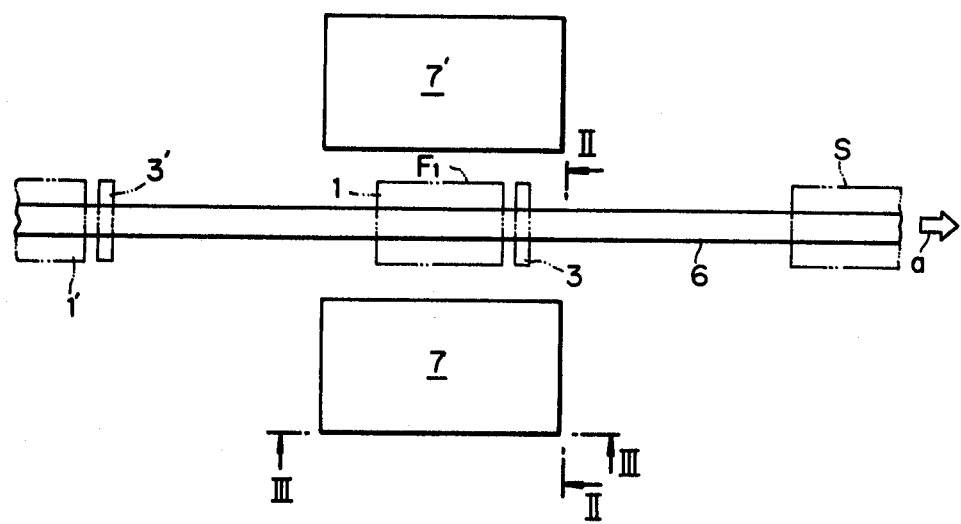
FIG. 1 is a schematic plan view showing an assembling station in conjunction with which a first embodiment of an apparatus according to the present invention is arranged.

Description will be hereinafter made with reference to the drawings in connection with the preferred embodiments of a multi-shift automatic assembling apparatus according to the present invention. Each of the embodiments herein shown is suitable as a four-shift automatic assembling apparatus to be used for the selective assembling of the body structure of any of automotive vehicles of two models each having two variants. For the purpose of description, these two models are herein referred to as models "A" and "B" and the two variants of each of the models "A" and "B" are assumed to be a sedan type and a hardtop by way of example. Thus, the embodiment of the present invention to be described hereinafter is adapted to automatically assemble the body structure of an automotive vehicle of the model "A" of the sedan type, the model "A" of the hardtop, the model "B" of the sedan type or the model "B" of the hardtop type during each of the operating cycles of the apparatus.

Furtheremore, the vehicle body structure to be assembled by the use of the embodiment herein illustrated is assumed, by way of example, as including a floor structure 1 (FIGS. 1, 2, 12 and 19), a pair of side body structures 2 and 2' (FIGS. 2 to 7, 10, 12 and 19) to be secured to the side ends of the floor structure 1, a rear upper panel 3 (FIGS. 1 and 13) to be secured to the rear end of the floor structure 1 and rear fender portions of the side body structures 2 and 2', a cowl assembly 4 (FIGS. 3 and 15) to be secured to lower dash members forming part of the floor structure 1, and a rear waist panel structure 5 (FIGS. 3 and 18) to be secured to a rear end portion of the floor structure 1.

As will be seen from FIG. 1, the floor structure 1 is conveyed forwardly to a first predetermined position $F_1$ by an elongated shuttle bar 6 adapted to move back and forth with the floor structure 1 carried thereon. The shuttle bar 6 extends longitudinally through an assembling station comprising a pair of side-body assembling stages 7 and 7' in which the side body structures 2 and 2' (FIGS. 2 to 7), respectively, are to be assembled to the floor structure 1. Though not shown in the drawings, the shuttle bar 6 has support fingers to have the floor structure 1 detachably carried thereon and is connected to suitable drive means operative to drive the bar 6 to move back and forth during each cycle of operation of the apparatus. Thus, the shuttle bar 6 constitutes carrier means for carrying the floor structure 1 into the first predetermined position $F_1$ between the side-body assembling stages 7 and 7' and holding the floor structure 1 in the particular position $F_1$ for a predetermined period of time during each cycle of operation of the apparatus.

The assembling station is skeletonized by a frame structure having longitudinal measurements in directions parallel with the directions of movement of the shuttle bar 6 and lateral measurements transverse to the directions of movement of the shuttle bar 6. The frame structure is generally symmetrical in configuration with respect to a vertical plane passing through the widthwise center line of the shuttle bar 6 and, for this reason, only the component members constituting a lateral half portion of the structure are illustrated in the drawings.

As will be seen from FIGS. 2 to 5, the frame structure is erected on a horizontal floor surface 8 and comprises a pair of upright front main columns 9 located at the front end of the frame structure, a pair of upright rear main columns 9' located at the rear end of the frame structure, a pair of upright front auxiliary columns 10 located between the front main columns 9, and a pair of upright rear auxiliary columns 10' located between the rear main columns 9'. The front main columns 9 are located respectively at the front corners of the frame structure and are spaced apart in parallel from each other on both sides of the shuttle bar 6. Likewise, the rear main columns 9' are located respectively at the rear corners of the frame structure and are spaced apart in parallel from each other on both sides of the shuttle bar 6. The front auxiliary columns 10 are also spaced apart in parallel from each other on both sides of the shuttle bar 6 and inwardly from respective lower portions of the front main columns 9. Likewise, the rear auxiliary columns 10' are spaced apart in parallel from each other on both sides of the shuttle bar 6 and inwardly from respective lower portions of the rear main columns 9'. The main columns 9 and 9' upwardly terminate at the upper end of the frame structure while the auxiliary columns 10 and 10' upwardly terminate halfway of the frame structure as will be best seen from FIG. 2.

Figure 2:
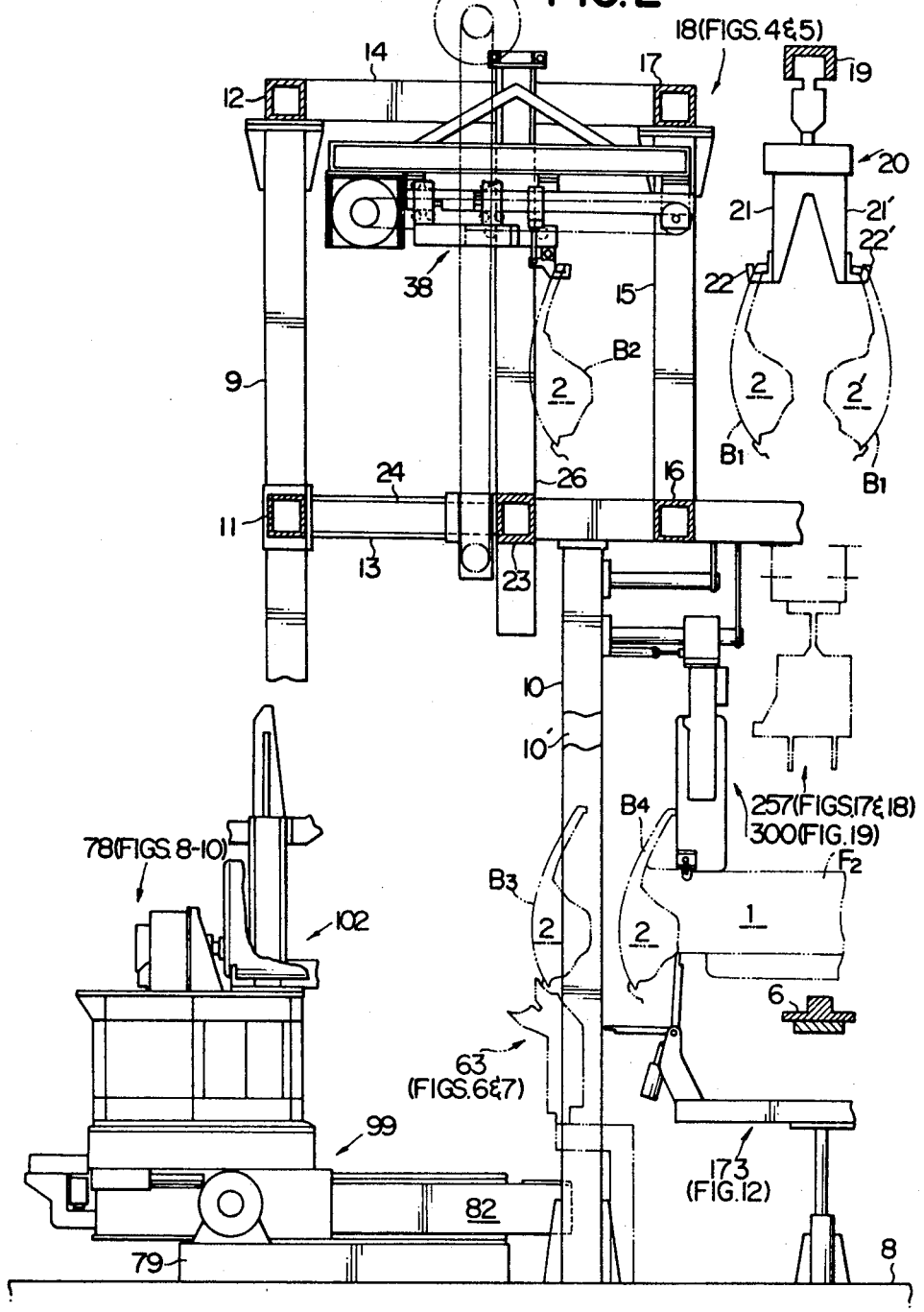
FIG. 2 is a front elevation view of the first embodiment of the apparatus according to the present invention with some members and structures partially shown or omitted from illustration, the apparatus being viewed in a direction indicated by arrows II—II in FIG. 1.

The frame structure further comprises a pair of horizontal lower side beams 11, a pair of horizontal upper side beams 12, a horizontal lower front beam 13, a horizontal lower rear beam 13', a horizontal upper front beam 14, and a horizontal upper rear beam 14'. As will be best seen from FIG. 3, each of the lower side beams 11 spans between the two front and rear main columns 9 and 9' on each side of the frame structure and is securely connected at one longitudinal end thereof to one of the two main columns 9 and 9' and at the other longitudinal end thereof to the other of the two columns 9 and 9'. Each of the upper side beams 12 also spans between the two front and rear main columns 9 and 9' on each side of the frame structure and is securely connected at the opposite longitudinal ends thereof to the upper ends of the two main columns 9 and 9'. On the other hand, the lower front beam 13 spans between the two front main columns 9 and is securely connected at one longitudinal end thereof to one of the front main columns 9 and at the other longitudinal end thereof to the other of the columns 9 as will be seen from FIGS. 2 and 4. Likewise, the lower rear beam 13' spans between the two rear main columns 9' and is securely connected at one longitudinal end thereof to one of the rear main columns 9' and at the other longitudinal end thereof to the other of the columns 9' as will be gathered from FIG. 3. The front auxiliary columns 10 are securely connected at the upper ends thereof to the lower front beam 13 as shown in FIGS. 2 and 4 and, likewise, the rear auxiliary columns 10 are securely connected at the upper ends thereof to the lower rear beam 13' though not seen in the drawings. Furthermore, the upper front beam 14 spans between the upper side beams 12 and is securely connected at the opposite longitudinal ends thereof to the respective front end portions of the upper side beams 12. Similarly, the upper rear beam 14' also spans between the upper side beams 12 and is securely connected at the opposite longitudinal ends thereof to the respective rear end portions of the upper side beams 12.

As will be seen from FIGS. 2 and 4, the frame structure further comprises a pair of vertical front posts 15 upstanding from the lower front beam 13, a pair of vertical rear posts (not seen in the drawings) upstanding from the lower rear beam 13', a pair of horizontal lower inner beams 16 each spanning between the lower front and rear beams 13 and 13', and a pair of horizontal upper inner beams 17 each spanning between the upper front and rear beams 14 and 14'. The front posts 15 are spaced apart in parallel from each other and inwardly from respective upper portions of the front main columns 9. Though not shown, the rear posts upstanding from the lower rear beam 13' are also spaced apart in parallel from each other and inwardly from respective upper portions of the rear main columns 9' laterally of the frame structure. The lower and upper inner beams 16 and 17 are aligned with these front and rear posts as will be understood from FIGS. 2 and 4.

Figure 3:
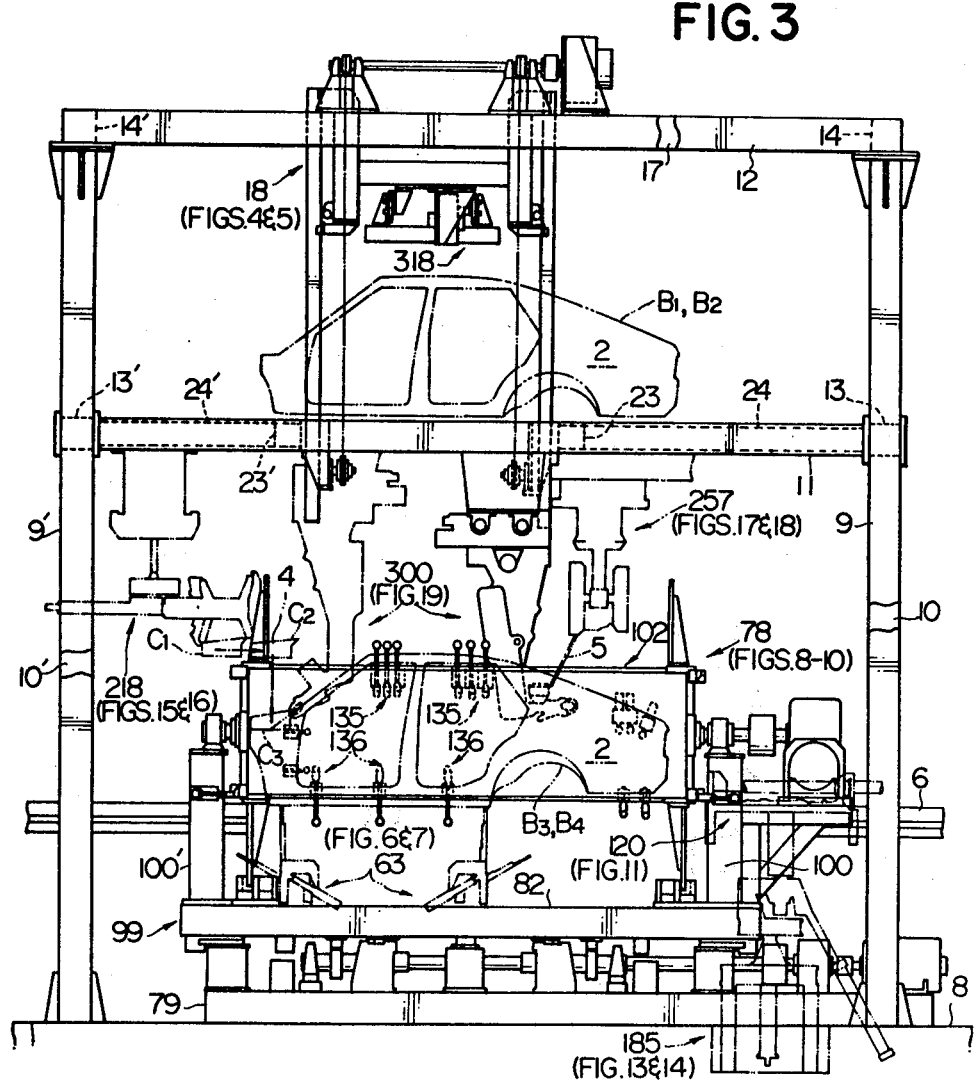
FIG. 3 is a side elevation view of the first embodiment of the apparatus according to the present invention also with some members and structures partially shown or omitted from illustration, the apparatus being viewed in a direction indicated by arrows III—III in FIG. 1.
Figure 4:
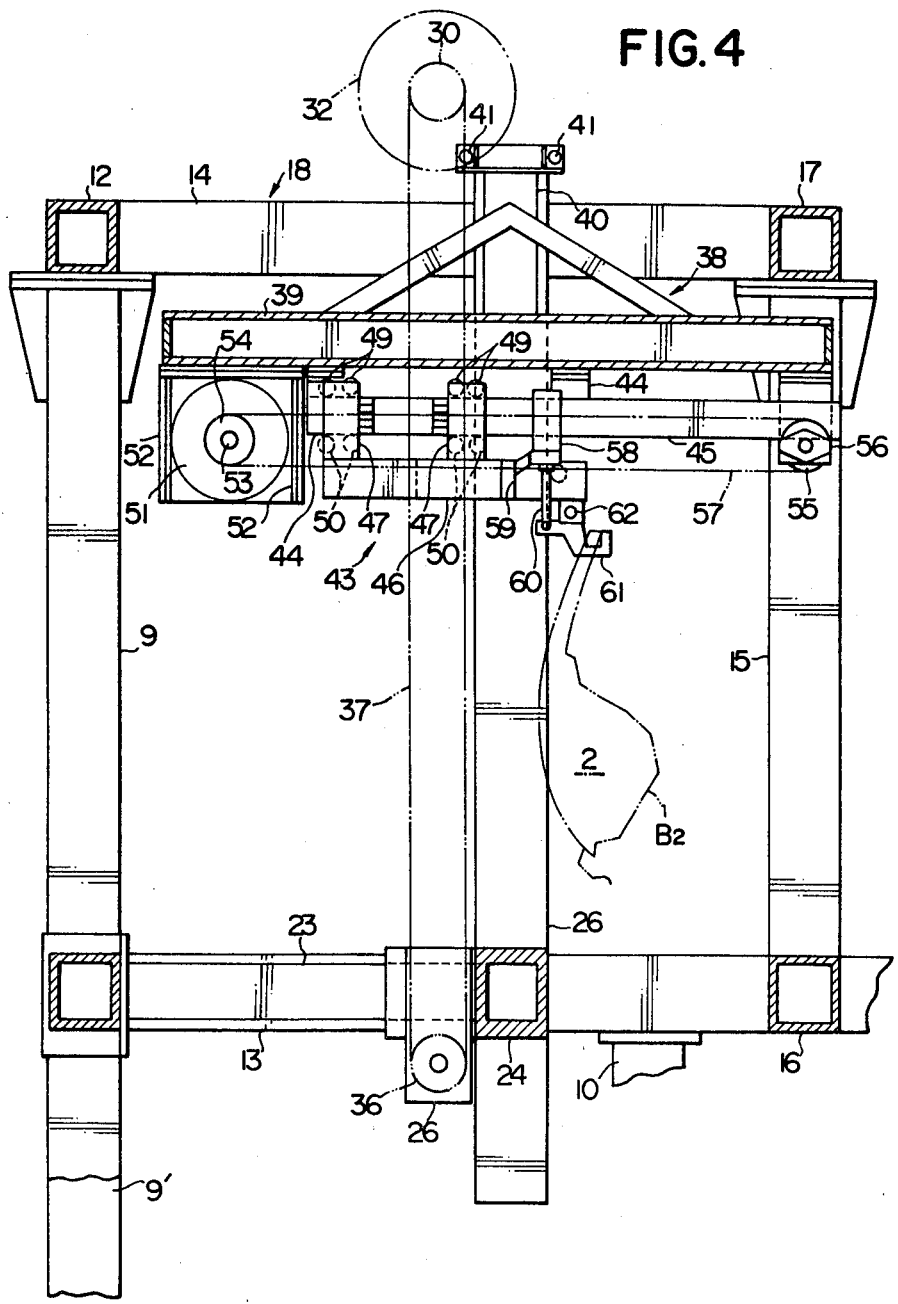
FIG. 4 is a front end view showing side-body transfer means forming part of the embodiment illustrated in FIGS. 2 and 3.

The shuttle bar 6 longitudinally extends through a gateway formed between the rear auxiliary columns 10' and a gateway formed between the front auxiliary columns 10 and is positioned at a predetermined level above the horizontal floor surface 8 as will be seen from FIGS. 2 and 3. Thus, the previously mentioned predetermined position $F_1$ into which the floor structure 1 is to be conveyed by the shuttle bar 6 underlies the space between the upper inner beams 17 of the frame structure.

The apparatus embodying the present invention further comprises side-body transfer means 18 for conveying each of the side body structures 2 of a vehicle body into a predetermined position with respect to the floor structure 1 moved into a second predetermined position $F_2$ (FIG. 2) from the previously mentioned first predetermined position $F_1$ thereof as will be described.

As illustrated in FIG. 2, the side-body transfer means 18 comprises an elongated guide rail 19 longitudinally extending above and in parallel with the shuttle bar 6, and a hanger assembly 20 suspended from and movable along the guide rail 19. The hanger assembly 20 comprises a pair of hanger arms 21 and 21' which form part of the previously mentioned side-body assembling stages 7 and 7', respectively. The hanger arms 21 and 21' have hook members 22 and 22', respectively, which are adapted to have the side body structures 2 and 2' detachably suspended therefrom as shown in FIG. 2.

Figure 5:
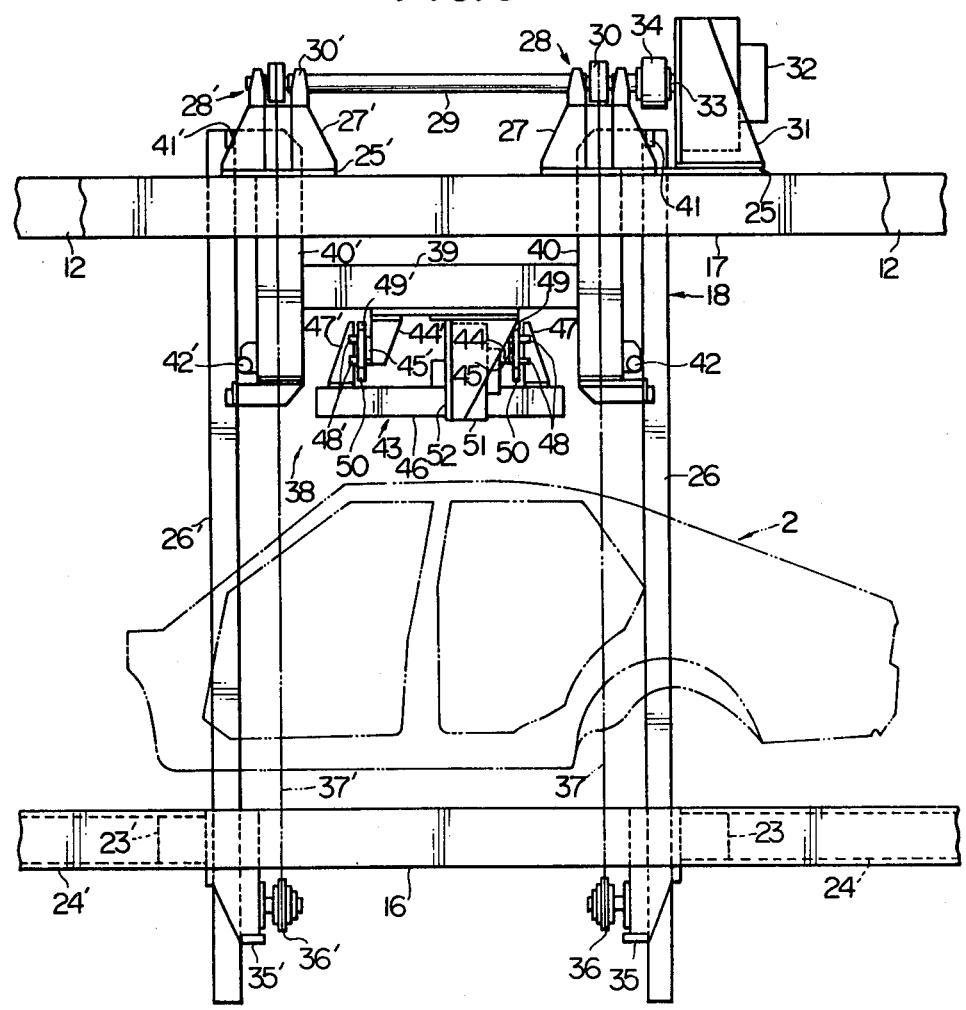
FIG. 5 is a side end view of the side-body transfer means illustrated in FIG. 4.

As will be seen from FIGS. 4 and 5, the side-body transfer means 18 further comprises, in the side-body assembling stage 7, a pair of lateral cantilevers 23 and 23' perpendicularly projecting inwardly from one of the lower side beams 11 toward the adjacent one of the lower inner beams 16, and a pair of longitudinal cantilevers 24 and 24' perpendicularly projecting inwardly from the lower front and rear beams 13 and 13', respectively. Each of the lateral cantilevers 23 and 23' and each of the longitudinal cantilevers 24 and 24' have respective leading end portions securely conjoined together. A pair of horizontal support beams 25 and 25' span between one of the upper side beams 12 and the adjacent one of the upper inner beams 17, overlying the above mentioned lateral cantilevers 23 and 23', respectively. The support beams 25 and 25' are thus spaced apart in parallel from each other a distance equal to the predetermined distance between the lateral cantilevers 23 and 23'. A pair of vertical guide posts 26 and 26' are securely connected each at the lower faces of the support beams 25 and 25', respectively, and downwardly extend respectively toward the combination of the cantilevers 23 and 24 and the combination of the cantilevers 23' and 24'. One guide post 26 has a lower end portion securely connected to the conjoined end portions of the cantilevers 23 and 24 and, likewise, the other guide post 26 has a lower end portion securely connected to the conjoined end portions of the cantilevers 23' and 24'. The respective lower end portions of the guide posts 26 and 26' slightly project downwardly from the conjoined end portions of the cantilevers 23 and 24 and the conjoined end portions of the cantilevers 23' and 24' as will be seen from FIGS. 2 to 5. Though not shown in the drawings, structural members respectively similar to the above described cantilevers 23, 23', 24 and 24', support beams 25 and 25' and guide posts 26 and 26' are provided in the other side-body assembling stage 7'.

For brevity of description, only those members, units and structures which form part of the side-body transfer means 18 in the side-body assembling stage 7 will be hereinafter described since the arrangements of the side-body transfer means 18 in the other side-body assembling stage 7' are symmetrical versions of such members, units and structures.

As will be best seen from FIG. 5, the side-body transfer means 18 in the assembling stage 7 further comprises a pair of bracket members 27 and 27' securely mounted on the support beams 25 and 25', respectively. The bracket members 27 and 27' have supported thereon bearing units 28 and 28', respectively, in which a shaft 29 is journaled adjacent the opposite axial ends thereof. The shaft 29 extends in a direction parallel with the upper side and inner beams 12 and 17 and has a pair of sprocket wheels 30 and 30' securely mounted on opposite end portions thereof and arranged to have respective axes of rotation aligned with the center axis of the shaft 29. The support beam 25 has further mounted thereon a bracket member 31 on which an air motor 32 is mounted. The air motor 32 has an output shaft 33 connected to the above mentioned shaft 29 by a coupling 34 so that the shaft 33 is driven for rotation about the center axis thereof when the air motor 32 is in operation. The above mentioned guide posts 26 and 26' have bracket members 35 and 35', respectively, securely mounted on the lower end portions thereof. Sprocket wheels 36 and 36' are mounted on these bracket members 35 and 35', respectively. An endless chain 37 is passed between the upper and lower sprocket wheels 30 and 36 and, likewise, an endless chain 37' is passed between the upper and lower sprocket wheels 30' and 36'. The endless chains 37 and 37' are thus vertically movable back and forth along the guide posts 26 and 26', respectively, and are driven to travel respectively between the sprocket wheels 30 and 36 and between the two sprocket wheels 30' and 36' when the air motor 32 is in operation.

The sprocket wheels 30 and 30', shaft 29, air motor 32, sprocket wheels 36 and 36' and endless chains 37 and 37' constitute in combination drive means for driving a hoist assembly 38 which forms part of the side-body assembling means 18. In FIGS. 2 to 5, the hoist assembly 38 is shown comprising a horizontal support block 39 having front and rear end faces respectively secured to vertical guide frames 40 and 40' spaced apart from each other in parallel with the upper inner beam 17. The guide frame 40 has carried thereon guide rollers 41 rollable on the opposite side faces of the guide post 26 and guide rollers 42 rollable on the rear face of the guide post 26. The other guide frame 40' also has carried thereon guide rollers 41' rollable on the opposite side faces of the guide post 26' and guide rollers 42' rollable on the front face of the guide post 26'. The endless chains 37 and 37' are connected each at one point thereof to the guide frames 40 and 40', respectively, by suitable anchor means (not shown) so that the hoist assembly 38 as a whole is movable upwardly or downwardly with respect to the stationary guide posts 26 and 26' when the air motor 32 is in operation driving the endless chains 37 and 37' to travel along the guide posts 26 and 26', respectively.

The hoist assembly 38 further comprises carrier means 43 for moving the side body structure 2 of a vehicle body in a lateral direction of the frame structure. The carrier means 43 comprises a pair of bracket members 44 depending from the lower face of the support block 39 and spaced apart in parallel from each other in a lateral direction of the frame structure, and a pair of bracket members 44' depending from the lower face of the support block 39 and rearwardly spaced apart from the bracket members 44, respectively. The bracket members 44 have securely attached thereto a lateral guide rail 45 and, likewise, the bracket members 44' have securely attached thereto a lateral guide rail 45'. The guide rails 45 and 45' extend in lateral directions of the frame structure and are spaced apart in parallel from each other between the guide frames 40 and 40', as will be best seen from FIG. 5. A carrier block 46 is horizontally positioned below these guide rails 45 and 45' and has secured thereto a pair of bracket members 47 upstanding from the carried block 46 and spaced apart in parallel from each other in a lateral direction of the frame structure and a pair of bracket members 47' upstanding from the upper face of the carrier block 46 and rearwardly spaced apart from the bracket members 44, respectively. The bracket members 47 are engaged by the guide rail 45 by means of guide rollers carried on the bracket members 47 and consisting of guide rollers 48 rollable on the front face of the guide rail 45, guide rollers 49 rollable on the upper face of the guide rail 45 and guide rollers 50 rollable on the lower face of the lower face of the guide rail 45. Likewise, the bracket members 47' are engaged by the guide rail 45' by means of guide rollers which are carried on the bracket members 47' and which consist of guide rollers 48' rollable on the rear face of the guide rail 45', guide rollers 49' rollable on the upper face of the guide rail 45' and guide rollers 50' rollable on the lower face of the guide rail 45'. To a laterally outer end portion of the lower face of the support block 39 is secured an air motor 51 by bracket members 52. The air motor 51 has an output shaft 53 on which a sprocket wheel 54 is coaxially mounted. The sprocket wheel 54 is provided in association with a sprocket wheel 55 rotatably mounted on a bracket member 56 secured to a laterally inner end portion of the lower face of the support block 39. The sprocket wheels 54 and 55 are aligned with each other in a lateral direction of the frame structure and have passed therebetween an endless chain 57 which is thus horizontally movable back and forth in lateral directions of the frame structure between the two sprocket wheels 54 and 55 as will be best seen from FIG. 4. The endless chain 57 is connected at one point thereof to the carrier block 46 by suitable anchor means (not shown) so that the carrier block 46 is driven for movement between the sprocket wheels 54 and 55 when the air motor 51 is in operation driving the endless chain 57 to travel back and forth between the sprocket wheels 54 and 55.

As shown in FIG. 4, the carrier means 45 further comprises a fluid-operated power cylinder 58 having a cylinder body supported on the carrier block 46 by a bracket member 59 secured to the carrier block 46 and pivotally connected to the cylinder body by a pivot pin (not shown). The power cylinder 58 has a piston rod 60 directed downwardly and pivotally connected adjacent the lower end thereof to a hanger 61 which is rotatably attached to the carrier block 46 by a pin 62. The hanger 61 has a hook portion adapted to have the side body structure 2 of a vehicle body suspended therefrom as indicated by phantom lines in FIG. 4. The hanger 61 is thus adapted to be driven by the power cylinder 58 to turn about the pin 62 between an upwardly raised operative position to have a side body structure 2 suspended from the hook portion thereof as shown in FIG. 4 and a downwardly inclined inoperative angular position to allow the side body structure 2 to be disengaged from the hook portion thereof.

The side-body transfer means 18 is thus adapted to convey a side body structure 2 into a first predetermined position $B_1$ above the shuttle bar 6 by the hanger 20 as shown in FIGS. 2 and 3 and thereafter by the hoist assembly 38 into a second predetermined position $B_2$ outwardly displaced from the position $B_1$ laterally of the frame structure, a third predetermined position $B_3$ below the second predetermined position $B_2$ and a fourth predetermined position $B_4$ which is displaced inwardly from the third predetermined position $B_3$ laterally of the frame structure and which is ready to be assembled to the floor structure 1 moved from the first predetermined position $F_1$ to the second predetermined position $F_2$ thereof.

As shown schematically in FIGS. 2 and 3, the apparatus embodying the present invention further comprises a plurality of side-body position correcting means 63 for correcting the position of the side body structure 2 conveyed into the third predetermined position $B_3$ as above noted. As will be seen from FIG. 3, such position correcting means 63 are arranged on the floor surface 8 in a longitudinal direction of the frame structure between one of the front auxiliary columns 10 and one of the rear auxiliary columns 10' as will be seen from FIG. 2. As illustrated in more detail in FIGS. 6 and 7, each of the side-body position correcting means 63 comprises a stationary bracket structure 64 secured to and upstanding from the floor surface 8 (FIGS. 2 and 3) and a rockable supporting block 65 pivotally connected to an upper end portion of the bracket structure 64 by a pivot pin 66. The bracket structure 64 has mounted thereon a first fluid-operated power cylinder 67 having a cylinder body pivotally connected to the bracket structure 64 by a pin 68. The power cylinder 67 further has a piston rod 69 pivotally connected at its leading end to the supporting block 65 by a pivot pin 70. The supporting block 65 has pivotally supported thereon a rockable shift member 71 by a pivot pin 72. The shift member 71 projects upwardly from the supporting block 65 and has securely attached thereto first and second stay members 73a and 73b which are angularly spaced apart from each other about the pin 72. The first and second stay members 73a and 73b have seat faces shaped to be capable of snugly receiving thereon lower end portions of side body structures 2 for automotive vehicles of the previously mentioned models "A" and "B", respectively. A second fluid operated power cylinder 74 has a cylinder body pivotally mounted on the supporting block 65 by a pivot pin 75. The power cylinder 74 further has a piston rod 76 pivotally connected at the leading end thereof to the shift member 71 by a pivot pin 77.

Figure 6:
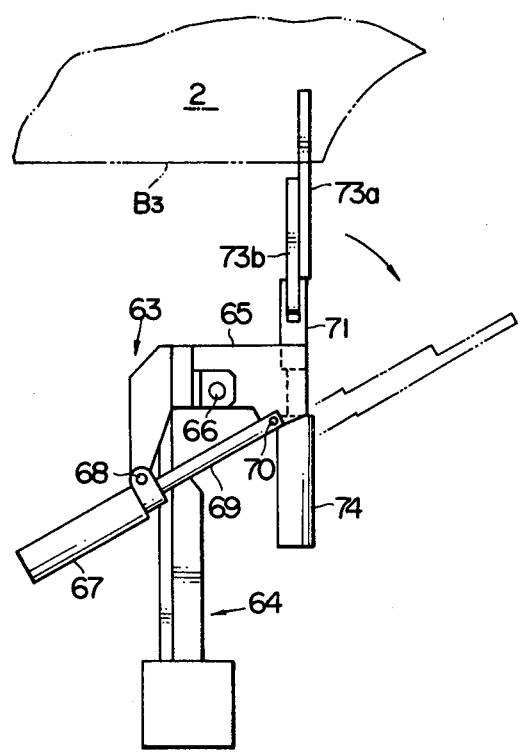
FIG. 6 is a front end view showing side-body position correcting means forming part of the embodiment illustrated in FIGS. 2 and 3.

The supporting block 65 is rockable with respect to the stationary bracket structure 64 about the pivot pin 66 between a first angular position having the shift member 71 held in an upright position as indicated by full lines in FIG. 6 and a second angular position inclined downwardly as partially indicated by dots-and-dash lines in FIG. 6. When the supporting block 65 is held in the first angular position thereof, the shift member 71 is rockable with respect to the supporting block 65 about the pivot pin 72 between a first angular position having the first stay member 73a held in a position operative to receive a lower end portion of a side body structure 2 (for a vehicle of the model "A") in the third predetermined position B₃ and a second angular position having the second stay member 73b held in a position operative to receive a lower end portion of a side body structure 2 (for a vehicle of the model "B") in the third predetermined position B₃.

As illustrated partially in FIGS. 2 and 3, the apparatus embodying the present invention further comprises side-body positioning means 78 for moving a side body structure 2 of a vehicle body from the third predetermined position B₃ into the fourth predetermined position B₄ indicated in FIG. 2. The side-body positioning means 78 is also symmetrical in construction and arrangement with respect to the vertical plane passing through the center line of the shuttle bar 6 and, for this reason, only those members, units and structures which form part of the side-body positioning means 78 in association with the side-body assembling stage 7 shown in FIG. 1 will be herein described.

Figure 8:
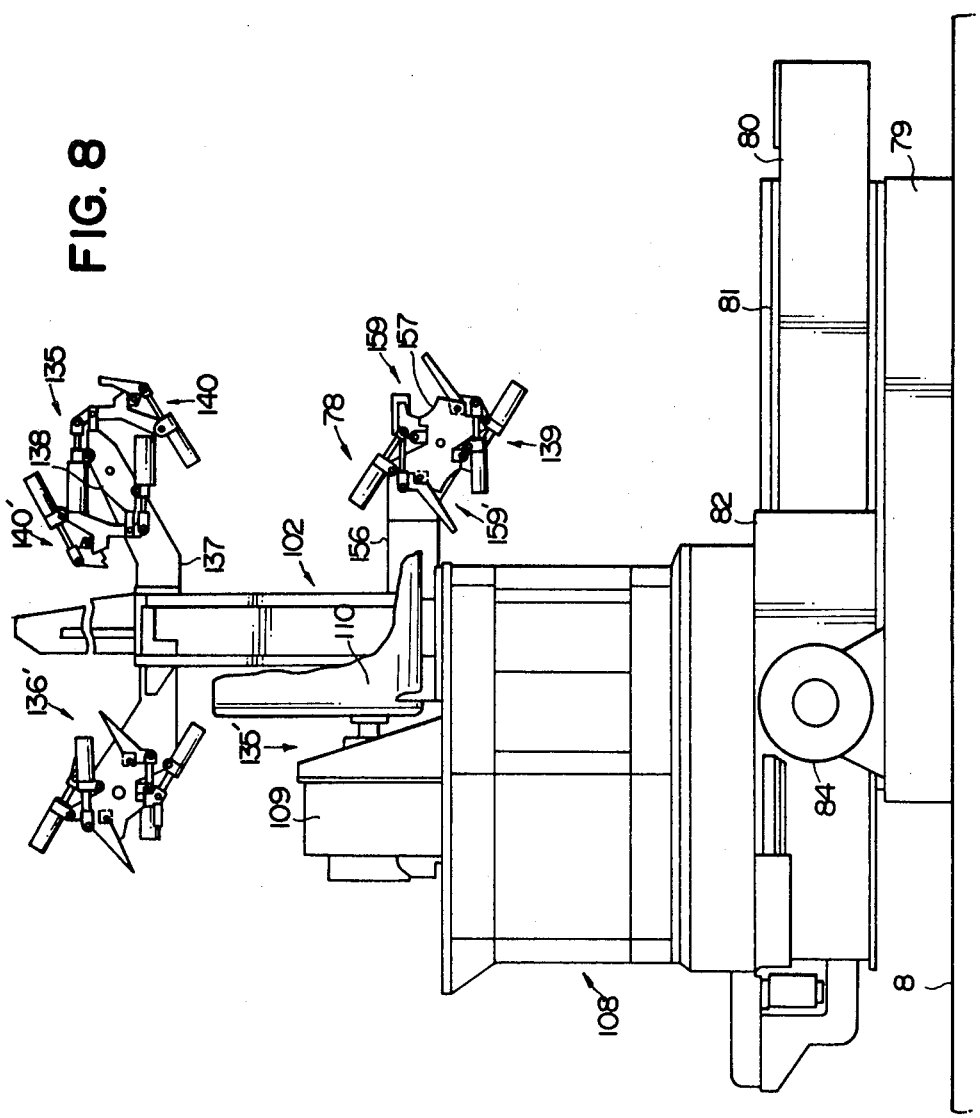
FIG. 8 is a front elevation view showing side-body positioning means forming part of the embodiment illustrated in FIGS. 2 and 3.
Figure 9:
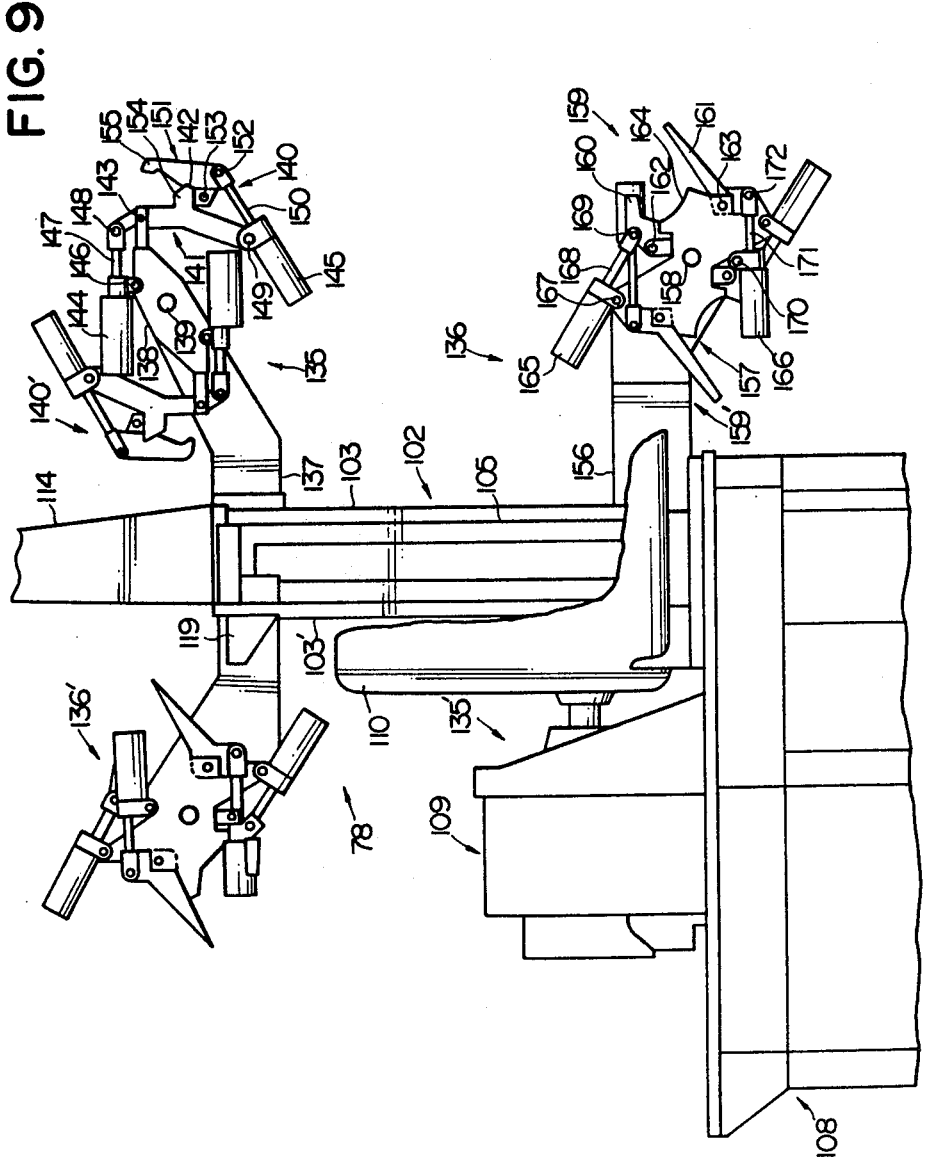
FIG. 9 is a fragmentary front elevation view showing, to an enlarged scale, the side-body positioning means illustrated in FIG. 8.
Figure 10:
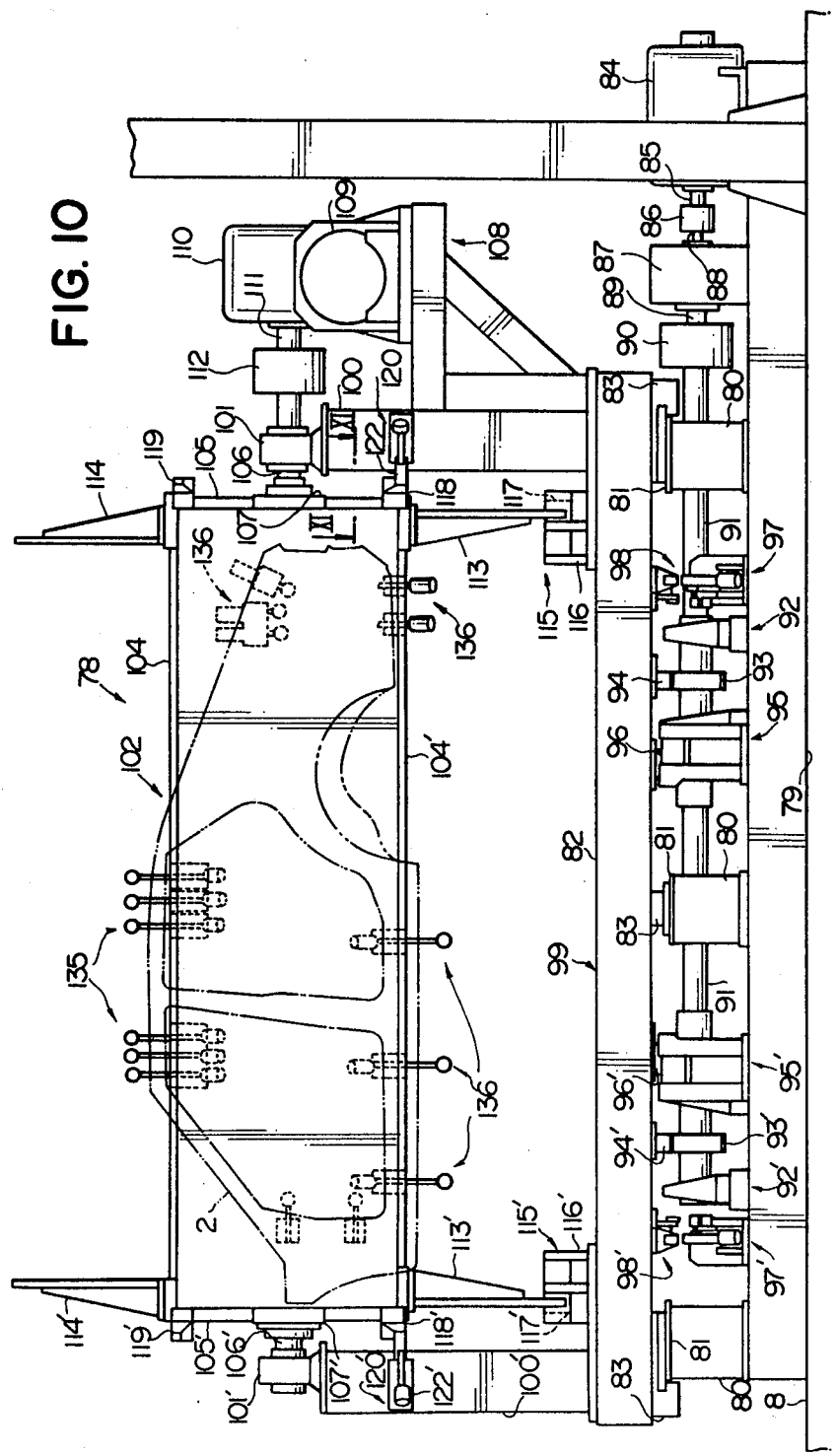
FIG. 10 is a side elevation view of the side-body positioning means illustrated in FIGS. 8 and 9.

As will be better seen from FIGS. 8, 9 and 10, the side-body positioning means 78 comprises a stationary platform structure 79 horizontally installed on the floor surface 8 and a plurality of elongated supporting beams 80 each extending in a lateral direction of the frame structure. As will be best seen from FIG. 10, the supporting beams 80 are herein assumed to be three in number and are spaced apart in parallel from each other in a longitudinal direction of the frame structure. Each of the supporting beams 80 has fixedly mounted on its upper face a guide plate 81 longitudinally extending in a lateral direction of the frame and having a smooth upper face. The guide plates 81 have supported thereon a movable platform 82 having slider blocks 83 slidably received on the upper faces of the guide plates 81 so that the movable platform 82 is movable on the guide plates 81 laterally of the frame structure between a predetermined outermost lateral position protruding laterally outwardly of the frame structure as will be seen from FIGS. 2 and 3 and a predetermined innermost lateral position closer to the shuttle bar 6 though not shown in the drawings.

As will be best seen from FIG. 10, the stationary platform 79 has mounted on its front end portion an electric motor 84 having an output shaft 85 rotatable about an axis in a longitudinal direction of the frame structure. The output shaft 85 of the motor 84 is operatively connected through a first coupling 86 to a reduction gear unit 87 also mounted on the platform 79. The reduction gear unit 87 has an input shaft 88 connected to the coupling 86 and an output shaft 89 connected through a second coupling 90 to a drive shaft 91. The drive shaft 91 is rotatably supported on bearing units 92 and 92' fixedly mounted on the platform 79. The drive shaft 91 longitudinally extends rearwardly from the reduction gear unit 87 through the rear two of the supporting beams 80 and terminates in front of the rearmost one of the supporting beams 80.

The drive shaft 91 has securely mounted thereon a pair of pinion gears 93 and 93' located adjacent the above mentioned bearing units 92 and 92', respectively. The pinion gears 93 and 93' are held in mesh with toothed rack members 94 and 94', respectively, which are securely attached to the lower face of the movable platform 82 and which extend in lateral directions of the frame structure. The movable platform 82 is thus movable laterally of the frame structure between the previously mentioned outermost and innermost lateral positions thereof with respect to the frame structure when the pinion gears 93 and 93' are driven to rotate with the drive shaft 91 and roll on the rack members 94 and 94', respectively. The motor 84, reduction gear unit 87, drive shaft 91, pinion gears 93 and 93' and rack members 94 and 94' constitute in combination drive means for driving the platform 82 to move as above described.

The side-body positioning means 78 further comprises a pair of shock absorbing units 95' mounted on the stationary platform 79 and a pair of strikers 96 and 96' secured to the lower face of the movable platform 82 and positioned in alignment with the shock absorbing units 95 and 95', respectively, in lateral directions of the frame structure. The strikers 96 and 96' are engageable with the shock absorbing units 95 and 95', respectively, when the movable platform 82 is held in each of the outermost and innermost lateral positions thereof so that the shocks produced by the movable platform 82 when the movable platform 82 is moved into the outermost or innermost lateral position thereof are dampened by the shock absorbing units 95 and 95'. Though not shown in the drawings, similar arrangements are provided so as to dampen the shocks to be produced by the movable platform 82 when the movable platform 82 is moved into the innermost lateral position thereof. When the movable platform 82 is thus moved into the innermost lateral position thereof, the platform 82 is locked in the particular position by suitable locking means which is shown in FIG. 10 as comprising a pair of locking devices 97 and 97' mounted on the stationary platform 79 and a pair of hook members 98 and 98' attached to the lower face of the movable platform 82 and engageable with the locking devices 97 and 97', respectively. When the movable platform 82 is moved into the innermost lateral position thereof, the locking devices 97 and 97' are thus brought into locking engagement with the hook members 98 and 98', respectively, and hold the movable platform 82 in the particular position thereof. The hook members 98 and 98' are disengaged from the locking devices 97 and 97', respectively, when the movable platform 82 is to be moved from the innermost lateral position back to the outermost lateral position thereof.

The movable platform 82 forms part of a movable side-body support structure 99 which further comprises a pair of upright support frames 100 and 100' upstanding from the platform 82 and positioned in the vicinity of the foremost and rearmost ends of the platform 82 as will be best seen from FIG. 10. The upright support frames 100 and 100' have supported thereon bearing units 101 and 101', respectively, which are axially aligned with each other in a longitudinal direction of the frame structure. A generally box-shaped rotary jig carrier structure 102 is composed of a pair of support plates 103 and 103' spaced apart in parallel from each other, a pair of side wall portions 104 and 104' each connecting the support plates 103 and 103' together along each side end of the carrier structure 102, and a pair of parallel end wall portions 105 and 105' each connecting the support plates 103 and 103' together along each longitudinal end of the carrier structure 102 as will be seen from FIGS. 8, 9 and 10. The rotary jig carrier structure 102 further has a pair of trunnions 106 and 106' perpendicularly projecting outwardly from the end wall portions 105 and 105', respectively, of the carrier structure 102 and having respective center axes aligned with each other. The trunnions 106 and 106' are journaled in the above mentioned bearing units 101 and 101', respectively, so that the jig carrier structure 102 as a whole is rotatable with respect to the side-body support structure 99 about an axis passing through the respective center axes of the trunnions 106 and 106'. The jig carrier structure 102 is symmetric in configuration with respect to the axis of rotation thereof. The trunnions 106 and 106' are secured each at one end thereof to the front and rear end wall portions 105 and 105' of the jig carrier structure 102 by couplings 107 and 107' fixedly attached to the end wall portions 105 and 105', respectively, as shown in FIG. 10.

The support frame 100 has secured thereto a bracket member 108 supporting thereon an air motor 109 having an output shaft (not shown) connected to the input shaft (not shown) of a reduction gear unit 110 which is also supported on the bracket member 108. The reduction gear unit 110 has an output shaft 111 connected to the trunnion 106 of the jig carrier structure 102 by a coupling 112. The air motor 109, reduction gear unit 110 and coupling 112 constitute in combination drive means operative to drive the jig carrier structure 102 for rotation about the axis of rotation thereof with respect to the side-body support structure 99.

The jig carrier structure 102 is rotatable about the axis of rotation thereof between a first upright position having one of the support plates 103 and 103' such as the support plate 103 facing laterally inwardly of the frame structure as shown in FIGS. 8 and 9 and a second upright position having the other of the support plates such as the support plate 103' facing laterally inwardly of the frame structure. The jig carrier structure 102 is selectively turned into each of these two upright positions and is prevented from being turned beyond each of the upright positions by suitable stop means. In the embodiment herein shown, the stop means is adapted to serve also as shock absorbing means operative to dampen the shocks produced when the jig carrier structure 102 is turned into each of the first and second upright positions thereof.

In FIG. 10, such stop means is shown comprising first and second front striker arms 113 and 114, first and second rear striker arms 113' and 114', and front and rear shock absorbing units 115 and 115'. The first and second front striker arms 113 and 114 perpendicularly project outwardly from the side wall portions 104 and 104', respectively, of the jig carrier structure 102 and are located adjacent the front end of the carrier structure 102. Likewise, the first and second rear striker arms 113' and 114' perpendicularly project outwardly from the side wall portions 104 and 104', respectively, of the jig carrier structure 102 and are located adjacent the rear end of the carrier structure 102. Thus, one of the front striker arms 113 and 114 and one of the rear striker arms 113' and 114' projects downwardly from the jig carrier structure 102 toward the upper face of the movable platform 99 and the other of the striker arms 113 and 114 and the other of the striker arms 113' and 114' projects upwardly from the jig carrier structure 102 when the jig carrier structure 102 is held in one of the two upright positions thereof. On the other hand, the front and rear shock absorbing units 115 and 115' include casings 116 and 116', respectively, which are fixedly positioned on the movable platform 99 and which are located below the front and rear ends, respectively, of the jig carrier structure 102. The casings 116 and 116' have securely held therein resilient blocks 117 and 117', respectively, of, for example, rubber. The resilient blocks 117 and 117' are located to receive thereon the lower ones of the front striker arms 113 and 114 and rear striker arms 113' and 114' when the jig carrier structure 102 is held in each of the first and second upright positions thereof. When the jig carrier structure 102 is turned into one of the two upright positions thereof about its axis of rotation, the downwardly directed ones of the front striker arms 113 and 114 and rear striker arms 113' and 114' are brought into abutting engagement with the resilient blocks 117 and 117' of the shock absorbing units 115 and 115', respectively.

Once the jig carrier structure 102 is thus turned into one of the two upright positions thereof, the carrier structure 102 is locked in the particular position by suitable locking means. In the embodiment herein shown, such locking means comprises first and second front locking blocks 118 and 119, first and second rear locking blocks 118' and 119', and front and rear locking devices 120 and 120' as schematically illustrated in FIG. 10. The first and second front locking blocks 118 and 119 are secured to the front end wall portion 105 of the jig carrier structure 102 and are respectively located adjacent the lateral ends of the carrier structure 102. Likewise, the first and second rear locking blocks 118' and 119' are secured to the rear end wall portion 105' of the jig carrier structure 102 and are respectively located adjacent the lateral ends of the carrier structure 102 and in alignment with the first and second front locking blocks 118 and 119, respectively, in longitudinal directions of the jig carrier structure 102. The locking devices 120 and 120' are respectively located in the neighborhood of the lower ones of the front locking blocks 118 and 119 and the rear locking blocks 118' and 119' when the jig carrier structure 102 is held in one of the above mentioned first and second upright positions thereof. The locking devices 120 and 120' are constructed similarly to each other and, for this reason, the details of the construction and arrangement of only the front locking device 120 are herein illustrated in FIG. 11 of the drawings.

Figure 11:
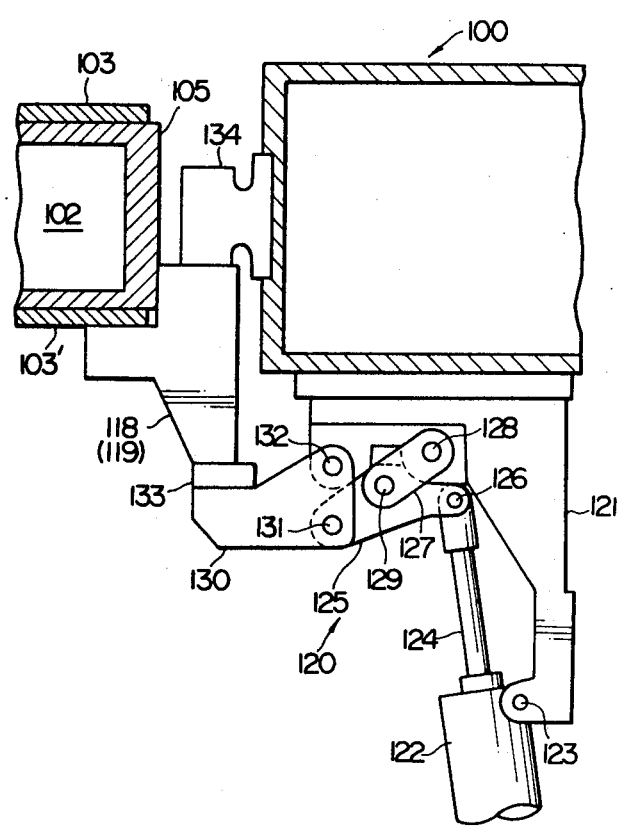
FIG. 11 is a top plan view showing, partially in horizontal section, a locking device included in the embodiment illustrated in FIGS. 2 and 3, the locking device being viewed from a plane indicated by line XI-XI in FIG. 10.

As shown in FIG. 11, the locking device 120 comprises a bracket member 121 securely attached to the outer side face of the support frame 100 upstanding from the movable platform 99 (FIG. 10) and a fluid-operated power cylinder 122 having a cylinder body pivotally connected to the bracket member 121 by a pivot pin 123. The power cylinder 122 has a piston rod 124 pivotally connected at its leading end to an end portion of a first link member 125 by a pivot pin 126. A second link member 127 has one end portion pivotally connected to an extension of the bracket member 121 by a pivot pin 128 and another end portion pivotally connected to an intermediate portion of the first link member 125 by a pivot pin 129. The first link member 125 has another end portion pivotally connected to a third link member 130 by a pivot pin 131. The third link member 130 in turn is pivotally connected to the above mentioned extension of the bracket member 121 by a pivot pin 132. As will be understood from the description to follow, the first and second link members 125 and 127 constitute in combination a toggle mechanism operative to boost the force applied to the first link member 125 from the piston rod 124 of the power cylinder 122. The third link member 130 has an arm portion directed toward the lower one of the front locking members such as the first front locking member 118 on the jig carrier structure 102 as shown.

The locking device 120 illustrated in FIG. 11 further comprises a pressing member 133 securely attached to the above mentioned arm portion of the third link member 130. The pressing member 133 has an end face adapted to snugly fit an outer side surface portion of each of the front locking members 118 and 119. Furthermore, a fixed clamping member 134 secured to a rear wall portion of the support frame 100 and has an outer side face engageable with an inner side surface portion of each of the front locking blocks 118 and 119.

In the locking device 120 constructed and arranged as above described, axial movement of the piston rod 124 of the power cylinder 122 produces angular movement of the first link member 125 with respect to the bracket member 121. The angular movement of the first link member 125 is accompanied by angular movement of the second link member 127 about the pivot pin 128 and causes the third link member 130 to turn about the pivot pin 132. The third link member 130 is thus rockable about the pivot pin 132 between a first angular position operable for clamping the lower one of the front locking blocks 118 and 119 between the pressing member 133 and the fixed clamping member 134 as shown and a second angular position having the pressing member 133 disengaged from the lower one of the locking blocks 118 and 119. The lower one of the front locking blocks 118 and 119 is in this fashion closely clamped between the pressing member 133 and the clamping member 134 when the power cylinder 122 is held in a condition having the piston rod 124 axially extended. Similarly, the lower one of the rear locking blocks 118' and 119' in the arrangement illustrated in FIG. 10 is clamped between the counterparts of the above mentioned pressing and clamping members 133 and 134 when a fluid-operated power cylinder 122' forming part of the rear locking device 120' as shown in FIG. 10 is held in a condition having its piston rod axially extended.

As will be seen from FIGS. 8 and 9, the jig carrier structure 102 has first and second sets of jigs or fixtures 135 and 136 mounted on one support plate 103 of the carrier structure 102 and first and second sets of jigs or fixtures 135' and 136' mounted on the other support plate 103' of the carrier structure 102 although the fixtures 135' are not seen in the drawings. The first and second sets of fixtures 135 and 136 are arranged symmetrically to the first and second sets of fixtures 135' and 136', with respect to the axis of rotation of the jig carrier structure 102.

The first set of fixtures 135 is adapted to grip an upper end portion of a side body structure 2 (FIG. 10) for an automotive vehicle of the previously mentioned model "A" and comprises a bracket member 137 secured to and projecting from the outer face of the support plate 103 as shown in FIGS. 8 and 9. The bracket member 137 has a shifting arm 138 having a middle portion pivotally mounted on a leading end portion of the bracket member 137 by a pivot pin 139. The shifting arm 138 in turn has supported thereon first and second fixture assemblies 140 and 140' which are arranged symmetrically to each other with respect to the center axis of the pivot pin 139. One of the fixture assemblies such as the first fixture assembly 140 is assumed to be adapted to manipulate a side body structure 2 for a sedan-type automotive vehicle of the model "A" while the other of the fixture assemblies such as the second fixture assembly 140' is assumed to be adapted to manipulate a side body structure for a hardtop-type automotive vehicle of the model "A".

The first fixture assembly 140 comprises a clamping base member 141 having two arm portions directed generally opposite to each other and a lug portion 142 protruding from between the two arm portions. The clamping base member 141 has one of its arm portions pivotally connected to an extension of the above mentioned shifting arm 138 by a pivot pin 143. The first fixture assembly 140 further comprises first and second fluid-operated power cylinders 144 and 145. The first power cylinder 144 has a cylinder body pivotally connected to one end portion of the shifting member 138 by a pivot pin 146 and a piston rod 147 pivotally connected at its leading end to the above mentioned one of the two arm portions of the clamping base member 141 by a pivot pin 148. On the other hand, the second power cylinder 145 has a cylinder body pivotally connected to the other arm portion of the clamping base member 141 by a pivot pin 149 and a piston rod 150 pivotally connected at its leading end to one end portion of a clamping hook member 151 by a pivot pin 152. The clamping hook member 151 in turn is pivotally connected to the above mentioned lug portion 142 of the clamping base member 141 by a pivot pin 153.

In the first fixture assembly 140 thus constructed and arranged, the clamping base member 141 is rockable with respect to the shifting member 138 about the pivot pin 143 between a first angular position inclined toward the support plate 103 of the jig carrier structure 102 and a second angular position inclined away from the support plate 103. On the other hand, the clamping hook member 151 is rockable with respect to the clamping base member 141 about the pivot pin 153 between a first angular position inclined away from the lug portion 142 of the clamping base member 141 as shown in FIG. 9 and a second angular position inclined toward the lug portion 142 of the base member 141.

The clamping base member 141 has on its lug portion 142 a guide surface 154 facing a free end portion of the clamping hook member 151 which has a hook portion 155 constituted by the free end portion thereof. When the clamping hook member 151 is held in the second angular portion thereof with respect to the clamping base member 141, the hook portion 155 of the clamping hook member 151 is located adjacent the guide surface 154 of the clamping base member 141 and is operative to have an upper end portion of a side body structure 2 of a vehicle body gripped between the guide surface 154 and the hook portion 155. Thus, the guide surface 154 of the clamping base member 141 and the hook portion 155 of the clamping hook member 151 are shaped to conform to the cross sectional contour of the particular end portion of a side body structure 2 of a sedan-type automotive vehicle of the model "A".

The second fixture assembly 140' is arranged symmetrically to the first fixture assembly 140 with respect to the center axis of the pivot pin 139 and is generally similar in construction and arrangement to the first fixture assembly 140. Thus, the second fixture assembly 140' includes members respectively corresponding or similar to the clamping base and hook members 141 and 151 of the first fixture assembly 140, though not described in detail. The guide surface of the clamping base member and the hook portion of the clamping hook member of the second fixture assembly 140' are shaped conformingly to the cross sectional contour of an upper end portion of a side body structure 2 for a hardtop-type automotive vehicle of the model "A". The first set of fixtures 135' (not shown) mounted on the other support plate 103' of the jig carrier structure 102 is arranged symmetrically to the first set of fixtures 135 on the support plate 103 of the jig carrier structure 102 with respect to the axis of rotation of the carrier structure 102. The first set of fixtures 135' includes first and second fixture assemblies (not shown) which are respectively similar to the first and second fixture assemblies 140 and 140' of the first set of fixtures 135 and which are arranged symmetrically to each other with respect to an axis parallel with the axis of rotation of the jig carrier structure 102 and fixed with respect to the jig carrier structure 102. The first and second fixture assemblies of the first set of fixtures 135' are adapted to manipulate side body structures for sedan-type and hardtop-type automotive vehicles, respectively, of the previously mentioned model "B".

Though not shown in the drawings, the shifting arm 138 is operatively connected to suitable drive means such as an electric motor and is provided with suitable locking means adapted to lock the shifting arm 138 selectively in one of two predetermined angular positions with respect to the bracket member 137 about the pivot pin 139. When the jig carrier structure 102 is held in the previously mentioned first upright position having the support plate 103 facing laterally inwardly of the frame structure, each of the first and second fixture assemblies 140 and 140' is angularly movable through the angle of 180 degrees about the pivot pin 139 between a predetermined operative position with respect to the jig carrier structure 102 and an inoperative position closer to the jig carrier structure 102 than the operative postion and symmetric to the operative position with respect to the center axis of the pivot pin 139. One of the first and second fixture assemblies 140 and 140' is selectively locked in the operative position by suitable locking means and is operable for gripping an upper end portion of a side body structure 2 (FIG. 10) for a sedan-type or hardtop-type automotive vehicle of the model "A" between, for example, the guide surface 154 of the clamping base member 141 and the hook portion 155 of the clamping hook member 151 of the first fixture assembly 140 as shown in FIGS. 8 and 9. When one of the fixture assemblies 140 and 140' is thus held in the operative position, the other of the fixture assemblies is held in the above mentioned inoperative position. The first and second fixture assemblies of the first set of fixtures 135' are arranged similarly to the fixture assemblies 140 and 140' of the first set of fixtures 135 on the support plate 103. When the jig carrier structure 102 is held in the previously mentioned second upright position having the support plate 103' facing laterally inwardly of the frame structure, each of the two fixture assemblies of the first set of fixtures 135' on the support plate 103' is thus also angularly movable between predetermined operative and inoperative positions with respect to the jig carrier structure 102 and can be locked in one of the two positions.

On the other hand, the second set of fixtures 136 is adapted to grip a lower end portion of a side body structure 2 (FIG. 10) for an automotive vehicle of the model "A" and comprises a bracket member 156 secured to and projecting from the outer face of the support plate 103. The bracket member 156 has a shifting arm 157 having a middle portion pivotally mounted on a leading end portion of the bracket member 156 by a pivot pin 158. The shifting arm 157 in turn has supported thereon first and second fixture assemblies 159 and 159' which are arranged symmetrically to each other with respect to the center axis of the pivot pin 158. One of these fixture assemblies such as the first fixture assembly 159 is assumed to be adapted to manipulate a side body structure 2 for a sedan-type automotive vehicle of the model "A" while the other of the fixture assemblies such as the second fixture assembly 159' is assumed to be adapted to manipulate a side body structure 2 for a hardtop-type automotive vehicle of the model "A".

The first fixture assembly 159 comprises a first clamping member 160 and a second clamping member 161. The first clamping member 160 has one end portion pivotally connected to an extension of the above mentioned shifting member 157 by a pivot pin 162. The second clamping member 161 has one end pivotally connected to the shifting arm 157 by a pivot pin 163. The first and second clamping members 160 and 161 are thus rockable with respect to the shifting arm 157 about the pivot pins 162 and 163, respectively, and are angularly movable toward and away from a surface portion 164 of the shifting arm 157, the particular surface portion 164 constituting a guide surface of the shifting arm 157. Each of the first and second clamping members 160 and 161 is thus rockable between a first angular position angularly spaced apart from the guide surface 164 of the shifting arm 157 as shown in FIG. 9 and a second angular position closer to the guide surface 164. Each of the first and second clamping members 160 and 161 and the guide surface 164 of the shifting arm 157 are shaped to conform to the cross sectional contour of a lower end portion of a side body structure 2 for a sedan-type automotive vehicle of the model "A". When both of the first and second clamping members 160 and 161 are held in the respective second angular positions thereof, the clamping members 160 and 161 are operative to have the particular end portion of the side body structure 2 gripped therebetween and closely forced against the guide surface 164 of the shifting arm 157.

The fixture assembly 159 further comprises first and second fluid-operated power cylinders 165 and 166. The first power cylinder 165 has a cylinder body pivotally mounted on the shifting arm 157 by a pivot pin 167 and a piston rod 168 pivotally connected at its leading end to the first clamping member 160 by a pivot pin 169. Likewise, the second power cylinder 166 has a cylinder body pivotally mounted on the shifting arm 157 by a pivot pin 170 and a piston rod 171 pivotally connected at its leading end to the second clamping member 161 by a pivot pin 172.

The second fixture assembly 159' of the second set of fixtures 136 is arranged symmetrically to the first fixture assembly 159 with respect to the pivot pin 158 and is generally similar in construction and arrangement to the first fixture assembly 159. Thus, the shifting arm 157 further has a second guide surface corresponding to the guide surface 164 thereof and, furthermore, the second fixture assembly 159' includes members respectively corresponding to the first and second clamping members 160 and 161 of the first fixture assembly 159. The guide second guide surface of the shifting arm 157 and each of the first and second clamping members thus forming part of the second fixture assembly 159' are shaped conformingly to the cross sectional contour of a lower end portion of a side body structure 2 of a hardtop-type automotive vehicle for the model "A".

The second set of fixtures 136' mounted on the support plate 103' of the jig carrier structure 102 is arranged symmetrically to the second set of fixtures 136 on the support plate 103' of the jig carrier structure 102 with respect to the axis of rotation of the carrier structure 102. The second set of fixtures 136' includes first and second fixture assemblies which are respectively similar to the first and second fixture assemblies 159 and 159' of the second set of fixtures 136 and which are arranged symmetrically to each other with respect to an axis parallel with the axis of rotation of the jig carrier structure 102 and fixed with respect to the jig carrier structure 102. The first and second fixture assemblies of the second set of fixtures 136' are adapted to manipulate side body structures for sedan-type automotive vehicles, respectively, of the previously mentioned model "B".

Though not shown in the drawings, the shifting arm 157 is operatively connected to suitable drive means such as an electric motor and is provided with suitable locking means adapted to lock the shifting arm 157 selectively in one of two predetermined angular positions about the the pivot pin 158. When the jig carrier structure 102 is held in the previously mentioned first upright position having the support plate 103 facing laterally inwardly of the frame structure, each of the first and second fixture assemblies 159 and 159' is angularly movable through the angle of 180 degrees about the center axis of the pivot pin 158 between a predetermined operative position and an inoperative position closer to the jig carrier structure 102 than the operative position and symmetric to the operative position with respect to the center axis of the pivot pin 158. One of the first and second fixture assemblies 159 and 159' is selectively locked in the operative position by the above mentioned locking means and is operable for gripping an upper end portion of a side body structure 2 (FIG. 10) for a sedan-type or hardtop-type automotive vehicle of the model "A" between, for example, the guide surface 164 of the shifting arm 157 and the first and second clamping members 160 and 161 shown in FIGS. 8 and 9. When one of the fixture assemblies 159 and 159' is held in the operative position, the other of the fixture assemblies is held in the above mentioned inoperative position. The first and second fixture assemblies of the second set of fixtures 136' are arranged similarly to the fixture assemblies 159 and 159', respectively, of the first set of fixtures 136. When the jig carrier structure 102 is held in the previously mentioned second upright position, each of the two fixture assemblies of the second set of fixtures 136' is thus also angularly movable between predetermined operative and inoperative positions with respect to the jig carrier structure 102 and can be locked in one of the two positions.

Figure 12:
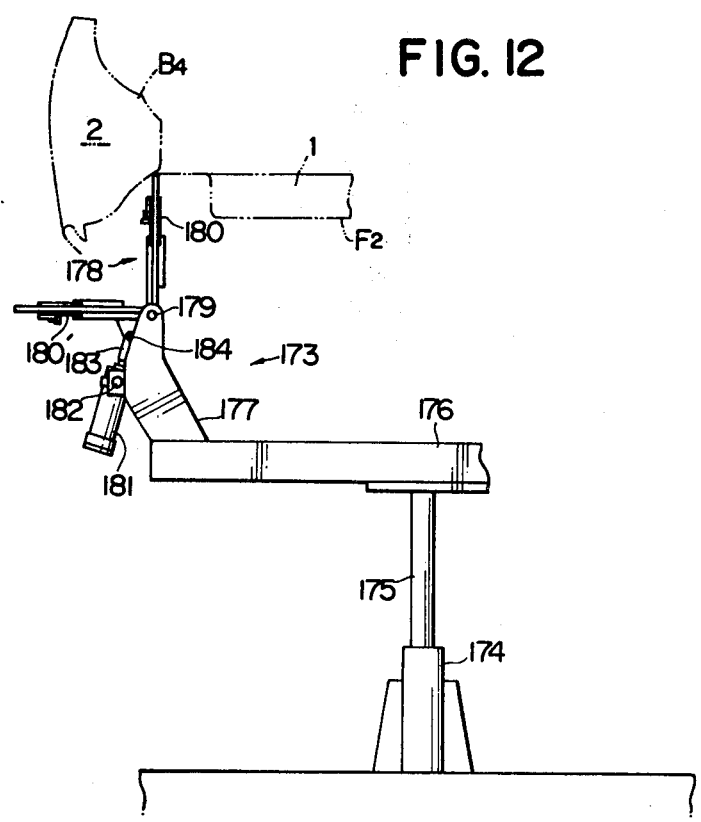
FIG. 12 is a front end view showing floor-structure positioning means forming part of the embodiment illustrated in FIGS. 2 and 3.

The apparatus embodying the present invention further comprises floor-structure positioning means 173 for lifting the floor structure 1 upwardly from the first predetermined position $F_1$ on the shuttle bar 6 to the second predetermined position $F_2$ above the shuttle bar 6 as indicated in FIG. 2. The floor-structure positioning means 173 is provided between the two side-body assembling stages 7 and 7' (FIG. 1) as will be seen from FIG. 2 and comprises a plurality of main fluid-operated power cylinders 174 one of which is shown in FIG. 12. The main power cylinder 174 has a cylinder body secured to and upstanding from the floor surface 8 and a piston rod 175 projecting upwardly from the cylinder body. The piston rod 175 is securely connected at its leading end to a horizontal support plate 176 having fixedly supported thereon a plurality of bracket members 177 which are arranged in a row along one lateral end of the bracket member 176 and upstanding from the upper face of the bracket member 176. Each of the bracket members 176 in turn has pivotally supported on an upper end portion thereof a shiftable floor holder 178 by a pivot pin 179. The shiftable floor holder 178 comprises first and second support arms 180 and 180' which are angularly spaced apart from each other through the angle of 90 degrees about the the pivot pin 179. The first support arm 180 is rockable about the pivot pin 179 between a horizontal inoperative position laterally extending inwardly from the pivot pin 179 and an upright operative position extending upwardly from the pivot pin 179 as shown, while the second support arm 180' is rockable about the pivot pin 179 between a horizontal inoperative position laterally extending outwardly from the pivot pin 179 as shown and an upright operative position extending upwardly from the pivot pin 179. Each of the bracket members 177 has further supported thereon an auxiliary fluid-opetated power cylinder 181 having a cylinder body pivotally mounted on the bracket member 177 by a pivot pin 182. The power cylinder 181 further has a piston rod 183 pivotally connected at its leading end to the floor holder 178 by a pivot pin 184. The auxiliary power cylinder 181 is thus operative to turn the floor holder 178 about the pivot pin 179 between a first angular position having the first support arm 180 in the upright operative position thereof and the second support arm 180' held in the horizontal inoperative position thereof as illustrated in FIG. 12 and a second angular position having the first support arm 180 held in the horizontal inoperative position thereof and the second support arm 180' held in the upright operative position thereof. The holder 178 is held in these first and second angular positions when the auxiliary power cylinder 181 is held in conditions having the piston rod 183 axially retracted and extended, respectively. The first support arm 180 has an edge shaped to be adapted to fit a lower surface portion of a floor structure 1 for an automotive vehicle of the model "A" along one side end of the floor structure 1 while the second support arm 180′ has an edge shaped to be adapted to fit a lower surface portion of a floor structure 1 for an automotive vehicle of the model "B".

Figure 13:
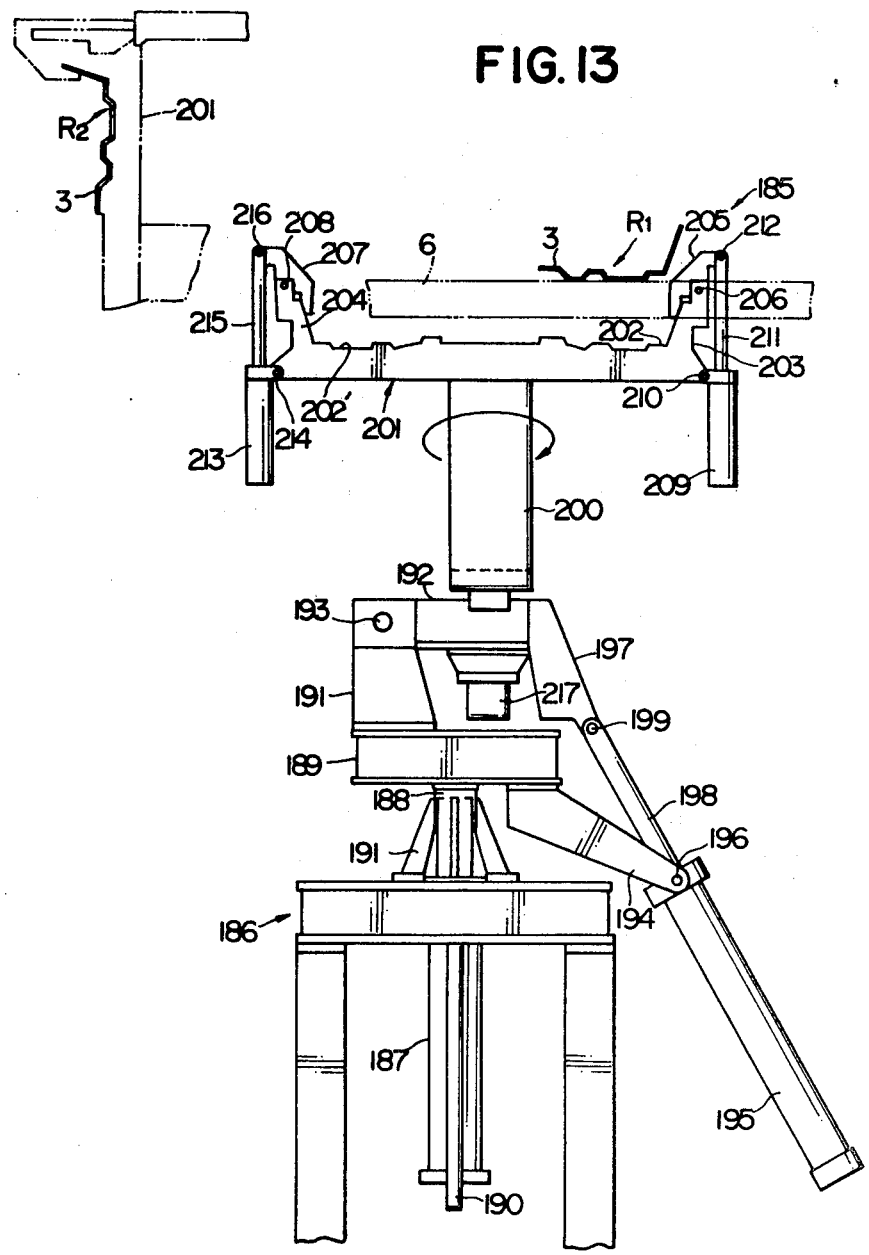
FIG. 13 is a side elevation view showing rear-upper-panel transfer means forming part of the apparatus embodying the present invention.

The apparatus embodying the present invention further comprises rear-upper-panel transfer means 185 (FIG. 3) for transfering a rear upper panel 3 of a vehicle body structure from a first predetermined position $R_1$ on the shuttle bar 6 to a second predetermined position $R_2$ ready to be assembled to the rear end of the floor structure 1 as indicated in FIG. 13. As will be seen from FIG. 3, the rear-upper-panel transfer means 186 is provided below the shuttle bar 6 in a foremost area of the frame structure.

Figure 14:
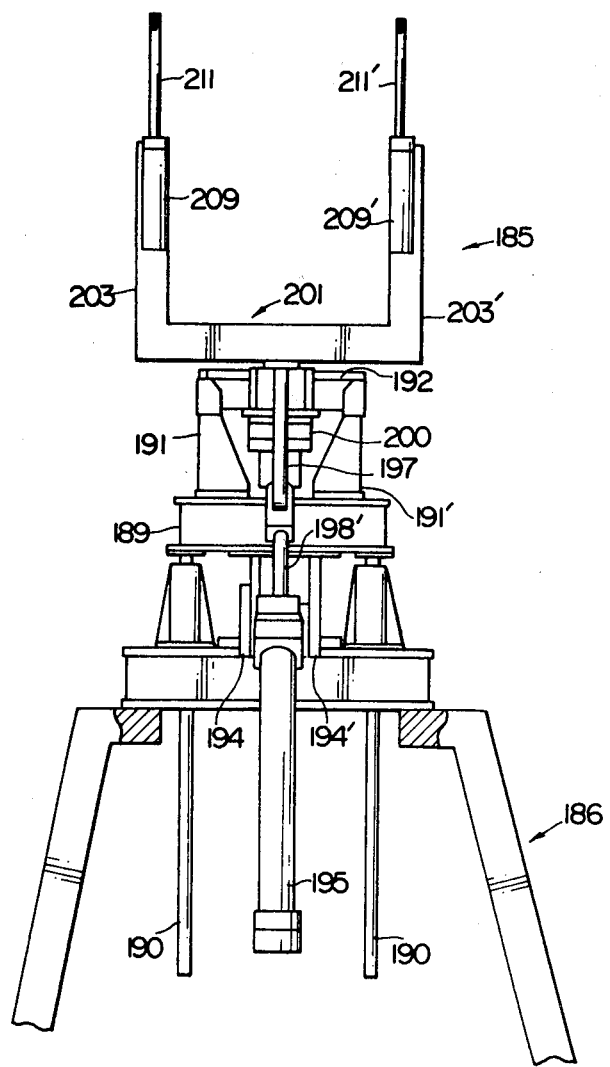
FIG. 14 is a front elevation view of the rear-upper-panel transfer means illustrated in FIG. 13.

Referring to FIGS. 13 and 14, the rear-upper-panel transfer means 185 comprises a pedestal 186 fixedly positioned on the floor surface 8 (FIG. 3) and having a horizontal base portion formed with a slot 186a (FIG. 14). The pedestal 186 has supported on the horizontal base portion thereof a main fluid-operated power cylinder 187 having a cylinder body extending downwardly from the base portion and securely connected to the base portion. The main power cylinder 187 further has a piston rod 188 securely connected at its leading end to a horizontal lift plate 189 carrying a pair of vertical guide rods 190 and 190′. The vertical guide rods 190 and 190′ are spaced apart in parallel from each other and axially extend downwardly through the above mentioned slot 186 in the base portion of the pedestal 185 as will be seen from FIG. 14. The lift plate 189 has further carried thereon a pair of bracket members 191 and 191′ projecting upwardly from the upper face of the lift plate 189 and spaced apart in parallel from each other in a lateral direction of the frame structure. A tiltable support block 192 is pivotally mounted on these bracket members 191 and 191′ by pivot pins 193 aligned with each other in a lateral direction of the frame structure. The tiltable support block 192 is tiltable about the pivot pins 193 between a horizontal first position as shown and an upstanding second position (not shown) with respect to the bracket members 191 and 191′. The lift plate 189 has further secured thereto a pair of bracket members 194 and 194′ projecting downwardly and forwardly from the lower face of the lift plate 189 and spaced apart in parallel from each other in a lateral direction of the frame structure. An auxiliary fluid-operated power cylinder 195 has a cylinder body pivotally mounted on leading end portions of these bracket members 194 and 194′ by pivot pins 196. On the other hand, the tiltable support block 192 has securely attached thereto a bracket member 197 projecting downwardly and forwardly from the support block 192. The auxiliary power cylinder 195 has a piston rod 198 pivotally connected at its leading end to this bracket member 197 by a pivot pin 199. Thus, the auxiliary power cylinder 195 is adapted to drive the tiltable support block 192 to turn about the pivot pins 193 between the above mentioned horizontal first position and upright second position thereof with respect to the lift plate 189. The rear-upper-panel transfer means 185 further comprises a swivel mechanism comprising a swivel post 200 projecting upwardly from the above mentioned tiltable support block 192 and rotatable with respect to the support block 192 about a vertical center axis thereof. The swivel post 200 has fixedly carried thereon a panel carrier 201 having a pair of base portions extending perpendicularly from an upward extension of the center axis of the swivel post 200 and formed with upwardly facing first and second guide surface portions 202 and 202′. One of the guide surface portions such as the first guide surface portion 202 is configured to fit a rear upper panel 3 for an automotive vehicle of the model "A", while the other of the guide surface portions such as the second guide surface portion 202′ is configured to fit a rear upper panel (not shown) for an automotive vehicle of the model "B". The panel carrier 201 further has a first pair of bracket portions 203 and 203′ upstanding from one of the above mentioned base portions of the panel carrier 201 and spaced apart in parallel from each other and a second pair of bracket portions 204 upstanding from the other base portion of the panel carrier 201. Clamping members 205 are pivotally mounted on the bracket portions 203 and 203′, respectively, by pivot pins 206, and likewise, clamping members 207 are pivotally mounted on the bracket portions 204, respectively, by means of pivot pins 208. Fluid-operated power cylinders 209 and 209′ have cylinder bodies pivotally connected to the two bracket portions 203 and 203′, respectively, of the panel carrier 201 by pivot pins 210 and piston rods 211 and 211′ pivotally connected to end portions of the clamping members 205 by pivot pins 212, respectively. Likewise, fluid-operated power cylinders 213 have cylinder bodies pivotally connected to the two bracket portions 204 of the panel carrier 210 by pivots 214 and piston rods 215 pivotally connected to end portions of the clamping members 207 by pivot pins 216, respectively. Thus, each of the clamping members 205 is rockable about the center axis of each of the pivot pins 206 between a first angular position spaced apart from the first guide surface portion 202 of the panel carrier 201 and a second angular position engaging the first guide surface portion 202 with a rear upper panel 3 interposed between the surface portion 202 and each of the clamping members 205. Likewise, each of the clamping members 207 is rockable about the center axis of each of the pivot pins 208 between a first angular position spaced apart from the second guide surface portion 202′ of the panel carrier 201 and a second angular position engaging the second guide surface portion 202′ with a rear upper panel 3 interposed between the surface portion 202′ and each of the clamping members 207.

The swivel mechanism constructed and arranged as hereinbefore described is vertically movable upwardly and downwardly with respect to the pedestal 186 and the shuttle bar 6 between a predetermined lowermost position having the first and second guide surface portions 202 and 202′ of the panel carrier 210 located below a horizontal plane on which the shuttle bar 6 is to travel and a predetermined uppermost position having the first and second guide surface portions 202 and 202′ located slightly above the above mentioned horizontal plane. The swivel mechanism as a whole is further rotatable about the center axis of the swivel post 200 with respect to the tiltable support block 192 and accordingly to the shuttle bar 6 and is driven for rotation about the particular axis by suitable drive means. In the arrangement shown in FIGS. 13 and 14, such drive means is assumed as comprising an electric motor 217 secured to the lower face of the tiltable support block 192 and having an output shaft (not shown) connected to the swivel post 200 through the support block 192. The swivel mechanism is driven to make a half turn about the center axis of the swivel post 200 between a first predetermined position having the first guide surface portion 202 of the panel carrier 201 located forwardly of the second guide surface portion 202' of the panel carrier 201 as shown in FIG. 13 and a second predetermined angular position having the second guide surface portion 202' of the panel carrier 201 located forwardly of the first guide surface portion 202 of the panel carrier 201.

The apparatus embodying the present invention further comprises a cowl-assembly transfer means 218 (FIG. 3) adapted to convey a cowl assembly 4 of a vehicle body structure to a first predetermined position $C_1$ above and slightly ahead of a front end portion of the floor structure 1 in the second predetermined position $F_2$, from the first predetermined position $C_1$ forwardly to a second predetermined position $C_2$ above the front end portion of the floor structure 1 and further from the second predetermined position $C_2$ to a third predtermined position ready to be assembled to the front end portion of the floor structure 1, as will be seen from FIG. 3.

Figure 15:
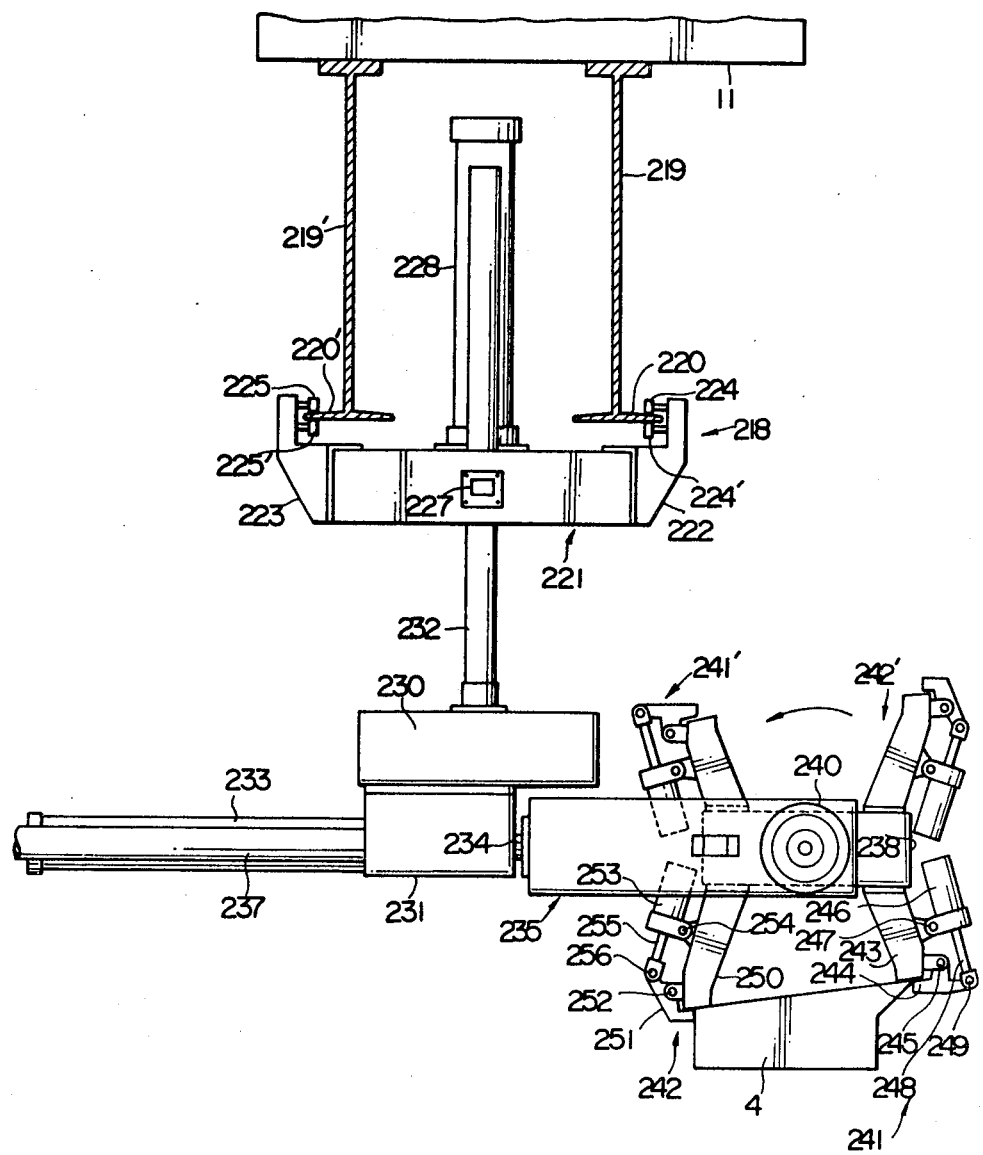
FIG. 15 is a side end view showing cowl-assembly transfer means included in the embodiment illustrated in FIGS. 2 and 3.
Figure 16:
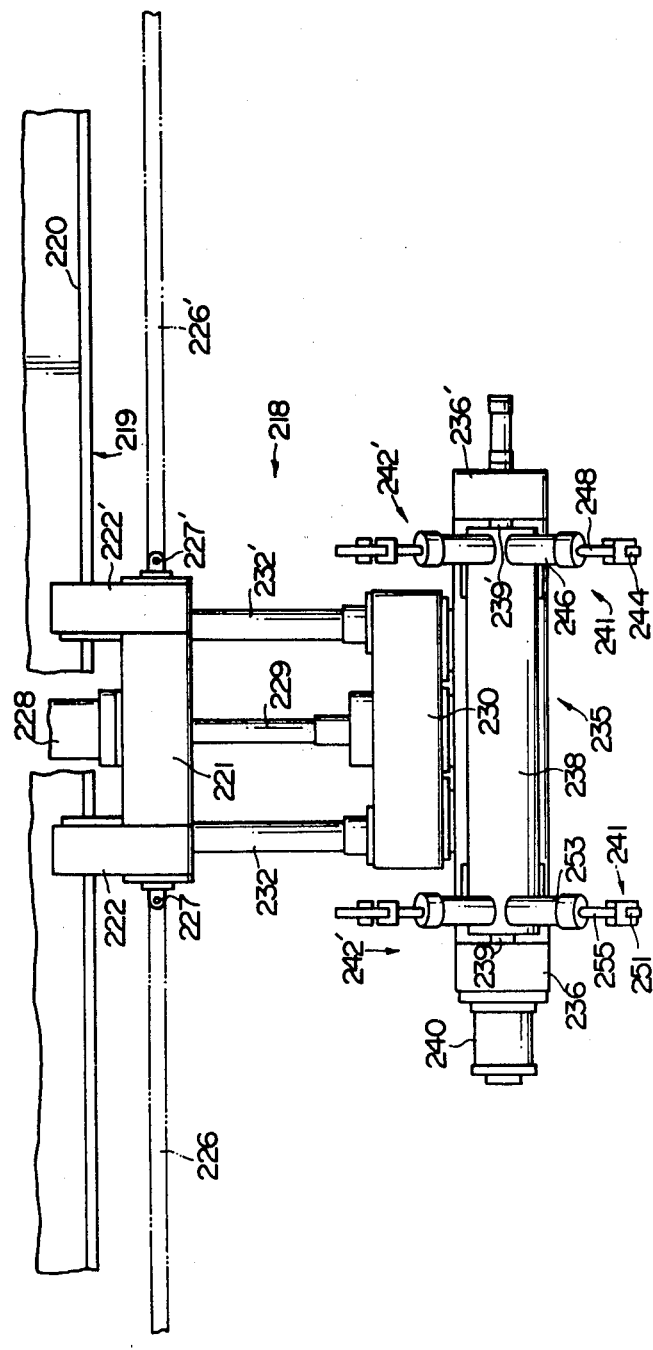
FIG. 16 is a front end view of the cowl-transfer means illustrated in FIG. 15.

As will be seen from FIGS. 15 and 16, the cowl-assembly transfer means 218 comprises a pair of lateral guide rails 219 and 219' secured along their upper ends to one of the lower side beams 11 and the adjacent one of the lower inner beams 16 (FIGS. 2 and 4) and extending in parallel with and in the neighborhood of the lower front beam 13 (FIGS. 2, 3 and 4). The guide rails 219 and 219' are horizontally spaced apart in parallel from each other and have rearward and forward extensions 220 and 220', respectively, as will be seen from FIG. 15. The cowl-assembly transfer means 218 further comprises a carrier block 221 having a pair of rear arm portions 222 and 222' and a pair of front arm portions commonly designated by reference numeral 223. The arm portions 222 and 222' project upwardly from a rear end portion of the carrier block 221 and has movably supported thereon a set of upper guide rollers 224 which are held in rollable engagement with the upper face of the rearward extension 220 of the guide rail 219 and a set of lower guide rollers 224' which are held in rollable engagement with the lower face of the extension 220. Likewise, the arm portions 223 project upwardly from a front end portion of the carrier block 221 and have rotatably supported thereon a set of upper guide rollers 225 which are held in rollable engagement with the upper face of the forward extension 220' of the guide rail 219' and a set of lower guide rollers 225' which are held in rollable engagement with the lower face of the extension 220'. The carrier block 221 is thus movable along the guide rails 219 and 219' in a lateral direction of the frame structure. A pair of roller or link chains 226 and 226' are anchored each at one end to the side end faces of the carrier block 221 by suitable anchor elements 227 and 227', respectively, as shown in FIG. 16. Though not shown in the drawings, each of the chains 226 and 226' have their respective leading end portions passed on suitable sprocket wheels operatively connected to suitable drive means to be alternately put into operation to drive the chains 226 and 226' to travel in either direction along the guide rails 219 and 219'.

The carrier block 221 has supported thereon a power cylinder 228 having a cylinder body vertically secured to the carrier block 221. The power cylinder 228 has a piston rod 229 downwardly projecting from the cylinder body and movably extending through a middle portion of the carrier block 221 as shown in FIG. 16. The piston rod 229 is securely connected at its lower end to a supporting block 230 having a lower extension 231 protruding downwardly from the supporting block 230. The supporting block 230 has fixedly mounted thereon a pair of vertical guide rods 232 and 232' upstanding from the supporting block 230 and movably extending through openings (not shown) formed in the above described carrier block 221, the guide rods 232 and 232' being spaced apart in parallel from each other on both sides of the power cylinder 228. The supporting block 230 has further supported thereon a fluid-operated power cylinder 233 having a cylinder body axially extending in a longitudinal direction of the frame structure and secured to the lower extension 231 of the supporting block 230 as shown in FIG. 15. The power cylinder 233 has a piston rod 234 axially projecting rearwardly from the cylinder body and further from the front end face of the extension 231. The piston rod 234 is securely connected at its foremost end to a generally U-shaped bifurcated member 235 having a lateral base portion secured at right angles to the piston rod 234 and a pair of arm portions 236 and 236' perpendicularly projecting from the opposite ends of the base portion and spaced apart in parallel from each other in a lateral direction of the frame structure as will be seen from FIG. 16. A pair of horizontal guide rods 237 are securely connected to the bifurcated member 235 and are horizontally movable through passageways formed in the lower extension 231 of the supporting block 230. The bifurcated member 235 and the guide rods 237 are thus movable together with respect to the supporting block 230 in longitudinal directions of the frame structure, the movement of the bifurcated member 235 being guided by the guide rods 237.

The two arm portions 236 and 236' of the bifurcated member 235 have a clamp carrier plate 238 rotatably mounted thereon by pins 239 and 239' axially projecting respectively from the opposite side faces of the clamp carrier plate 238 and journaled in the arm portions 236 and 236', respectively, as shown in FIG. 16. The arm portion 236 of the bifurcated member 235 has an electric motor 240 mounted on the outer side face thereof. The motor 240 has an output shaft (not shown) connected to the pin 239 and is adapted to drive the clamp carrier plate 238 to make a half turn about the axis of rotation thereof between a first horizontal position having one of its opposite end faces directed downwardly and a second horizontal position having the other of the end faces directed downwardly. The bifurcated member 235 is provided with suitable locking means (not shown) for holding the clamp carrier plate 238 selectively in one of these first and second horizontal positions thereof.

The clamp carrier plate 238 has carried thereon a pair of first clamp assemblies 241 and a pair of second clamp assemblies 242 mounted on one of the opposite end faces thereof and a pair of first clamp assemblies 241' and a pair of second clamp assemblies 242' mounted on the other end face thereof. Each of the first clamp assemblies 241 comprises a bracket member 243 projecting from the particular end face of the carrier plate 238 and a clamping member 244 having an intermediate portion pivotally connected to the bracket member 243 by a pivot pin 245. Each of the clamp assemblies 241 further comprises a fluid-operated power cylinder 246 having a cylinder body pivotally connected to the bracket member 243 by a pivot pin 247 and a piston rod 248 pivotally connected at its leading end to an end portion of the clamping member by a pivot pin 249. The clamping member 244 has another end portion formed with a nip surface engageable with an end face of the bracket member 243. The end face of the bracket member 243 and the nip surface of the clamping member 244 are shaped in such a manner as to fit a rear end portion of a cowl assembly 4 for an automotive vehicle of, for example, the model "A". The clamping member 244 is rockable about the pivot pin 245 between a first angular position having its nip surface angularly spaced apart from the end face of the bracket member 243 and a second angular position having the nip surface held in engagement with the end face of the bracket member 243 with the rear end portion of the cowl assembly 4 held therebetween.

On the other hand, each of the second clamp assemblies 242 associated with the above described first clamp assemblies 241 comprises a bracket member 250 projecting from the clamp carrier plate 238 and a clamping member 251 having an intermediate portion pivotally connected to the bracket member 250 by a pivot pin 252. Each of the clamp assemblies 242 further comprises a fluid-operated power cylinder 253 having a cylinder body pivotally connected to the bracket member 250 by a pivot pin 254 and a piston rod 255 pivotally connected at its leading end to an end portion of the clamping member 251 by a pivot pin 256. The clamping member 251 has another end portion formed with a nip surface engageable with an end face of the bracket member 250. The end face of the bracket member 250 and the nip surface of the clamping member 251 are shaped in such a manner as to fit a front end portion of a cowl assembly 4 for an automotive vehicle of the model "A". The clamping member 251 is rockable about the pivot pin 252 between a first angular position having its nip surface angularly spaced apart from the end face of the bracket member 250 and a second angular position having the nip surface held in engagement with the end face of the bracket member 250 with the front end portion of the cowl assembly 4 held therebetween.

The first and second clamp assemblies 241' and 242' on the other end face of the clamp carrier plate 238 are constructed and arranged similarly to the above described clamp assemblies 241 and 242, respectively, and are adapted to manipulate a cowl assembly 4 for an automotive vehicle of the model "B". The clamp carrier plate 238 is further movable with respect to the supporting block 230 in a longitudinal direction of the frame structure between a first predetermined longitudinal position close to the lower extension 231 of the supporting block 230 as shown in FIG. 15 and a second predetermined longitudinal position forwardly spaced apart from the lower extension 231 of the supporting block 230. The clamp carrier plate 238 is moved into these first and second predetermined longitudinal positions when the piston rod 234 of the power cylinder 233 is axially retracted and extended, respectively. The clamp carrier plate 238 is still further movable with the carrier block 221 in a lateral direction of the frame structure between a first predetermined lateral position close to one side end of the frame structure and a second predetermined lateral position above the shuttle bar 6 (FIGS. 2 and 3). When the clamp carrier plate 238 is held in the first predetermined longitudinal position with respect to the supporting block 230 and in the first predetermined lateral position and the predetermined uppermost position with respect to the frame structure, the clamp carrier 238 assumes a position ready to receive a cowl assembly 4 from suitable delivery means (not shown).

The apparatus embodying the present invention further comprises rear-waist-panel transfer means 257 (FIG. 2) for conveying a rear waist panel structure 5 to a predetermined position ready to be assembled to the floor structure 1 and the side body structure 2 and 2' (FIGS. 2 and 3) during each cycle of operation of the apparatus.

Figure 17:
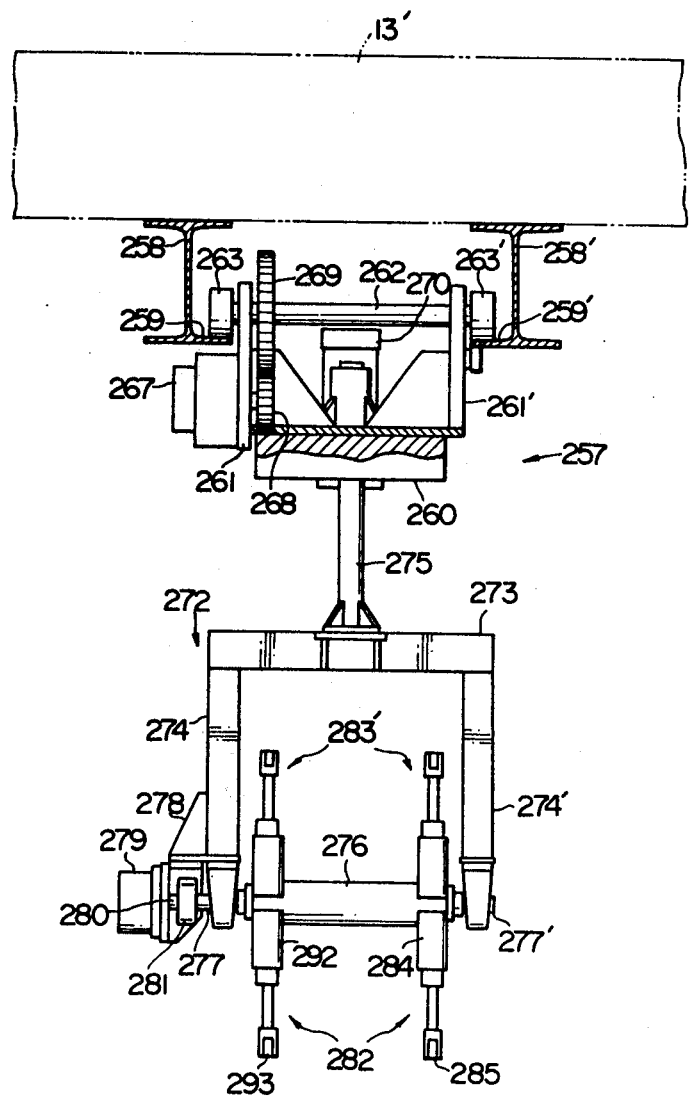
FIG. 17 is a front end view showing rear-waist-panel transfer means forming part of the embodiment illustrated in FIGS. 2 and 3.
Figure 18:
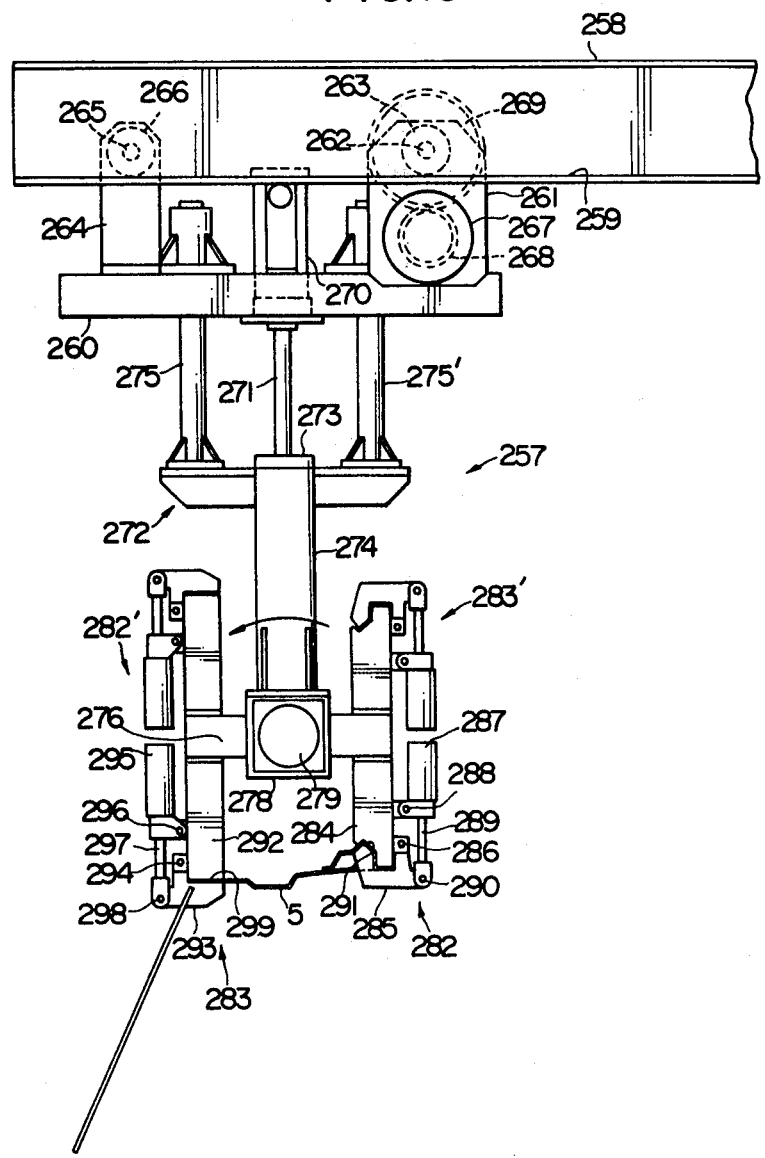
FIG. 18 is a side view of the rear-waist-panel transfer means illustrated in FIG. 17.

As will be seen from FIGS. 17 and 18, the rear-waist-panel transfer means 257 comprises a pair of curved guide rails 258 and 258' each secured at one outer end thereof to the lower face of an end portion of the lower front beam 13. The guide rails 258 and 258' extend curvilinearly from the outer end portion of the lower front beam 13 laterally inwardly of the frame structure and terminate above the shuttle bar 6 (FIGS. 2 and 3) in a front area of the assembling station as will be seen from FIG. 3 and are horizontally spaced apart in parallel from each other as will be seen from FIG. 17. The guide rails 258 and 258' have at their lower ends inner side extensions 259 and 259', respectively, projecting toward each other and having upper faces which are flush with each other. The rear-waist-panel transfer means 257 further comprises a carrier block 260 having fixedly mounted thereon a pair of bracket members 261 and 161' upstanding from a front end portion of the carrier block 260 and horizontally spaced apart in parallel from each other between the guide rails 258 and 258'. The bracket members 261 and 261' have rotatably supported thereon a shaft 262 having a center axis normal to the bracket members 261 and 261' and to the guide rails 258 and 258' and opposite end portions axially projecting outwardly from the bracket members 261 and 261', rspectively, and having guide rollers 263 and 263' securely carried on the end portions. The guide rollers 263 and 263' are held in rollable contact with the upper faces of the inner side extensions 259 and 259' of the guide rails 258 and 258', respectively. As will be seen from FIG. 18, the carrier block 260 has further mounted thereon another pair of bracket members 264 upstanding from a rear end portion of the carrier block 260 and horizontally spaced apart in parallel from each other between the guide rails 258'. These bracket members 264 have also rotatably supported thereon a shaft 265 having guide rollers 266 securely carried on opposite end portions of the shaft 265 and held in rollable engagement with the upper faces of the inner side extensions 259 and 259' of the guide rails 258 and 258', respectively. The guide rollers 263 and 263' and the guide rollers 266 are driven to roll on the extensions 259 and 259' of the guide rails 258 and 258', respectively, and as a consequence the carrier block 260 is driven to travel along the guide rails 258 and 258' by suitable drive means. In the arrangement illustrated in FIGS. 17 and 18, such drive means comprises an electric motor 267 mounted on the bracket member 261 and having an output shaft parallel with the shaft 262. The output shaft of the motor 267 is axially passed through the bracket member 261 rotatably with respect to the bracket member 261 and has a drive gear 268 securely carried on its leading end portion extending toward the bracket member 261'. The drive gear 268 is held in mesh with a driven gear 269 which is securely carried on the shaft 262.

The carrier block 260 has supported thereon a fluid-operated power cylinder 270 having a cylinder body vertically secured to the carrier block 260 and a piston rod 271 downwardly projecting from the cylinder body. The piston rod 271 is securely connected at its lower end to a bifurcated member 272 having a horizontal intermediate portion 273 secured to the piston rod 271 and a pair of arm portions 274 and 274' perpendicularly projecting downwardly from the opposite ends of the intermediate portion 273 and spaced apart in parallel from each other. The intermediate portion 273 of the bifurcated member 271 has fixedly supported thereon a pair of vertical guide rods 275 and 275' upstanding from the upper face of the intermediate portion 273 and movably extending through openings (not shown) formed in the carrier block 260 as will be seen from FIG. 18. The guide rods 275 and 275' are horizontally spaced apart in parallel from each other with the piston rod 271 of the power cylinder 270 disposed therebetween. On the other hand, the arm portions 274 and 274' of the bifurcated member 272 have a clamp carrier plate 276 rotatably connected to respective lower end portions thereof by pins 277 and 277' axially projecting from the opposite side faces of the carrier plate 276 and journaled in the arm portions 274 and 274', respectively, as shown in FIG. 17. The pins 277 and 277' have center axes aligned with each other so that the clamp carrier plate 276 is rotatable about an axis which passes through the aligned center axes of the pins 277 and 277. The clamp carrier plate 276 has a pair of parallel opposite end faces which turn about the axis of rotation of the carrier plate 276 when the carrier plate 276 is turned about the axis of rotation thereof. The arm portion 274 of the bifurcated member 272 has a bracket structure 278 secured to the outer side face thereof. The bracket 278 in turn has supported hereon an electric motor 279 having an output shaft 280 connected through a coupling 281 to the pin 277. The motor 279 is adapted to drive the clamp carrier plate 276 to make a half turn about the axis of rotation thereof between a first horizontal position having one of the above mentioned opposite end faces directed downwardly and a second horizontal position having the other end face directed downwardly. The bifurcated member 272 is thus provided with suitable locking means (not shown) for holding the clamp carrier plate 276 selectively in one of these first and second horizontal positions thereof.

The clamp carrier plate 276 has carried thereon a pair of first clamp assemblies 282 and a pair of second clamp assemblies 283 mounted on one of the opposite end faces thereof and a pair of first clamp assemblies 282' and a pair of second clamp assemblies 283' mounted on the other end face thereof. Each of the first clamp assemblies 282 comprises a bracket member 284 projecting from one end face of the carrier plate 276 and a clamping member 285 having an intermediate portion pivotally connected to the bracket member 284 by means of a pivot pin 286. Each of the clamp assemblies 282 further comprises a fluid-operated power cylinder 287 having a cylinder body pivotally connected to the bracket member 284 by a pivot pin 288 and a piston rod 289 pivotally connected at its leading end to an end portion of the clamping member 285 by a pivot pin 290. The clamping member 285 has another end portion formed with a guide surface 291 engageable with an end face of the bracket member 284. The end face of the bracket member 284 and the guide surface 291 of the clamping member 285 are shaped in such a manner as to fit a rear end portion of a rear waist panel structure 5 for an automotive vehicle of, for example, the model "A". The clamping member 285 is rockable about the pivot pin 286 between a first angular position having its guide surface 291 angularly spaced apart from the end face of the bracket member 284 and a second angular position having the guide surface 291 held in engagement with the end face of the bracket member 284 with the rear end portion of the rear waist panel structure 5 held therebetween.

On the other hand, each of the second clamp assemblies 283 associated with the above described first clamp assemblies 282 comprises a bracket member 292 projecting from the clamp carrier plate 276 and a clamping member 293 having an intermediate portion pivotally connected to the bracket member 292 by a pivot pin 294. Each of the clamp assemblies 283 further comprises a fluid-operated power cylinder 295 having a cylinder body pivotally connected to the bracket member 292 by a pivot pin 296 and a piston rod 297 pivotally connected at its leading end to an end portion of the clamping member 293 by a pivot pin 298. The clamping member 293 has another end portion formed with a guide surface 299 engageable with an end face of the bracket member 292. The end face of the bracket member 292 and the guide surface of the clamping member 293 are shaped in such a manner as to fit a front end portion of a rear waist panel structure 5 for an automotive vehicle of the model "A". The clamping member 293 is rockable about the center axis of the pivot pin 294 between a first angular position having its guide surface 299 angularly spaced apart from the end face of the bracket member 292 and a second angular position having the guide surface 299 held in engagement with the end face of the bracket member 292 with the front end portion of the rear-waist-panel structure 5 held therebetween.

The first and second clamp assemblies 282' and 283' on the other end face of the clamp carrier plate 276 are constructed and arranged similarly to the above described clamp assembies 282 and 283, respectively, and are adapted to manipulate a rear waist panel structure 5 for an automotive vehicle of the model "B". Either the clamp assemblies 282 and 283 on one end face of the clamp carrier plate 276 or the clamp assemblies 282' and 283' on the other end face of the clamp carrier plate 276 are thus moved into positions below the clamp carrier plate 276 when the clamp carrier plate 276 is turned into one of the previously mentioned first and second horizontal positions thereof with respect to the bifurcated member 272. The clamp carrier plate 276 is further vertically movable with respect to the carrier block 260 between predetermined uppermost and lowermost positions when the piston rod 271 of the power cylinder 270 is axially retracted and extended, respectively. The clamp carrier plate 276 is still further movable with the carrier block 260 along the curved guide rails 258 and 258' between a first predetermined lateral position close to one side end of the frame structure and a second predetermined lateral position above the shuttle bar 6 (FIGS. 2 and 3). When the clamp carrier plate 276 is held in the predetermined uppermost position with respect to the carrier block 260 and in the first predetermined lateral position with respect to the frame structure, the clamp carrier plate 276 assumes a position ready to receive a rear waist panel structure 5 from suitable delivery means (not shown).

The apparatus embodying the present invention further comprises fastening means by which the floor structure 1, side body structures 2 and 2', rear upper panel 3, cowl assembly 4 and rear waist panel structure 5 respectively conveyed into the positions ready to be assembled to one another are to be welded, brazed, soldered, bolted or otherwise fastened together. In the embodiment of the present invention, such fastening means is constituted by welding means 300 (FIGS. 2 and 3) adapted to have such component members and structures welded together.

Figure 19:
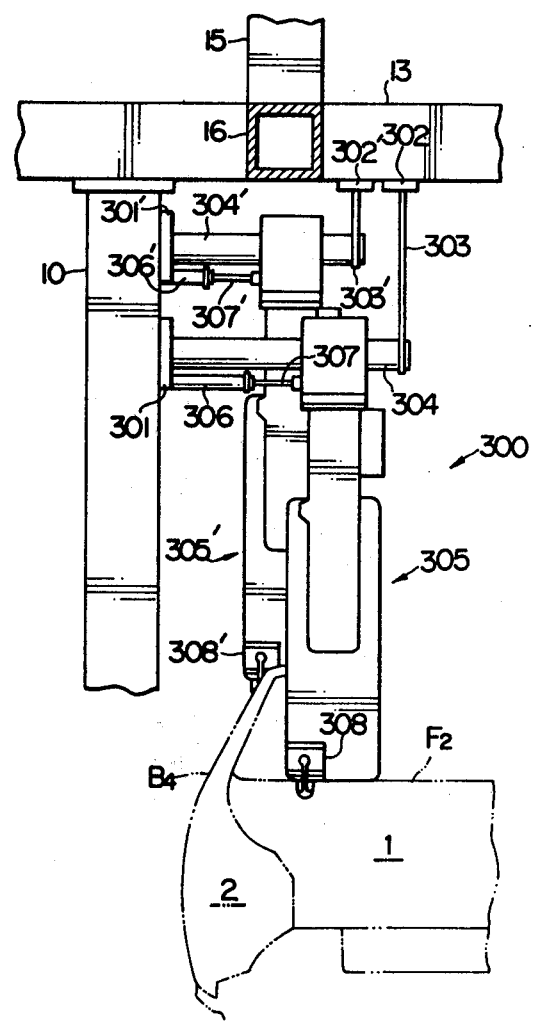
FIG. 19 is a front end view showing welding means forming part of the embodiment illustrated in FIGS. 2 and 3.

As illustrated in FIG. 19 of the drawings, the welding means 300 comprises a pair of side beams 301 and 301' extending in longitudinal directions of the frame structure between one of the front auxiliary columns 10 and one of the rear auxiliary columns 10' (FIG. 3) and each securely attached at the front end thereof to the inner side face of the column 10 and at the rear end thereof to the inner side face of the column 10'. The welding means 300 further comprises a pair of horizontal beams 302 and 302' extending also in longitudinal directions of the frame structure between the lower front beam 13 and the lower rear beam 13' (FIG. 3) and each securely attached at the front end thereof to the lower face of the beam 13 and at the rear end thereof to the lower face of the beam 13'. The side beams 301 and 301' are vertically spaced apart in parallel from each other and the horizontal beams 302 and 302' are horizontally spaced apart in parallel from each other. Retainer blocks 303 and 303' depend from the horizontal beams 302 and 302', respectively. A pair of guide rods 304 extend in lateral directions of the frame structure between one side beam 301 and one retainer block 303 and are securely connected each at one axial end thereof to the side beam 301 and at the other axial end thereof to the retainer block 303. Likewise, a pair of guide rods 304' extend in lateral directions of the frame structure between the other side beam 301' and the other retainer block 303' and are securely connected each at one axial end thereof to the side beam 301' and at the other axial end thereof to the retainer block 303'. Welding units 305 and 305' are suspended from these guide rods 304 and 304' and are movable on and along the guide rods 304 and 304', respectively. The welding units 305 and 305' are to be driven to move on the guide rods 304 and 304', respectively, by suitable drive means. In the embodiment herein shown, the drive means is shown comprising a fluid-operated power cylinder 306 having a cylinder 306' having a cylinder body secured to the side beam 301 and a piston rod 307 securely connected at its leading end to the welding unit 305. The welding unit 305 has a welding head 308 and, likewise, the welding unit 305' has a welding head 308'. The detailed construction and arrangement of each of the welding units 305 and 305' is rather immaterial to the understanding of the gist of the present invention and will not be herein described.

The above described welding means 300 is provided in association with one side-body assembling stage 7 (FIG. 1) of the apparatus embodying the present invention. Welding means similar to such welding means 300 is thus also provided in association with the other side-body assembling stage 7' (FIG. 1), though not shown in the drawings.

The individual power cylinders and air motors incorporated in the apparatus hereinbefore described are supplied with working fluids from suitable fluid sources through hoses and conduits provided therebetween though not shown in the drawings and are operated under the control of, for example, a central computer having stored therein pieces of information indicative of the models and types of the vehicles to be manufactured or through detection of the models and types of the vehicles to be assembled by the individual component works supplied to the assembly line. Furthermore, the various electrically-operated units such as the electric motors incorporated in the apparatus are connected by wirings to suitable power sources across switches to be operated under the control of the central computer or through detection of the models and types of the vehicles to be manufactured.

Description will be hereinafter made regarding operation of the apparatus constructed and arranged as described hereinbefore.

During each cycle of operation of the apparatus, a floor structure 1 and a rear upper panel structure 5 for a sedan-type or hardtop-type vehicle of the model "A" or "B" are conveyed on the shuttle bar 6 driven to advance in a direction indicated by "a" in FIG. 1. In the description to follow, the vehicle to be manufactured with these component works will be assumed, by way of example, as being of the sedan-type of the model "A". In the following description, it will further be assumed by way of example that the floor structure 1 is conveyed forwardly with its front and rear ends directed rearwardly and fowardly, respectively, as will be gathered from the illustrations of FIGS. 1 and 3.

While the floor structure 1 and the rear upper panel structure 5 are being thus conveyed on the shuttle bar 6 advancing forwardly, the side body structures 2 and 2' to be assembled to the floor structure 1 are conveyed by the hanger assembly 20 into the previously mentioned first predetermined positions $B_1$ between the two side-body assembling stages 7 and 7' (FIG. 1) as will be seen from FIG. 2. The side body structure 2 and 2' held in the positions $B_1$ are suspended from the hook members 22 and 22' of the hanger arms 21 and 21', respectively, of the hanger assembly 20 which is located above the shuttle bar 6. Under these conditions, the hoist assembly 38 forming part of the side-body transfer means 18 is held in the uppermost position closest to the support beams 25 and 25' as shown in FIGS. 4 and 5 with the air motor 32 held inoperative. Furthermore, the carrier block 46 of the hoist assembly 38 is maintained in a laterally outermost position thereof with respect to the frame structure, viz., the position closest to the air motor 51 which is also held inoperative. The power cylinder 58 on the carrier block 46 is maintained inoperative so that the piston rod 60 thereof is retracted upwardly and maintains the hanger 61 in the downwardly inclined inoperative position thereof as shown in FIGS. 4 and 5.

The side body structures 2 and 2' being moved into the first predetermined positions $B_1$ thereof by the hanger assembly 20 as above described, the air motor 51 of the hoist assembly 38 is initiated into motion driving the endless chain 57 to travel between the sprocket wheels 54 and 55. The output shaft 53 of the air motor 51 being driven to rotate in one direction about the center axis thereof, the carrier block 46 is caused to move along the guide rails 45 and 45' toward the side body structure 2 suspended from the hanger assembly 20. When the carrier block 46 reaches a predetermined position close to the side body structure 2, the air motor 51 is brought to a stop so that the carrier block 46 is held in the particular position with respect to the side body structure 2. The power cylinder 58 on the carrier block 46 is then actuated to drive the piston rod 60 to protrude downwardly, causing the hanger 61 to turn about the pivot pin 62 from the downwardly inclined inoperative angular position to the upwardly raised operative angular position thereof as shown in FIG. 4. While the hanger 61 is being turned toward the upwardly raised operative angular position thereof, the hanger 61 has its hook portion brought into engagement with an upper end portion of the side body structure 2 suspended from the hanger assembly 20 (FIG. 2) and raises the side body structure 2 from the hook member 22. The side body structure 2 is thus disengaged from the hook member 22 of the hanger arm 21 and is transferred to the hanger 61 by the time when the hanger 61 reaches the raised operative angular position thereof. With the side body structure 2 suspended from the hook portion of the hanger 60, the air motor 51 is actuated to drive its output shaft 53 for rotation in a reverse direction about the center axis thereof so that the carrier block 46 is driven by the endless chain 57 to travel along the guide rails 45 and 45′ toward the initial position close to the sprocket wheel 54. When the carrier block 46 reaches the initial position thereof, the air motor 51 is brought to a stop so that the carrier block 46 is held in the particular position with the side body structure 2 suspended from the hook portion of the hanger 61 and thus held in the second predetermined position $B_2$ as shown in FIGS. 2 and 4. Thereupon, the air motor 32 on the support beam 25 (FIGS. 4 and 5) is actuated to drive its output shaft 33 for rotation in one direction about the center axis thereof. The rotation of the output shaft 33 is transmitted through the coupling 34 and the shaft 29 to the sprocket wheels 30 and 30′ and drives the endless chains 37 and 37′ to travel vertically along the guide posts 26 and 26′, respectively. As the endless chains 37 and 37′ are thus driven to travel between the sprocket wheels 30 and 36 and between the sprocket wheels 30′ and 36′, the hoist assembly 38 as a whole is caused to move downwardly along the guide posts 26 and 26′ with the side body structure 2 suspended from the hanger 61, until the carrier block 46 reaches a predetermined lowermost position with respect to the frame structure. When the carrier block 46 is moved into the predetermined lowermost position, the air motor 31 is brought to a stop so that the carrier block 46 is held in the particular position thereof. The carrier block 46 being held in the predetermined lowermost position, the side body structure 2 suspended form the hanger 61 is held in the third predetermined position $B_3$ within the side-body assembling stage 7 (FIG. 1) as indicated by phantom lines in FIG. 2. Under these conditions, the movable platform 82 is maintained in the predetermined outermost lateral position on the stationary platform structure 79 as shown in FIG. 2 so that the jig carrier structure 102 (FIGS. 9 and 10) on the movable platform 82 is outwardly spaced apart from the side body structure 2 in the third predetermined position $B_3$ laterally of the frame structure. While the hoist assembly 38 is being moved downwardly as above described, the shuttle bar 6 ceases its movement and has the floor structure 1 held in the first predetermined position $F_1$ between the side-body assembling stages 7 and 7′ and the rear upper panel structure 5 held in the predetermined first position $R_1$ (FIG. 13) thereof in front of the floor structure 1 as shown in FIG. 1.

Figure 7:
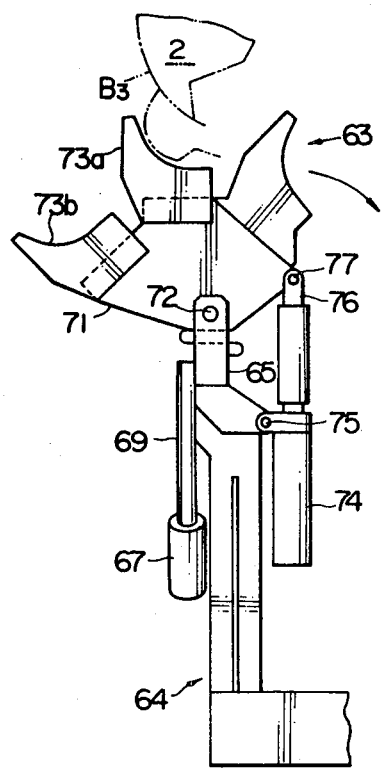
FIG. 7 is a side end view of the side-body position correcting means illustrated in FIG. 6.

In the meantime, the side-body position correcting means 63 illustrated in FIGS. 6 and 7 is maintained in a condition having the first power cylinder 67 held operative so that the piston rod 69 thereof is extended to hold the supporting block 65 in the first angular position thereof having the shift member 71 held in the upright position as indicated by full lines in FIG. 6. The vehicle body structure to be assembled being assumed to be of an automotive vehicle of the model "A", the second power cylinder 74 is maintained in a condition having the piston rod 76 retracted so that the shift member 71 is held in the first angular position about the pivot pin 72 as shown in FIG. 7. With the shift member 71 held in the first angular position thereof, the first stay member 73a is held in the position operative to receive a lower end portion of the side body structure 2 moved into the third predetermined position $B_3$ thereof. Thus, the side body structure 2 moved into the third predetermined position $B_3$ has its lower end portion received on the seat face of the first stay member 73a and is correctly maintained in the third predetermined position $B_3$ thereof with its upper end portion still retained to the hanger 61 on the carrier block 46 (FIGS. 4 and 5).

The side body structure 2 being thus correctly held in the third predetermined position $B_3$, the motor 84 on the stationary platform structure 79 (FIGS. 8, 9 and 10) is actuated to drive its output shaft 85 for rotation in one direction about the center axis thereof. The rotation of the output shaft 85 is transmitted through the coupling 86, reduction gear unit 87 and coupling 90 to the drive shaft 91 and further through the drive shaft 91 to the pinion gears 93 and 93′. Thus, the pinion gears 93 and 93′ are caused to drive the toothed rack members 94 and 94′, respectively, so that the movable platform 82 which has been maintained in the predetermined outermost lateral position on the stationary platform structure 79 is driven to move toward the shuttle bar 6 (FIGS. 2 and 3) with the slider blocks 83 of the movable platform 82 sliding on the guide plates 81. When the movable platform 82 reaches a predetermined interim lateral position between the predetermined outermost and innermost lateral positions thereof, the motor 84 is de-energized so that the movable platform 82 is brought to a stop in such an interim lateral position.

The vehicle body structure to be assembled being assumed to be of an automotive vehicle of the model "A", the jig carrier structure 102 is held in previously mentioned first upright position thereof having the support plate 103 facing inwardly of the frame structure as shown in FIGS. 8 and 9. The jig carrier structure 102 is locked in the first upright position thereof with the first front locking block 118 securely interposed between the front locking device 120 and the fixed clamping member 134 (FIG. 11) and with the first rear locking block 118′ securely interposed between the rear locking device 120′ and the fixed clamping member (not shown) secured to the rear upright frame 100′ on the movable platform 82, as will be seen from FIGS. 10 and 11. Since, furthermore, the vehicle body structure to be assembled is of an automotive vehicle of the sedan-type, the shifting arm 138 forming part of the first set of fixtures 135 is held in the angular position having the first fixture assembly 140 in the operative position thereof and, likewise, the shifting arm 157 forming part of the second set of fixtures 136 is held in the angular position having the first fixture assembly 157 held in the operative position thereof, as shown in FIGS. 8 and 9.

When the movable platform 82 is brought to a stop in the predetermined interim lateral position thereof as above described, the first and second power cylinders 144 and 145 of the first fixture assembly 140 are actuated so that the piston rod 147 of the first power cylinder 144 is caused to protrude and the piston rod 150 of the second power cylinder 145 is retracted. The clamping base member 141 which has been held in the first angular position is therefore caused to turn toward the second angular position thereof and, concurrently, the clamping hook member 151 which has also been held in the first angular position is caused to turn toward the second angular position thereof. As a consequence, the guide surface 154 of the lug portion 142 of the clamping base member 141 is brought into sliding contact with the outer surface of the upper end portion of the side body structure 2 in the third predetermined position $B_3$. On the other hand, the hook portion 155 of the clamping hook member 151 is brought into retaining engagement with the upper end portion of the side body structure 2. The upper end portion of the side body structure 2 is in these manners firmly gripped between the guide surface 154 of the clamping base member 141 and the hook portion 155 of the clamping hook member 151 when the clamping base member 141 and the clamping hook member 151 are turned into their respective second angular positions.

Simultaneously as the power cylinders 144 and 145 of the first fixture assembly 140 are actuated as described above, the the power cylinders 165 and 166 of the second fixture assembly 159 are actuated so that each of the piston rods 168 and 171 thereof is driven to protrude. Each of the clamping members 160 and 161 which have been held in their respective first angular positions spaced apart from the guide surface 164 of the shifting arm 157 is therefore turned toward the second angular position thereof about each of the pivot pins 162 and 163 on the shifting arm 157 which is locked on the bracket member 156. As the clamping members 160 and 161 are thus turned toward their respective second angular positions thereof, the clamping members 160 and 161 are brought into pressing engagement with a lower end portion of the side body structure 2 held in the third predetermined position $B_3$ thereof. The lower end portion of the side body structure 2 is in these manners held against the guide surface 154 of the shifting arm 157 and is firmly gripped between the first and second clamping members 160 and 161.

When the side body structure 2 held in the third predetermined position $B_3$ thereof is thus retained by the first and second fixture assemblies 140 and 159, the power cylinder 58 of the hoist assembly 38 (FIG. 4) is operated to have its piston rod 60 retracted upwardly, causing the hanger 61 to turn from the raised operative angular position back to the downwardly inclined inoperative angular position thereof. The hanger 61 is in this manner disengaged from the upper end portion of the side body structure 2, although the side body structure 2 is still received at its lower end on the seat face of the first stay member 73a of the side-body position correcting means 63 (FIG. 6).

The vehicle body to be assembled being assumed to be of an automotive vehicle of the model "A", the shiftable floor holder 178 of the floor-structure positioning means 173 illustrated in FIG. 12 is held in the previously mentioned first angular position and has the first support arm 180 held in the upright operative position thereof with the piston rod 183 of the auxiliary power cylinder 181 retracted downwardly as shown in FIG. 12. Furthermore, the main power cylinder 174 of the floor-structure positioning means 173 is held in a condition having the piston rod 175 also retracted downwardly and has the support plate 176 held in a lowermost position thereof below the floor structure 1 moved into the first predetermined position $F_1$ thereof on the shuttle bar 6 (FIG. 2). Simultaneously when the movable platform 82 (FIG. 10) is caused to move inwardly from the outermost lateral position, the power cylinder 174 of the floor-structure positioning means 173 (FIG. 12) is actuated to cause its piston rod 175 to axially extend upwardly and raises the support plate 176 from the lowermost position to a predetermined uppermost position below the floor structure 1 held in the first predetermined position $F_1$ thereof on the shuttle bar 6 (FIG. 2). It therefore follows that the first support arm 180 of the shiftable floor holder 178 held in the first angular position thereof is brought into abutting engagement at its upper end with the lower surface of floor structure 1 adjacent one side end of the floor structure 1 and thereby raises the floor structure 1 from the shuttle bar 6 until the floor structure 1 reaches the previously mentioned second predetermined position $F_2$ thereof above the shuttle bar 6.

On the other hand, the rear-upper-panel transfer means 185 illustrated in FIGS. 13 and 14 is maintained in a condition having the respective piston rods 188 and 198 of the power cylinders 187 and 195 retracted until the movable platform 82 (FIG. 10) is initiated into motion to move inwardly from the outermost lateral position thereof. The piston rod 188 of the power cylinder 187 being retracted, the swivel mechanism of the rear-upper-panel transfer mechanism 185 is in its entirety held in the predetermined lowermost position thereof below the rear upper panel structure 3 which has been conveyed into the first predetermined position $R_1$ thereof on the shuttle bar 6 as shown in FIG. 13. With the piston rod 198 of the power cylinder 195 held retracted, furthermore, the tiltable support block 192 is maintained in the horizontal first position thereof so that the panel carrier 201 is held in a horizontal position below the shuttle bar 6 as indicated by full lines in FIG. 13. Furthermore, the swivel mechanism is held in the previously mentioned first predetermined position having the first guide surface portion 202 of the panel carrier 201 located forwardly of the second guide surface portion 202, viz., below the rear upper panel structure 3 in the first predetermined position $R_1$ on the shuttle bar 6 as also indicated by the full lines in FIG. 13.

Simultaneously when the movable platform 82 (FIG. 10) is initiated into motion to move inwardly from the outermost lateral position thereof and, at the same time, the floor-structure positioning means 173 (FIG. 12) is put into operation as previously described, the power cylinder 187 of the rear-upper-panel transfer means 185 illustrated in FIGS. 13 and 14 is also actuated to cause its piston rod 88 to protrude and causes the swivel mechanism of the transfer means 173 to move upwardly from the lowermost position thereof. As the swivel mechanism is moved toward the predetermined uppermost position thereof, the panel carrier 201 of the swivel mechanism is brought into contact with the rear upper structure 3 on the shuttle bar and receives the panel structure 3 on the first guide surface portion 202 thereof. Immediately after the rear upper panel structure 3 is thus transferred to the panel carrier 201, the power cylinder 209 supported by the panel carrier 201 is actuated to cause its piston rod 211 to protrude and thereby causes the clamping member 205 to turn about the pivot pin 212 on the bracket portion 203 from the first angular position to the second angular position thereof, causing a portion of the rear upper panel structure 3 clamped between the clamping member 205 and the first guide surface portion 202 of the carrier block 201. The rear upper panel structure 3 being thus retained to the carrier block 201, the swivel mechanism including the carrier block 201 is brought to a stop in the predetermined uppermost position thereof with respect to the frame structure.

After the side body structure 2 is transferred to the fixture assemblies 140 and 159 (FIGS. 8 to 10) as previously described, the power cylinder 67 of the side-body position correcting means 63 is made inoperative so that the piston rod 69 is caused to be retracted and causes the supporting block 65, shift member 71 and stay members 73a and 73b to tilt downwardly as a single unit about the pivot pin 66 as indicated by dots-and-dash lines in FIG. 6. On the other hand, the air motor 32 of the side-body transfer means 18 illustrated in FIGS. 4 and 5 is actuated to drive its output shaft 33 for rotation in a reverse direction about the center axis thereof so as to cause the hoist assembly 30 to move upwardly from the lowermost position thereof by means of the endless chains 37 and 37'. When the hoist assembly 38 reaches the initial uppermost position thereof close to the support beams 25 and 25', the air motor 32 is brought to a stop so that the hoist assembly 38 is held in the uppermost position thereof.

After the hoist assembly 38 is thus withdrawn from the lowermost position thereof, the motor 84 (FIG. 10) is for a second time actuated so as to drive the movable platform 82 to further move inwardly from the previously mentioned predetermined interim lateral position toward the predetermined innermost lateral position thereof. While the movable platform 82 is thus being moved from the predetermined interim lateral position toward the predetermined innermost lateral position thereof, the carrier block 221 of the cowl-assembly transfer means 218 illustrated in FIGS. 15 and 16 is driven by the chains 226 and 226' to travel along the lateral guide rails 219 and 219' from a predetermined outside position to a predetermined position within a rear end portion of the frame structure as indicated by dots-and-dash lines in FIG. 3 with a cowl assembly 4 suspended from the clamp carrier plate 238. The cowl assembly 4 being assumed to be for an automotive vehicle of the model "A", the clamp carrier plate 238 is held in the first horizontal position having the first and second clamping assemblies 241 and 242 positioned below the clamp carrier plate 238 as shown in FIGS. 15 and 16. Thus, the cowl assembly 4 has its front end portion gripped between the end face of each of the bracket members 243 and the nip surface of each of the clamping members 244 with the piston rod 248 of each of the power cylinders 246 extended and its rear end portion gripped between the end face of each of the bracket members 250 and the nip surface of each of the clamping members 251 with the piston rod 255 of each of the power cylinders 253 extended. Furthermore, the power cylinder 228 is held in a condition having the piston rod 232 retracted upwardly and the power cylinder 233 having the bifurcated member 235 carried on the piston rod 234 thereof is held in a condition having the piston rod 234 retracted rearwardly. The clamp carrier plate 238 is thus held in the previously mentioned uppermost position with respect to the carrier block 221 and in the first longitudinal position with respect to the supporting block 230. When, furthermore, the carrier block 221 is moved from the predetermined outside position to the predetermined position within a rear end portion of the frame structure as above mentioned, the clamp carrier plate 238 is moved from the first predetermined lateral position to the second predetermined lateral position with respect to the guide rails 219 and 219' so that the cowl assembly 4 suspended therefrom is moved into the first predetermined position $C_1$ as indicated by dots-and-dash lined in FIG. 3.

While the cowl assembly 4 is being conveyed into the first predetermined position $C_1$ thereof by the travelling movement of the carrier block 221 along the guide rails 219 and 219', the motor 267 of the rear-waist-panel transfer means 257 illustrated in FIGS. 17 and 18 is switched in and drives the rollers 263 and 263' to roll on the upper faces of the extensions 259 and 259' of the curved guide rails 258 and 258', respectively, by means of the drive and driven gears 268 and 269. The carrier block 260 is therefore driven to travel along the guide rails 258 and 258' so that the clamp carrier plate 276 is moved from the first predetermined lateral position close to one side of the frame structure to the second predetermined lateral position above the floor structure 1 being moved upwardly by the first support arm 180 of the floor-structure positioning means 173 (FIG. 12). The clamp carrier plate 276 thus being moved to the second lateral position thereof with respect to the frame structure is assumed to be held in the first horizontal position having the first and second clamp assemblies 282 and 283 positioned below the carrier plate 276 as shown in FIGS. 17 and 18. A rear waist panel structure 5 for an automotive vehicle of the model "A" is suspended from these clamp assemblies 282 and 283 with an end portion of the panel structure 5 gripped between the end face of each of the bracket members 284 and the guide surface 291 of each of the clamping members 285 and with another portion of the panel structure 5 gripped between the end face of each of the bracket members 292 and the guide surface 299 of each of the clamping members 293 as shown in FIG. 18. Each of the power cylinders 287 and 295 of the clamp assemblies 282 and 283, respectively, is held in a condition having its piston rod extended. Furthermore, the power cylinder 270 is held in a condition having the piston rod 271 retracted upwardly so that the clamp carrier plate 276 is held in the predetermined uppermost position with respect to the carrier block 260.

When the support plate 176 of the floor-structure positioning means 173 (FIG. 12) reaches the predetermined uppermost position and as a consequence the floor structure 1 resting on the first supporting arm 180 on the support plate 176 is raised to the second predetermined postion $F_2$ above the shuttle bar 6 (FIG. 2), the power cylinder 174 is caused to cease operation. At the same time, the shuttle bar 6 is driven to move backwardly in a direction opposite to the direction of the arrow "a" in FIG. 1 into a predetermined rearmost longitudinal position thereof with respect to the frame structure. By this point of time, the movable platform 82 (FIG. 10) which has been being driven to move from the previously mentioned interim lateral position is moved into the innermost lateral postion thereof closest to the shuttle bar 6 and the motor 84 is brought to a stop. When the movable platform 82 is thus moved into the predetermined innermost lateral position thereof, the strikers 96 and 96' secured to the movable platform 82 are brought into abutting engagement with the shock absorbing units 96 and 96', respectively, on the stationary platform structure 79. The shocks produced by the movable platform 82 when the platform 82 is moved into the innermost lateral position thereof are thus dampened by the shock absorbing units 96 and 96'. When, furthermore, the movable platform 82 is brought to a stop in the innermost lateral position thereof, the hook members 98 and 98' also secured to the movable platform 82 are brought into engagement with the locking devices 97 and 97', respectively, on the stationary platform structure 79 so that the movable platform 82 is locked in the predetermined innermost lateral position with respect to the shuttle bar 6 (FIGS. 2 and 3). The side body structure 2 supported by the fixture assemblies 140 and 159 is thus correctly held in the fourth predetermined position $B_4$ (FIG. 2) thereof with respect to the floor structure 2 in the second predetermined position $F_2$ and is ready to be assembled to the floor structure 1. When the movable platform 82 is being moved toward the innermost lateral position thereof, the side-body position correcting means 63 (FIGS. 6 and 7) having the shift member 71 and stay members 73a and 73b in the downwardly inclined positions thereof as indicated by the dots-and-dash lines in FIG. 6 is in its entirety located intermediate between the movable platform 82 and the fixture assembly 159 on the jig carrier structure 102 and thus allows the jig carrier structure 102 to advance toward the shuttle bar 6 without being interfered by the position correcting means 63. Similarly, the hoist assembly 38 of the side-body transfer means 18 (FIGS. 4 and 5) has been raised into the initial uppermost position thereof and permits the jig carrier structure 102 to advance toward the shuttle bar 6 without being interfered by the hoist assembly 38.

While the movable platform 82 is being moved toward the innermost lateral position thereof, the power cylinder 195 of the rear-upper-panel transfer means 185 illustrated in Figs. 13 and 14 is actuated to cause its piston rod 198 to extend. The swivel mechanism having the rear upper panel 3 held in the first predetermined position $R_1$ thereof is thus caused to turn upwardly about the pivot pins 193 on the bracket members 191 and 191'. The support block 192 is therefore caused to turn through the angle of 90 degrees from the horizontal first position to the upright second position thereof so that the panel carrier 201 is moved into a vertical position as indicated by dots-and-dash lines in FIG. 13 and has the rear upper panel 3 located adjacent the upper end of the panel carrier 201. The rear upper panel 3 is thus held in the second predetermined position $R_2$ with respect the floor structure 1 held in the second predetermined position $F_2$ thereof and is ready to be assembled to the floor structure 1.

Simultaneously when the swivel mechanism of the rear-upper-panel transfer means 185 is turned as above described, the power cylinder 233 of the cowl-assembly transfer means 218 illustrated in FIGS. 15 and 16 is actuated to cause its piston rod 234 to protrude with respect to the supporting block 230 so that bifurcated member 235 and accordingly the clamp carrier plate 238 are moved forwardly away from the supporting block 230 along the guide rods 237. The cowl assembly 4 suspended from the clamp members 241 and 242 below the clamp carrier plate 238 and held in the first predetermined position $C_1$ is therefore moved forwardly of the frame structure and reaches the second predetermined position $C_2$ (FIG. 3) above a front end portion of the floor structure 1 held in the second predetermined position $F_2$. Subsequently, the power cylinder 228 supported on the carrier block 221 is actuated to cause its piston rod 229 to protrude downwardly and cause the supporting block 230, bifurcated member 235 and clamp carrier plate 238 to move downwardly with respect to the carrier block 221. As a consequence, the cowl assembly 4 is further moved downwardly from the position $C_2$ to the third predetermined position $C_3$ (FIG. 3) with respect to the floor structure 1 in the second predetermined position $F_2$ and is ready to be assembled to the floor structure 1.

Simultaneously when the power cylinder 228 of the cowl-assembly transfer means 218 is actuated as described above, the power cylinder 270 of the rear-waist-panel transfer means 257 shown in FIGS. 17 and 18 is actuated to cause its piston rod 271 to protrude downwardly and causes the bifurcated member 272 to move downwardly along the guide rods 275 and 275'. The clamp carrier plate 276 is thus moved downwardly until the rear waist panel structure 5 suspended from the clamp assemblies 282 and 283 reaches a predetermined position with respect to the floor structure 1 held in the second predetermined position $F_2$ thereof and is ready to be assembled to the floor structure 1.

The floor structure 1, the side body structure 2 and 2', rear upper panel 3, cowl assembly 4 and rear waist panel structure 5 are now made ready to be assembled together and are spot welded to one another by the welding units 305 and 305' of the welding means 300 illustrated in FIG. 19.

Upon completion of the welding process, the power cylinders 144 and 145 of the fixture assembly 140 and the power cylinders 165 and 166 of the fixture assembly 159 (FIGS. 8 to 10) are operated to cause the piston rod 147 of the power cylinder 144 to protrude and the respective piston rods 150, 168 and 171 of the power cylinders 145, 165, and 166 to be retracted. The piston rods 147 and 150 of the power cylinders 144 and 145 being thus extended and retracted, respectively, the clamping base member 141 is caused to turn from the second angular position back to the first angular position thereof about the pivot pin 143 and, likewise, the clamping hook member 151 is caused to turn from the second angular position back to the first angular position thereof about the pivot pin 153. With the piston rods 168 and 171 retracted as above described, furthermore, the clamping members 160 and 161 are caused to turn from their respective second angular positions back to their respective first angular positions about the pivot pins 162 and 163 on the shifting arm 157. The side body structure 2 which has been assembled to the floor structure 1 is consequently released from the clamp assemblies 140 and 159. On the other hand, each of the power cylinders 209 of the rear-upper-panel transfer means 185 (FIGS. 13 and 14) is operated to cause its piston rod 211 to be retracted. Each of the clamping members 205 is thus caused to turn from the second angular position thereof back to the first angular position thereof about each of the pivot pins 206 so that the rear upper panel 3 assembled to the floor structure 1 and side body structures 2 and 2' is released from the clamping members 205. Furthermore, the power cylinders 246 and 253 of the cowl-assembly transfer means 218 (FIGS. 15 and 16) are operated to cause their respective piston rods 248 and 255 to be retracted so as to cause the clamping members 244 and 251 to turn from their respective second angular positions back to their respective first angular positions about the pivot pins 245 and 252, respectively. The cowl assembly 4 which has been assembled to the floor structure 1 and side body structures 2 and 2' is thus released from the clamp assemblies 241 and 242. In the rear-waist-panel transfer means 257 (FIGS. 17 and 18), the power cylinders 287 and 295 are operated to cause their respective piston rods 289 and 297 to be retracted, causing the clamping members 285 and 293 to turn from their respective second angular positions back to thier respective first angular positions about the pivot pins 286 and 294, respectively. The rear waist panel structure 5 which has been assembled to the floor structure 1 and side body structures 2 and 2' is thus released from the clamp assemblies 282 and 283.

The power cylinders 187 and 195 of the rear-upper-panel transfer means 185 (FIGS. 13 and 14) are thereafter operated to have their respective piston rods 188 and 198 retracted. As a consequence, the swivel mechanism including the panel carrier 201 disengaged from the rear upper panel 3 is caused to turn downwardly about the pins 193 while being moved downwardly toward the pedestal 186 and is thus moved into the initial lowermost position thereof with the tiltable support block 192 turned from the upright second position back to the horizontal first position thereof with respect to the lift plate 189 as shown in FIGS. 13 and 14.

Simultaneously when the swivel mechanism of the rear-upper-panel transfer means 185 is thus initiated into motion to move back to the initial position thereof, the power cylinder 270 of the rear-waist-panel transfer means 257 (FIGS. 17 and 18) is operated to cause its piston rod 271 to be retracted so that the bifurcated member 272 having the clamp carrier plate 276 disengaged from the rear waist panel structure 5 is raised toward the carrier block 260 until the clamp carrier plate 276 reaches the initial uppermost position thereof with respect to the carrier block 260. Simultaneously when the power cylinder 270 is thus operated, the motor 267 is switched in to drive its output shaft for rotation in a reverse direction about the center axis thereof. The rotation of the output shaft of the motor 267 is transmitted through the gears 268 and 269 to the shaft 262 and causes the rollers 263 and 263' to roll on the respective extensions 259 and 259' of the guide rails 258 and 258'. The clamp carrier plate 276 is thus moved along the curved guide rails 258 and 258' back to the initial first lateral position thereof while being moved upwardly toward the carrier block 260. When the carrier block 260 reaches the position having the clamp carrier plate 276 in the first lateral position thereof, the motor 267 is brought to a stop and accordingly the clamp carrier plate 276 is held in the particular position.

In the cowl-assembly transfer means 218 (FIGS. 15 and 16), the power cylinder 228 is operated to cause its piston rod 232 to be retracted upwardly with respect to the carrier block 221 and, concurrently, the power cylinder 233 is operated to cause its piston rod 234 to be retracted rearwardly with respect to the supporting block 230. The supporting block 230, power cylinder 233, bifurcated member 235 and clamp carrier plate 238 disengaged from the cowl assembly 4 are thus moved as a single unit upwardly toward the carrier 221 and, furthermore, the bifurcated member 235 and the clamp carrier plate 238 are rearwardly moved as a single unit toward the supporting block 230. The clamp carrier plate 238 is in these manners moved from the lowermost position back to the uppermost position thereof with respect to the carrier block 221 and from the second predetermined longitudinal position back to the first longitudinal position thereof with respect to the supporting block 230. Simultaneously when the clamp carrier plate 238 is being thus moved with respect to the carrier block 221 and the supporting block 230, the chains 226 and 226' are driven to travel in a direction to move the carrier block 221 to the position having the clamp carrier plate 238 in the first lateral position thereof in the vicinity of one side end of the frame structure. Furthermore, the hook members 98 and 98' attached to the movable platform 82 (FIG. 10) are disengaged from the locking devices 97 and 97', respectively, on the stationary platform structure 79. The air motor 84 is put into operation driving its output shaft 85 for rotation in a reverse direction about the center axis thereof. The rotation of the output shaft 85 is transmitted through the coupling 86, reduction gear unit 87 and coupling 90 to the drive shaft 91 and causes the rack members 94 and 94' to be moved together with the movable platform 82 laterally outwardly of the frame structure by the pinion gears 93 and 93' on the drive shaft 91. The movable platform 82 is thus driven to move from the innermost lateral position back to the outermost lateral position thereof on the stationary platform structure 79. When the movable platform 82 reaches the outermost lateral position thereof, the strikers 96 and 96' also attached to the movable platform 82 are brought into abutting engagement with the shock absorbing units 95 and 95', respectively, and cause the shock absorbing units 95 and 95' not only to stop the movable platform 82 in the outermost lateral position thereof but to dampen the shocks produced by the stoppage of the platform 82. Thereupon, the main power cylinders 174 of the floor-structure positioning means 173 shown in FIG. 12 are operated to cause their respective piston rods 175 to retract concurrently so as to cause the support plate 176 to move downwardly toward the floor surface 8. On the first support arms 80 of the shiftable floor holders 178 is carried an assembly (not shown) of a vehicle body composed of the floor structure 1, side body structures 2 and 2', rear upper panel 3, cowl assembly 4 and rear waist panel structure 5 which have been held together as previously described. As the support plate 176 is moved downwardly, the vehicle body assembly is placed on the shuttle bar 6 and is transferred to the shuttle bar 6 when the support plate 176 is moved below the shuttle bar 6. The shuttle bar 6 is then driven to advance forwardly in the direction of the arrow "a" in FIG. 1 so that the vehicle body assembly is moved from the position between the side-body assembling stages 7 and 7' to a predetermined position S so as to be transferred to a subsequent stage of the assembly line. While the vehicle body assembly is being thus conveyed to the position S, another floor structure 1' is conveyed on the shuttle bar 6 to the position between the side-body assembling stages 7 and 7' with a rear upper panel 3' positioned in front of the floor structure 1' as shown in FIG. 1. In the meantime, the power cylinder 67 of the side-body position correcting means 63 (FIGS. 6 and 7) is actuated to cause its piston rod 69 to protrude so as to cause the supporting block 65 to turn about the pivot pin 66 from the downwardly inclined second angular position back to the first angular position having the shift member 71 and stay members 73a and 73b held in the upright positions thereof.

The apparatus embodying the present invention is now ready to assemble another body structure of a sedan-type automotive vehicle of the model "A". If, in this instance, the body structure to be assembled in the subsequent cycle of operation is for a hardtop-type vehicle of the model "A", the first and second sets of fixtures 135 and 136 on the support plate 103 of the jig carrier structure 102 (FIGS. 8 to 10) are automatically re-conditioned accordingly under the control of the central computer or through detection of the change of the type of the vehicle body structure to be assembled. In the first set of fixtures 135 on the support plate 103, the shifting arm 138 is driven to make a half turn about the pivot pin 139 so that the first fixture assembly 140 is moved into the inoperative position closer to the jig carrier structure 102 and, in turn, the second fixture assembly 140' is moved into the operative position directed toward the shuttle bar 6 (FIGS. 2 and 3). Likewise, the shifting arm 157 of the second set of fixtures 136 on the support plate 103 is driven to make a half turn about the pivot pin 158 so that the second fixture assembly 159' is moved into the operative position directed to the shuttle bar 6 and the first fixture assembly 159 is moved into the inoperative position closer to the jig carrier structure 102.

If, on the other hand, a body structure for an automotive vehicle of the model "B" is to be assembled subsequently to a cycle of operation in which a body structure for a vehicle of the model "A", the apparatus shown in FIGS. 2 to 19 is re-conditioned as follows.

In the first place, the power cylinder 74 of the side-body position correcting means 63 (FIGS. 6 and 7) is operated to cause its piston rod 76 to be retracted downwardly. This causes the shift member 71 to turn about the pivot pin 77 from the first angular position indicated in FIG. 7 to the second angular position having the second stay member 73b held in the position operative to receive a lower end portion of a side body structure for an automotive vehicle of the model "B".

On the other hand, each of the power cylinders 122 and 122' on the support frames 100 and 100' (FIG. 10) is operated to cause its piston rod 124 (FIG. 11) to be retracted. This causes the first and second link members 125 and 127 of each of the locking devices 120 and 120' to turn away from each of the support frames 100 and 100' about the pivot pins 131 and 128, respectively. The turning motion of the link member 125 is transmitted to the third link member 130, which is accordingly caused to turn from the first angular position to the second angular position thereof about the pivot pin 132. The third link member 130 being thus caused to turn away from the clamping member 134, each of the first locking blocks 118 and 119 (FIG. 10) on the jig carrier structure 102 is disengaged from the pressing member 133 and makes the jig carrier structure 102 ready to turn about the axis of rotation thereof with respect to the movable platform 82. The air motor 109 is then put into operation to drive the jig carrier structure 102 to make a half turn about the axis of rotation thereof from the first upright position to the second uptight position having the support plate 102' on the inner side thereof. When the jig carrier structure 102 is thus turned, the second striker arms 114 and 114' on the jig carrier structure 102 are brought into abutting engagement with the resilient blocks 117 and 117' of the front and rear shock absorbing units 115 and 115', respectively, on the movable platform 82 so that not only the jig carrier structure 102 is brought to a stop in the second upright position thereof but the shocks produced by the turning motion of the jig carrier structure 102 are dampened by the resilient blocks 117 and 117'. With the jig carrier structure 102 turned into the second upright position thereof, furthermore, the second locking blocks 118' and 119' on the carrier structure 102 are located at the lower end of the carrier structure 102. Each of the power cylinders 122 and 122' of the locking devices 120 and 120' is then actuated to cause its piston rod 124 (FIG. 11) to protrude, causing the first and second link members 125 and 127 of each locking device to turn toward each of the support frames 100 and 100' about the pivot pins 131 and 128, respectively. The turning motion of the first link member 125 is transmitted to the third link member 130, which is accordingly caused to turn about the pivot pin 132 from the second angular position back to the first angular position thereof. The pressing member 133 is therefore brought into pressing engagement with each of the locking blocks 118 and 118' (FIG. 10). Each of the second locking blocks 118' and 119' is thus firmly seized between the pressing member 133 of each of the locking devices 120 and 120' and each of the clamping members 134 and, as a consequence, the jig carrier structure 102 is locked in the second upright position thereof. The jig carrier structure 102 being held in the second upright position thereof, the first and second sets of fixtures 135' and 136' (FIG. 10) are positioned on the inner side of the jig carrier structure 102 and are made operable for manipulating a side body structure for a sedan-type or hardtop-type automotive vehicle of the model "B".

In the floor-structure positioning means 173 (FIG. 12), on the other hand, the power cylinder 181 on each of the bracket members 177 is operated to cause its piston rod 183 to protrude. This causes the shiftable floor holder 178 to turn through the angle of 90 degrees about the pivot pin 179 from the first angular position indicated in FIG. 12 to the second angular position having the first support arm 180 held in the horizontal inoperative position thereof and the second support arm 180' held in the upright operative position thereof. The second support arm 180' of the floor holder 178 is thus made operable for having received on its upper edge a lower surface portion of a floor structure for an automotive vehicle of the model "B". In the rear-upper-panel transfer means 185 (FIGS. 13 and furthermore, the motor 217 is actuated so that the swivel mechanism including the swivel post 200 and panel carrier 201 is driven to make a half turn about the center axis of the swivel post 200 from the first predetermined position indicated in FIG. 13 to the second predetermined position having the second guide surface portion 202' of the panel carrier 201 located forwardly of the first surface portion 202. The panel carrier 201 is thus made operable for having received on the second guide surface portion 202' thereof a rear upper panel for an automotive vehicle of the model "B".

In the cowl-assembly transfer means 218 (FIGS. 15 and 16), the motor 240 is actuated to drive the clamp carrier plate 238 to make a half turn about the pins 239 and 239' from the first horizontal position shown in FIGS. 15 and 16 to the second horizontal position having the first and second clamp assemblies 241' and 242' located below the clamp carrier plate 238. The clamp assemblies 241' and 242' are thus made operable for manipulating a cowl assembly for an automotive vehicle of the model "B".

In the rear-waist-panel transfer means 257 (FIGS. 17 and 18) is actuated the motor 279 mounted on the arm portion 274 of the bifurcated member 272. This causes the clamp carrier plate 276 to make a half turn about the pins 277 and 277' from the first horizontal position shown in FIGS. 17 and 18 to the second horizontal position having the clamp assemblies 282' and 283' located below the clamp carrier plate 276. The clamp assemblies 282' and 283' are thus made operable for manipulating a rear waist panel structure 5 for an automotive vehicle of the model "B".

In the foregoing description, it has been assumed that the jig carrier structure 102 (FIGS. 8 to 10) is turned between the first and second upright positions thereof in response to a change between the models "A" and "B" of the vehicle body structure to be assembled and that either the first clamp assemblies or the second clamp assemblies of the first and second sets of fixtures on each support plate of the jig carrier structure 102 are selectively put to use depending upon the type of the vehicle body structure to be assembled. If desired, however, the apparatus emvodying the present invention may be used in such a manner that the jig carrier structure 102 is turned between the two upright positions thereof in response to a change between the types of the vehicle body structures to be assembled and that either the first clamp assemblies or the second clamp assemblies of the first and second sets of fixtures on each support plate of the jig carrier structure 102 are put to use depending upon the model of the vehicle body structure to be assembled. Alternatively, the apparatus embodying the present invention may be used in such a manner that the jig carrier structure 102 is turned from one of the two upright positions thereof to the other in response to a change from, for example, the model "A" of the sedan type to the model "B" of the hardtop type or conversely from the model "B" of the hardtop type to the model "A" of the sedan type.

While, furthermore, the jig carrier structure 102 is arranged to be pivotally movable between the two upright positions above the movable platform 82 (FIG. 10), the side-body positioning means of the apparatus embodying the present invention may be modified in such a manner that the jig carrier plate 102 is rotatable between two inclined or horizontal positions having the first and second sets of fixtures on one of the support plates of the jig carrier structure positioned below the carrier structure and the first and second sets of fixtures on the other support plate positioned above the jig carrier structure.

The jig carrier structure 102 per se has been described as having two parallel support plates 103 and 103' but may be modified to have three or more support plates each carrying thereon first and second sets of fixtures similar to the first and second sets of fixtures 135 and 136 on the support plate 103 (FIGS. 8 and 9).

Figure 20:
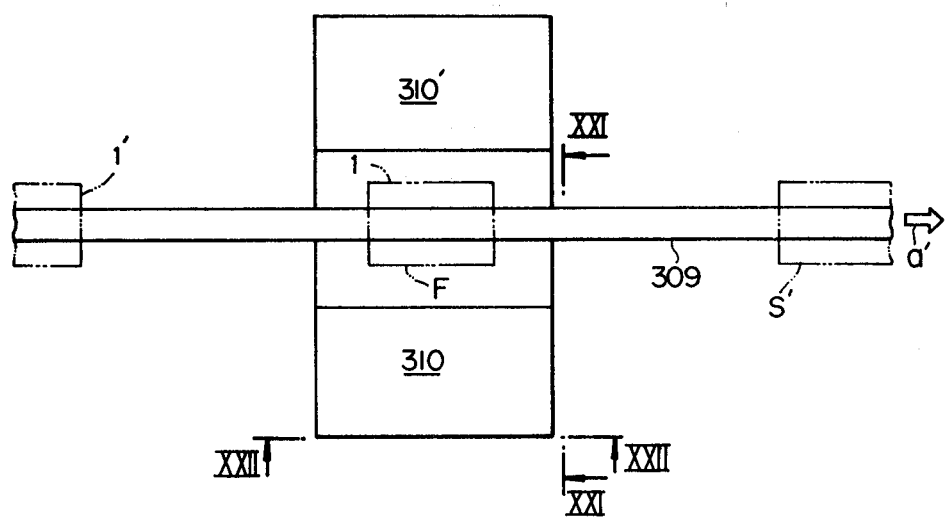
FIG. 20 is a schematic plan view showing an assembling station in conjunction with which a second embodiment of the apparatus according to the present invention is arranged.

A second embodiment of the apparatus according to the present invention is illustrated in FIGS. 20 to 28. As shown in FIG. 20, the second embodiment of the present invention comprises floor-structure carrier means constituted by an elongated shuttle bar 309 adapted to move back and forth longitudinally with a floor structure 1 to form part of a vehicle body structure carried thereon. The shuttle bar 309 extends longitudinally through an assembling station composed of a pair of side-body assembling states 310 and 310' located on both side of the shuttle bar 309 and a stationary platform structure 311 provided between the side-body assembling states 310 and 310'. The shuttle bar 309 extends longitudinally above the stationary platform structure 311 and is operative to convey the floor structure 1 into a predetermined position f above the platform structure 311.

Figure 21:
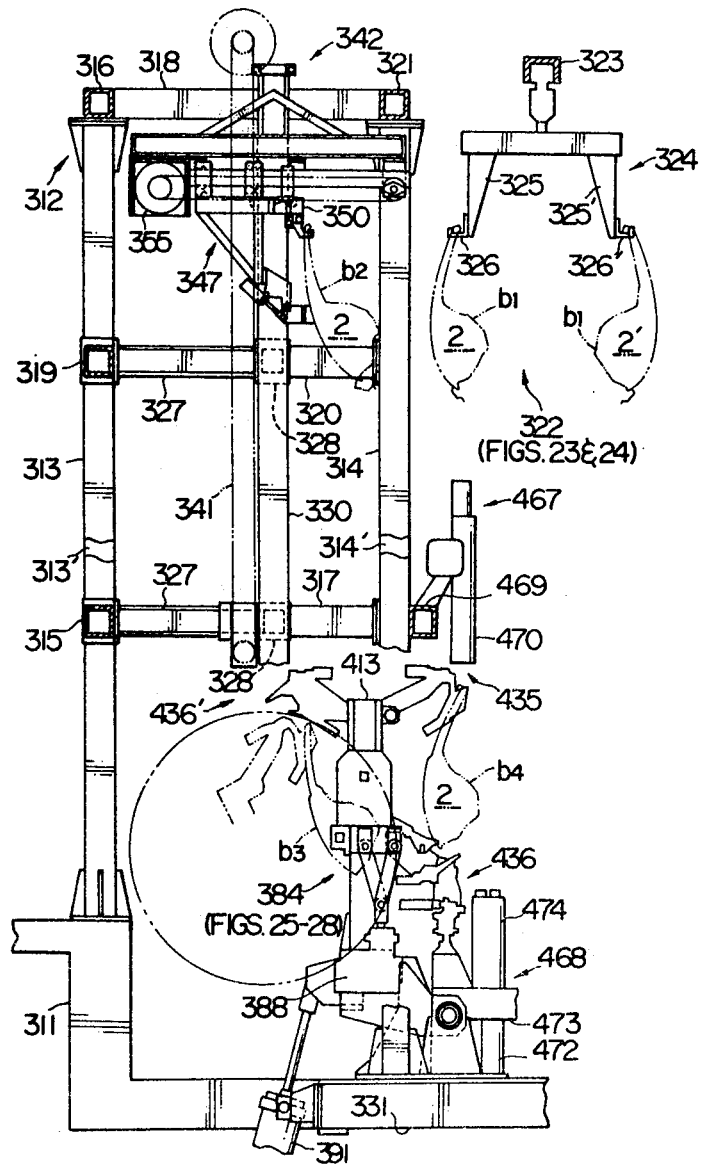
FIG. 21 is a front elevation view of the second embodiment of the apparatus according to the present invention with some members and structures partially shown or omitted from the illustration, the apparatus being viewed in a direction indicated by arrows XXI—XXI in FIG. 20.
Figure 22:
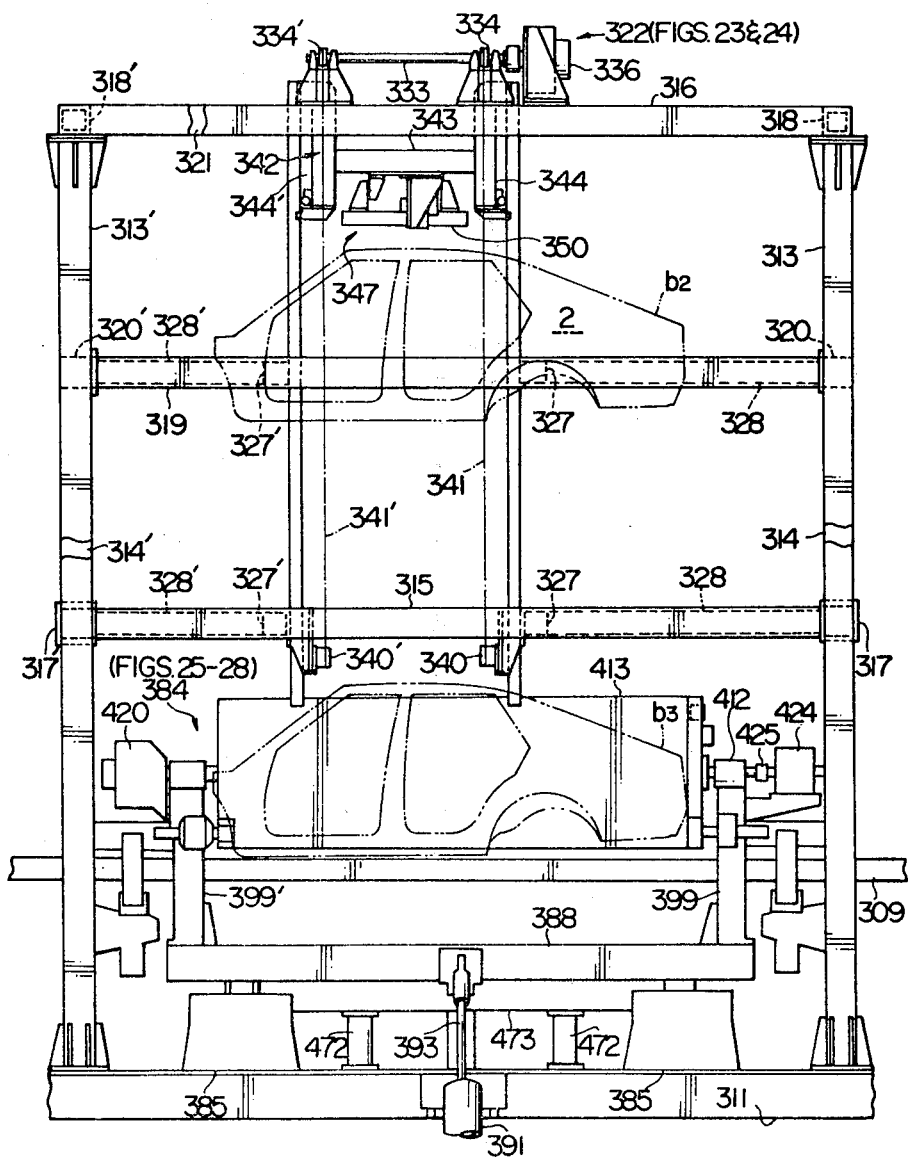
FIG. 22 is a side elevation view of the second embodiment of the apparatus according to the present invention with some members and structures partially shown or omitted from the illustration, the apparatus being viewed in a direction indicated by arrows XXII—XXII in FIG. 20.

Turning to FIGS. 21 and 22, the assembling station is skeltonized by a frame structure 312 having longitudinal measurements in directions parallel with the directions of movement of the shuttle bar 309 and lateral measurements transverse to the directions of movement of the shuttle bar 309.

As will be seen from FIGS. 21 and 22, the frame structure 312 comprises a pair of upright front outer columns 313 located at the front end of the frame structure, a pair of upright rear outer columns 313' located at the rear end of the frame structure, a pair of upright front inner columns 314 located between the front outer columns 313, and a pair of upright rear inner columns 314' located between the rear outer columns 313' The columns 313, 313', 314 and 314' upwardly terminate at the upper end of the frame structure 312 end are secured at their respective lower ends to the stationary platform structure 311 by means of suitable footings.

The frame structure 312 further comprises a pair of horizontal lower side beams 315, a pair of horizontal upper side beams 316, a horizontal lower front beam 317, a horizontal lower rear beam 317', a horizontal upper front beam 318, and a horizontal upper rear beam 318'. Each of the lower side beams 315 spans between the two front and rear outer columns 313 and 313' on each side of the frame structure 312 and is securely connected at one longitudinal end thereof to one of the two outer columns 313 and 313' and at the outer longitudinal end thereof to the other of the columns 313 and 313'. Each of the upper side beams 316 also spans between the two front and rear outer columns 313 and 313' on each side of the frame structure 312 and are securely connected at the opposite longitudinal ends thereof to the upper ends of the columns 313 and 313'. On the other hand, the lower front beam 317 spans between the two front outer columns 313 and is securely connected at one longitudinal end thereof to one of the columns 313 and at the other longitudinal end thereof to the other of the columns 313. Likewise, the lower rear beam 13' spans between the two rear outer columns 313' and is securely connected at one longitudinal end thereof to one of the rear outer columns 313' and at the other longitudinal end thereof the other of the columns 313'The front inner columns 314 are securely connected at the upper ends thereof to the upper front beam 318 and, likewise, the rear inner columns 314' are securely connected at the upper ends thereof to the upper rear beam 318'. Furthermore, the upper front beam 318 spans between the upper side beams 316 and is securely connected at the opposite longitudinal ends thereof to respective front end portions of the upper side beams 316. Similarly, the upper rear beam 318' spans between the upper side beams 316 and is securely connected at the opposite longitudinal ends thereof to respective rear end portions of the upper side beams 316.

The frame structure 12 further comprises a pair of horizontal intermediate side beams 319, a horizontal inter-mediate front beam 320 and a horizontal intermediate rear beam 320'Each of the intermediate side beams 319 is located intermediate between the lower and upper side beams 315 and 316 on one side of the frame structure 312 and extends between the front and rear outer columns 313 and 313'. The intermediate front beam 320 is located intermediate between the lower and upper front beams 317 and 318 and extends between the two front outer beams 313. Likewise, the intermediate rear beam 320' is located intermediate between the lower and upper rear beams 317' and 318' and extends between the two rear outer beams 313'The intermediate front beam 320 has two intermediate portions securely connected to the front inner columns 314 and, similarly, the intermediate rear beam 320' has two intermediate portions securely connected to the rear inner columns 314'. The frame structure 312 further comprises a pair of horizontal upper inner beams 321 each spanning between the upper front and rear beams 318 and 318' and securely connected each at one end thereof to the upper ends of the front inner columns 314, respectively, and at the other ends thereof to the upper end of the rear inner columns 314', respectively.

The second embodiment of the present invention further comprises side-body transfer means 322 for conveying each of the side body structures 2 of a vehicle body into a predetermined position with respect to the floor structure 1 moved into a second predetermined position from the previously mentioned first predetermined position f thereof as will be described.

Figure 23:
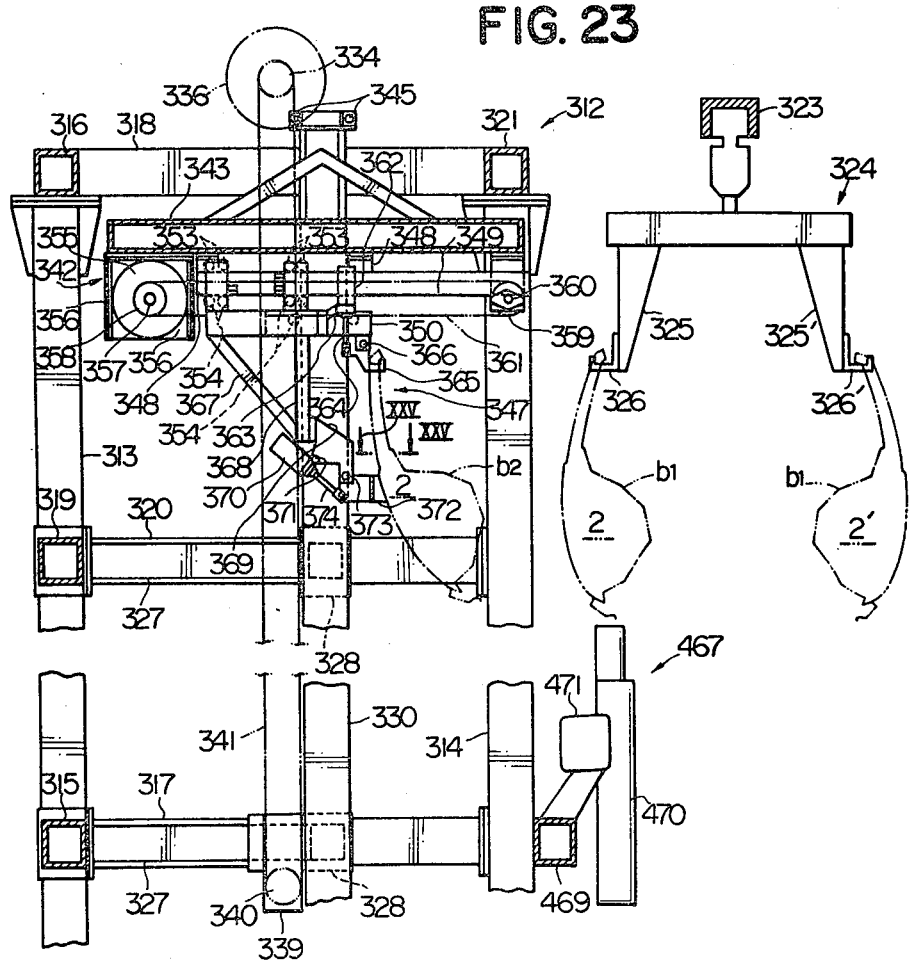
FIG. 23 is a front end view showing side-body transfer means forming part of the second embodiment of the apparatus according to the present invention.

As illustrated in FIG. 23, the side-body transfer means 322 comprises an elongated guide rail 323 extending above and in parallel with the shuttle bar 309, and a hanger assembly 324 suspended from and movable along the guide rail 323. The hanger assembly 324 comprises a pair of hanger arms 325 and 325' which form part of the previously mentioned side-body assembling stages 310 and 310', respectively. The hanger arms 325 and 325' have hook members 326 and 326', respectively, which are adapted to have the side body structures 2 and 2' of a vehicle body detachably suspended therefrom. Thus, the hanger assembly 20 is adapted to convey a side body structure 2 of a vehicle body to a first pre-determined position $b_1$ indicated by dots-and-dash lines in FIG. 23 during each cycle of operation of the assembling apparatus.

As will be seen from FIGS. 23 and 24, the side-body transfer means 322 further comprises, in the side-body assembling stage 310, a pair of lateral cantilevers 327 and 327' projecting inwardly from the inner side face of one of the lower side beams 315, and a pair of longitudinal cantilevers 328 and 328' projecting inwardly from the rear and front faces of the lower front and rear beams 317 and 317', respectively. Each of the lateral cantilevers 327 and 327' and each of the longitudinal cantilevers 328 and 328' have respective leading end portions securely conjoined together. A pair of horizontal support beams 329 and 329' span between the two upper side beams 12 and overlie the above mentioned lateral cantilevers 327 and 327', respectively. A pair of vertical guide posts 330 and 330' are securely connected each at one end thereof to the lower faces of the support beams 329 and 329', respectively and downwardly extend respectively toward the combination of the cantilevers 327 and 328 and the combination of the cantilevers 327' and 328'. One guide post 330 has a lower end portion securely connected to the conjoined end portions of the cantilevers 327 and 328 and, likewise, the other guide post 330 has a lower end portion securely connected to the conjoined end portions of the cantilevers 327' and 328'. The respective lower end portions of the guide posts 330 and 330' slightly project downwardly from the conjoined end portions of the cantilevers 327 and 328 and the conjoined end portions of the cantilevers 327' and 328'. Though not shown in the drawings, structural members respectively similar to the above described cantilevers 327, 327', 328 and 328' and guide posts 330 and 330' are provided in the other side-body assembling stage 310'.

As will be best seen from FIG. 24, the side-body transfer means 322 in the assembling stage 310 further comprises a pair of bracket members 331 and 331' securely mounted on the upper faces of the above mentioned support beams 329 and 329', respectively. The bracket members 331 and 331' have supported thereon bearing units 332 and 332', respectively, in which a shaft 333 is journaled adjacent the opposite axial ends thereof. The shaft 333 extends in a direction parallel with the upper side beams 316 and has a pair of sprocket wheels 334 and 334' securely mounted on opposite end portions thereof and arranged to have respective axes of rotation alinged with the center axis of the shaft 333. The support beam 329 has further mounted thereon a bracket member 335 on which an air motor 336 is mounted. The air motor 336 has an output shaft 337 connected to the shaft 333 by a coupling 338 so that the shaft 333 is driven for rotation about the center axis thereof when the air motor 336 is in operation. The guide posts 330 and 330' have bracket members 339 and 339', respectively, securely mounted on the lower end portions thereof. Sprocket wheels 340 and 340' are mounted on these bracket members 339 and 339', respectively, in such a manner as to be rotatable about axes aligned with each other and parallel with the axis of rotation of the upper sprocket wheels 334 and 334', respectively. An endless chain 341 is passed between the sprocket wheels 334 and 340 and, likewise, an endless chain 341' is passed between the sprocket wheels 334' and 340'.

The sprocket wheels 334 and 334', shaft 333, air motor 336, sprocket wheels 340 and 340' and endless chains 341 and 341' constitute in combination drive means for a hoist assembly 342 which forms part of the side-body assembling means 322. In FIGS. 21 to 24, the hoist assembly 342 is shown comprising a horizontal support block 343 having front and rear end faces respectively secured to vertical guide frames 344 and 344' spaced apart from each other in parallel with the upper side beam 316. The guide frame 344 has carried thereon guide rollers 345 rollable on the opposite side faces of the guide post 330 and guide rollers 346 rollable on the rear face of the guide post 346. The other guide frame 344' also has carried thereon guide rollers 345' rollable on the opposite side faces of the guide post 330' and guide rollers 346' rollable on the front face of the guide post 330'. The endless chains 341 and 341' are connected each at one point thereof to the guide frames 344 and 344', respectively, by suitable anchor means (not shown) so that the hoist assembly 342 is movable upwardly or downwardly with respect to the stationary guide posts 330 and 330' when the air motor 336 is in operation driving the endless chains 341 and 341' to travel along the guide posts 330 and 330', respectively.

The hoist assembly 342 further comprises carrier means 347 for moving the side body structure 2 of a vehicle body in a lateral direction of the frame structure 312. The carrier means 347 comprises a pair of bracket members 348 (FIGS. 23 and 24) depending from the lower face of the support block 343 and spaced apart in parallel from each other in a lateral direction of the frame structure 312, and a pair of bracket members 348' (FIG. 23) depending from the lower face of the support block 343 and rearwardly spaced apart from the bracket members 348, respectively. The bracket members 348 have securely attached thereto a lateral guide rail 349 and, likewise, the bracket members 348' have securely attached thereto a lateral guide rail 349'. The guide rails 349 and 349' extend in lateral directions of the frame structure and are spaced apart in parallel from each other between the above mentioned guide frames 344 and 344'. A carrier block 350 is horizontally positioned below these guide rails 349 and 349' and has secured thereto a pair of bracket members 351 (FIG. 5) upstanding from the carrier block 46 and spaced apart in parallel from each other in a lateral direction of the frame structure 312 and a pair of bracket members 351' upstanding from the carrier block 350 and rearwardly spaced apart from the bracket members 351, respectively. The bracket members 351 are engaged by the guide rail 349 by guide rollers carried on the bracket members 351 and consisiting of guide rollers 352 rollable on the front face of the guide rail 349, guide rollers 353 rollable on the upper face of the guide rail 349 and guide rollers 354 rollable on the lower face of the lower face of the guide rail 349. Likewise, the bracket members 351' are engaged by the guide rail 349' by guide rollers which are carried on the bracket members 351' and which consist of guide rollers 352' rollable on the rear face of the guide rail 349', guide rollers 353' rollable on the upper face of the guide rail 349' and guide rollers 354' rollable on the lower face of the guide rail 349'. To a laterally outer end portion of the lower face of the support block 343 is secured an air motor 355 by means of bracket members 356. The air motor 355 has an output shaft 357 on which a sprocket wheel 358 is coaxially mounted. The sprocket wheel 358 is provided in association with a sprocket wheel 359 rotatably mounted on a bracket member 360 secured to a laterally inner end portion of the lower face of the support block 343. The sprocket wheels 358 and 359 are aligned with each other in a lateral direction of the frame structure and have passed therebetween an endless chain 361 which is thus horizontally movable back and forth in lateral directions of the frame structure 312 between the two sprocket wheels 358 and 359. The endless chain 361 is connected at one point thereof to the carrier block 350 by suitable anchor means (not shown) so that the carrier block 350 is driven for movement between the sprocket wheels 358 and 359 when the air motor 355 is in operation driving the endless chain 361 to travel back and forth between the sprocket wheels 358 and 359.

As shown in FIG. 23, the carrier means 347 further comprises a fluid-operated power cylinder 362 having a cylinder body supported on the carrier block 350 by a bracket member 363 secured to the carrier block 350 and pivotally connected to the cylinder body by a pivot pin (not shown). The power cylinder 362 has a piston rod 364 directed downwardly and pivotally connected adjacent the lower end thereof to a hanger 365 which is rotatably attached to the carrier block 350 by a pin 366. The hanger 365 has a hook portion adapted to have the side body structure 2 of a vehicle body suspended therefrom as indicated by phantom lines in FIG. 23. The hanger 265 is thus adapted to be driven by the power cylinder 362 to turn about the pin 366 between an upwardly raised operative angular position to have a side body structure 2 suspended from the hook portion thereof as shown in FIG. 23 and a downwardly inclined inoperative angular position to allow the side body structure 2 to be disengaged from the hook portion thereof.

As shown in FIG. 23, the carrier means 347 further comprises bracket members 367 and 368 downwardly projecting from the lower face of the carrier block 350. The bracket members 367 and 368 have securely supported at their lower ends a supporting block 369 carrying a fluid-operated power cylinder 370 having a cylinder body pivotally connected to the supporting block 369 by a pivot pin 371. The supporting block 369 has further pivotally connected thereto a pressing member 372 by a pivot pin 373. The power cylinder 370 has a piston rod 374 pivotally connected at its leading end to the pressing member 372 by a pivot pin 375. The pressing member 372 has a guide surface shaped to fit a predetermined outer surface portion of a side body structure 2 of a vehicle body. The pressing member 372 is rockable about the pivot pin 373 between a predetermined first angular position inclined downwardly and outwardly in a lateral direction of the frame structure 312 and a predetermined second angular position horizontally extending inwardly in a lateral direction of the frame structure 312 as shown. When the pressing member 372 is held in the second angular position thereof with a body structure 2 of a vehicle body suspended from the hanger 365 as indicated by dots-and-dash lines in FIG. 23, the pressing member 372 has its guide surface 374 held in pressing contact with the predetermined outer surface portion of the side body structure 2 and thus maintains the side body structure in a predetermined position with respect to the frame structure 312.

Figure 25:
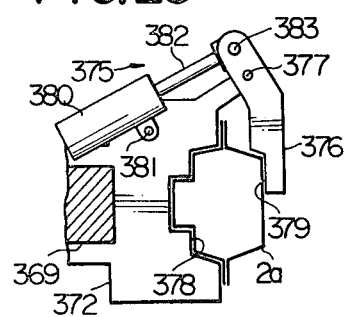
FIG. 25 is a cross sectional view taken on a plane indicated by line XXV—XXV in FIG. 24.

The hoist assembly 342 further comprises clamping means 375 adapted to forcibly retain the side body structure 2 in the above mentioned second predetermined position $b_2$ thereof. As illustrated in FIG. 25, the clamping means 375 comprises a clamping member 376 having an intermediate portion pivotally connected to the pressing member 372 by a pivot pin 377. The pressing member 372 has a recessed guide surface portion 378 and, likewise, the clamping member 376 has one end portion formed with a recessed guide surface portion 379. The recessed guide surface portions 378 and 379, respectively, are so shaped as to fit the external surfaces of a vertically extending portion $2a$ of a side body structure 2 of a vehicle body. The clamping means 375 further comprises a power cylinder 380 having a cylinder body pivotally connected to the pressing member 372 by a pivot pin 381. The power cylinder 380 has a piston rod 382 pivotally connected at its leading end to an other end portion of the clamping member 376 by a pivot pin 383. The clamping member 376 is rockable about the pivot pin 377 between an operative angular position operable for clamping the portion $2a$ of a side body structure 2 between the respective guide surface portions 378 and 379 of the pressing and clamping members 372 and 376 as shown and an inoperative angular position having the guide surface portion 379 thereof moved away from the guide surface portion 378 of the pressing member 372.

The side-body transfer means 422 constructed and arranged as hereinbefore described is adapted to convey a side body structure 2 of a vehicle body from the previously mentioned first predetermined position $b_1$ thereof to a second predetermined position $b_2$ outwardly displaced from the first predetermined position $b_1$ in a lateral direction of the frame structure 312 and further from the second predetermined position $b_2$ downwardly to a third predetermined position $b_3$ below the second predetermined position $b_2$ as indicated by dots-and-dash lines in FIG. 21.

As illustrated in FIGS. 21 and 22, the second embodiment of the apparatus according to the present invention further comprises side-body positioning means 384 for further moving a side body structure 2 from the third predetermined position $b_3$ to a fourth predetermined position $b_4$ ready to be assembled to the floor structure 1 conveyed into the previously mentioned second predetermined position thereof.

Figure 28:
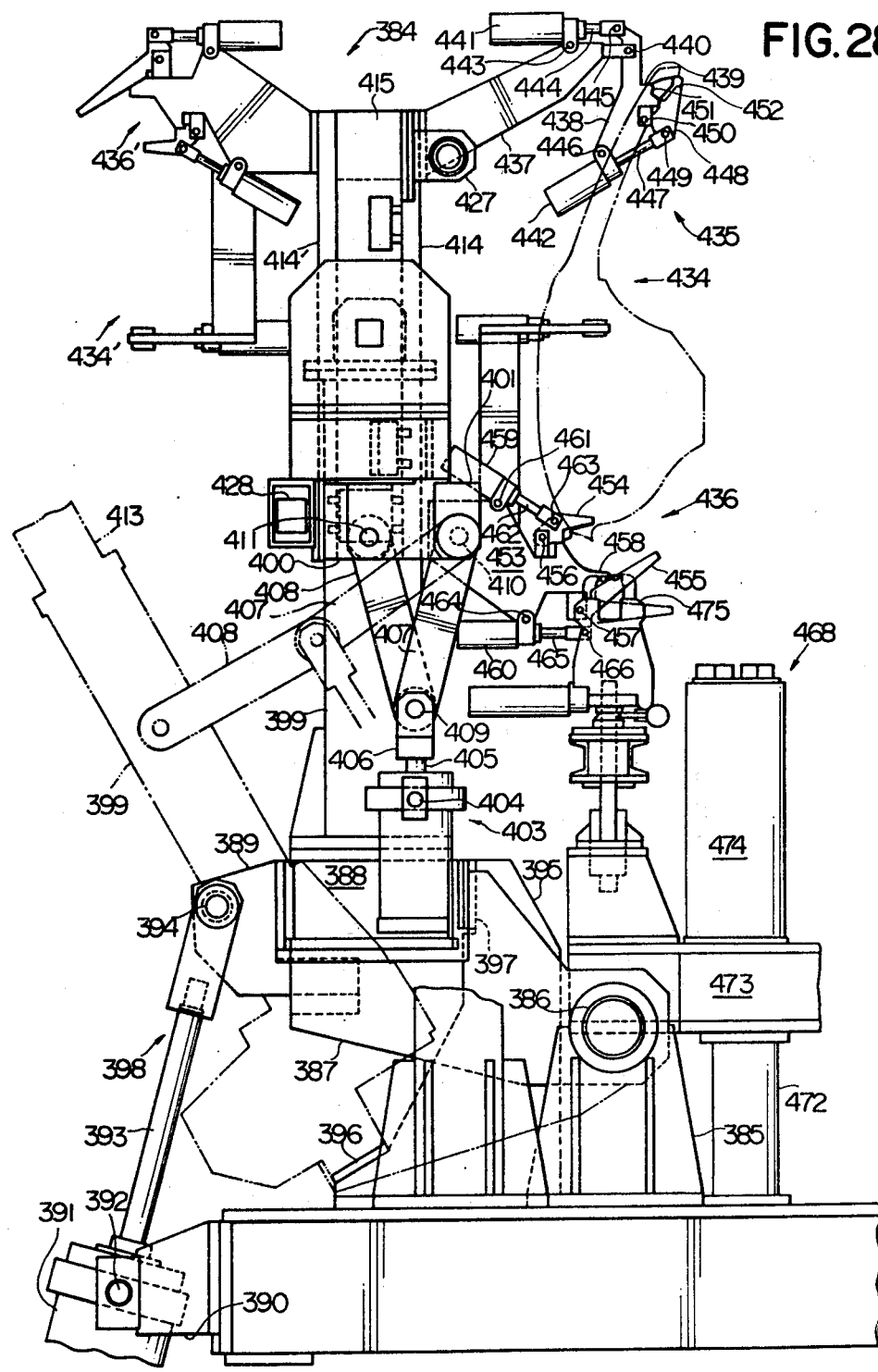
FIG. 28 is a front end view of the side-body positioning means illustrated in FIG. 26 and 27.

As will be better seen from FIGS. 26 to 28, the side-body positioning means 384 comprises two pairs of bearing blocks 385 and 385' upstanding from the stationary platform structure 311. One pair of bearing blocks 385 is located on a front portion of the platform structure 311 and has a shaft 386 rotatably supported thereon and the other pair of bearing blocks 385' is located on a rear portion of the platform structure 311 and likewise has a shaft 386' rotatably supported thereon. The shafts 386 and 386' have center axes aligned with each other in a longitudinal direction of the frame structure 312 and are rotatable about the respective center axes thereof with respect to the stationary platform structure 311. As will be best seen from FIG. 28, the shafts 386 and 386' have fixedly carried thereon rockable support arms 387 and 387', respectively, which are rockable with the shafts 386 and 386' about the center axes of the shafts 386 and 386', respsectively. The support arms 387 and 387' extend from the shafts 386 and 386' outwardly of the stationary platform structure 311 in lateral directions of the frame structure and have a common supporting base structure 388 fixedly mounted thereon. The supporting base structure 388 is elongated in a longitudinal direction of the frame structure 312 as will be best seen from FIG. 26 and has a pair of spaced parallel bracket members 389 projecting from a longitudinally intermediate portion of its outer side face. The stationary platform structure 311 has a pair of spaced parallel lug portions 390 projecting laterally outwardly from a longitudinally intermediate portion of its outer side face and has a fluid-operated balancing power cylinder 391 supported on the lug portions 390. The balancing power cylinder 391 has a cylinder body pivotally connected to the lug portions 390 by a pivot pin 392. The power cylinder 391 further has a piston rod 393 directed upwardly from the cylinder body and pivotally connected at its upper end to the above mentioned bracket members 389 on the supporting base member 388 by a pivot pin 394. As the piston rod 393 of the power cylinder 391 is axially moved upwardly and downwardly, the supporting base structure 388 is angularly movable with the support arms 387 and 387' about the aligned center axes of the shafts 386 and 386' between a downwardly inclined first angular position as indicated by dots-and-dash lines in FIG. 28 and a horizontal raised angular position indicated by full lines in FIG. 28. The supporting base structure 388 is prevented from being turned beyond these first and second angular positions thereof by suitable stop means which is shown comprising a pair of spaced parallel bracket members 395 secured to the upper face of the stationary platform structure 311. The bracket members 395 have secured thereto a first stop plate 396 located to have received thereon a lower end portion of the supporting base structure 388 in the first angular position thereof and a second stop plate 397 located to have received thereon an inner side wall portion of the supporting base structure 388 in the second angular position thereof as will be seen from FIG. 28. Thus, the supporting base structure 388 is held in the first angular position about the aligned center axes of the shafts 386 and 386' when the balancing power cylinder 391 is held in a condition having the piston rod 393 axially retracted downwardly and in the second angular position about the aligned center axes of the shafts 386 and 386' when the balancing power cylinder 391 is held in a condition having the piston rod 393 axially extended upwardly. The balancing power cylinder 391 is designed to be capable of bearing the downward forces resulting from the weights of the supporting base structure 388 and the members, units and structures supported on the base structure 388 when the base structure 388 is held in the first angular position thereof.

The supporting base structure 388 forms part of a rockable side-body support assembly 398 which further comprises a pair of upright support frames 399 and 399' upstanding from the supporting base structure 388 and positioned in the vicinity of the front and rear ends of the base structure 388 as will be best seen from FIG. 26. The support frames 399 and 399' have fixedly carried thereon abutment blocks 400 and 400' projecting forwardly and rearwardly from the support frames 399 and 399', respectively. The abutment blocks 400 and 400' are engageable with stop blocks 401 and 401' secured to and projecting rearwardly and forwardly from the front and rear inner columns 314 and 314', respectively, of the frame structure 312 as shown in FIG. 26. The front and rear inner columns 314 and 314' have further secured thereto bracket members 402 and 402' having carried thereon fluid-operated power cylinders 403 and 403', respectively. The power cylinder 403 on the bracket member 402 is located below a rear end portion of the stop block 401 and has a cylinder body pivotally connected to the bracket member 402 by a pivot pin 404. The power cylinder 403 further has a piston rod 405 securely connected at its leading end to a link connector 406 to which first and second link members 407 and 408 are pivotally connected each at one end thereof by a common pivot pin 409. The first link member 407 is pivotally connected at the other end thereof to the stop block 401 on the front inner column 314 by a pivot pin 410, while the second link member 408 is pivotally connected at the other end thereof to the abutment block 400 on the front support frame 399 by a pivot pin 411. Similarly to the above described power cylinder 403, the power cylinder 403' (FIG. 26) on the bracket member 402' has a cylinder body pivotally connected to the bracket member 402' by a pivot pin 404'. The power cylinder 403' further has a piston rod 405' securely connected at its leading end to a link connector 406' to which first and second link members 407' and 408' are pivotally connected each at one end thereof by means of a pivot pin 409'. The first link member 407' is pivotally connected at the other end thereof to the stop block 401' on the rear inner column 314' by a pivot pin 410', while the second link member 408' is pivotally connected at the other end thereof to the abutment block 400' on the rear support frame 399' by a pivot pin 411'. The pivot pins 404, 409, 410 and 411 forming part of the front link mechanism are axially aligned with the pivot pins 404', 409', 410' and 411', respectively, of the rear link mechanism. The first link members 407 and 407' are thus rockable about the pivot pins 410 and 410' on the stop blocks 401 and 401', respectively, between first angular positions inclined outwardly in lateral directions of the frame structure 312 as indicated by dots-and-dash lines in FIG. 28 and second angular positions extending downwardly from the pivot pins 410 and 411, respectively, as indicated by full lines in FIG. 28. On the other hand, the second link members 408 and 408' are rockable about the pivot pins 409 and 409' on the link connectors 406 and 406', respectively, between first angular positions approximately perpendicular to the piston rods 405 and 405' of the power cylinders 403 and 403', respectively, as indicated by dots-and-dash lines in FIG. 28 and second angular positions extending generally upwardly from the link connectors 406 and 406', respectively, as indicated by full lines in FIG. 28. The rockable supporting base structure 388 assumes the previously mentioned first angular position thereof with respect to the stationary platform structure 311 with a lower end portion of the supporting base structure 388 received on the first stop plate 396 on the bracket members 395 and 395' when the link members 407, 407', 408 and 408' are held in their respective first angular positions. When the link members 407, 407', 408 and 408' are held in their respective second angular positions, the rockable supporting base structure 388 assumes the previously mentioned second angular position thereof with respect to the stationary platform structure 311 with an inner side wall portion of the supporting base structure 388 received on the second stop plate 397 on the bracket members 396 and 395'. When the link members 407, 407', 408 and 408' are held in their respective second angular positions thereof, the abutment blocks 400 and 400' on the front and rear support frames 399 and 399', respectively, are received on the outer side faces of the stop blocks 401 and 401' on the front and rear inner columns 314 and 314', respectively, of the frame structure 312. When the supporting base structure 388 is held in the second angular position thereof as indicated by the full lines in FIG. 28, the base structure 388 is contrained to stay in the particular position not only by the second stop plate 397 but by the stop blocks 401 and 401'. When the supporting base structure 388 is thus held in the second angular position thereof, the support frames 399 and 399' are upright on the upper face of the base structure 388.

The support frames 399 and 399' have further supported thereof bearing units 412 and 412', respectively, which are axially aligned with each other in a longitudinal direction of the frame structure 312. A generally box-shaped rotary jig carrier structure 413 is composed of a pair of support plates 414 and 414' (FIG. 28) spaced apart in parallel from each other, a pair of side wall portions 415 and 415' (FIG. 26) each connecting the support plates 414 and 414' together along each side end of the carrier structure 413, and a pair of parallel end wall portions 416 and 416' (FIG. 26) each connecting the support plates 414 and 414' together along each longitudinal end of the carrier structure 413. The jig carrier structure 413 further has a pair of trunnions 417 and 417', perpendicularly projecting outwardly from the end wall portions 416 and 416', respectively, of the carrier structure 413 and having respective center axes aligned with each other. The trunnions 417 and 417' are journaled in the bearing units 400 and 400', respectively, so that the jig carrier structure 413 as a whole is rotatable with respect to the side-body support assembly 398 about an axis passing through the respective center axes of the trunnions 417 and 417'. The trunnions 417 and 417' are secured each at one end thereof to the front and rear end wall portions 416 and 416' of the jig carrier structure 413 by couplings 418 and 418' fixedly attached to the end wall portions 416 and 416', respectively, as shown in FIG. 26.

The rear support frame 399' has secured thereto a bracket member 419 supporting thereon an air motor 420 having an output shaft 421 connected to the rear trunnion 417' by a coupling 422.

The jig carrier structure 413 is rotatable about the axis of rotation thereof between a first upright position having one of the support plate 414 and 414' such as the support plate 414 facing laterally inwardly of the frame structure 312 as shown in FIG. 28 and a second upright position having the other of the support plates such as the support plate 414' facing laterally inwardly of the frame structure.

The front support frame 399 has secured thereto a bracket member 423 having supported thereon a rotatry-type two-shift electrlc connector unit 424. Though not shown in the drawings, the front trunnion 417 is formed with an axial bore through which the cables and wires for the various electrically operated units on each of the support plates 414 and 414' of the jig carrier structure 413 and the pipings to supply working fluids to the air motor 420 and other fluid-operated units on each of the support plates 414 and 414' are passed. The cables and wires are connected on one hand to the electrically operated units through the internal space of the jig carrier structure 413 and on the other hand to lead-in terminal elements in the connector unit 424. The lean-in terminal elements in the connector unit 424 are carried on a support member rotatable with the trunnion 417 and are electrically connected selectively to one of two sets of lead-out terminal elements also incorporated in the connector unit 424. Furthermore, the pipings extending through the front trunnion 417 communicate on one hand with the fluid-operated units on the jig carrier structure 413 through the internal space of the carrier structure 413 and on the other hand with a rotary valve unit 425 mounted on the trunnion 417 adapted to supply working fluids selectively to the fluid-operated units on the support plate 414 or the fluid-operated units on the support plate 414' depending upon the angular position of the jig carrier structure 413 about the aligned center axes of the trunnions 417 and 417'.

The second embodiment of the apparatus according to the present invention further comprises locking means operative to lock the jig carrier structure 413 in each of the above mentioned first and second upright positions thereof when the jig carrier structure 413 is turned into each of the positions. In FIGS. 26 and 27, such locking means is shown comprising first and second front locking sleeves 426 and 427 secured to the front end wall portion 416 of the jig carrier structure 413 and located respectively adjacent the opposite ends of the wall portion 416, and first and second rear locking sleeves 426' and 427' secured to the rear end wall portion 416' of the jig carrier structure 413 and located respectively adjacent the opposite ends of the end wall portion 416'. Each of the locking sleeves 426, 426', 427 and 427' is formed with an axial bore elongated in a direction parallel with the axis of rotation of the jig carrier structure 413. The locking means further comprises fluid-operated power cylinders 428 and 428' mounted on bracket members 429 and 429', respectively. The power cylinder 428 has a cylinder body secured to the bracket member 429 and a piston rod 430 connected at its leading end to a guide block 431. The guide block 431 is slidably engaged by guide plates 432 secured to the bracket member 429 and has a locking pin 433 axially projecting from the guide block 431 for engagement with the locking sleeve 426 or 427 on the jig carrier structure 413. Likewise, the power cylinder 428' has a cylinder body secured to the bracket member 429' and a piston rod 430' connected at its leading end to a guide block 431' slidably engaged by guide plates 432' on the bracket member 429' and having a locking pin 433' axially projecting from the guide block 431' for engagement with the locking sleeve 426' or 427' on the jig carrier structure 413. When the jig carrier structue 413 is held in the first or second upright position thereof about the axis of rotation thereof, the first front and rear locking sleeves 426 and 426' or the second front and rear locking sleeves 427 and 427' are located at the lower end of the jig carrier structure 413 and are engageable with the locking pins 433 and 433', respectively. When, thus, the power cylinders 428 and 428' are held in conditions having their respective piston rods 430 and 430' axially extended with the jig carrier structure 413 turned into the first or second upright position thereof, the locking pins 423 and 433' project into the axial bores in the first front and rear locking sleeves 427 and 427', respectively, so that the jig carrier structure 413 is locked in the first or second upright position thereof. When the power cylinders 428 and 428' are maintained in conditions having their respective piston rods 430 and 430' axially extended, the locking pins 433 and 433' are spaced apart from the jig carrier structure 413, which is accordingly free to turn about the axis of rotation thereof with respect to the supporting base structure 388.

As illustrated in FIG. 28, the jig carrier structure 413 has carried thereof a first set of jigs or fixtures 434 mounted on one support plate 414 and a second set of jigs or fixtures 434' mounted on the other support plate 414' thereof. The first set of fixtures 434 comprises first and second fixture assemblies 435 and 436 adapted to grip upper and lower portions, respectively, of a side body structure 2 of a vehicle body for an automotive vehicle of the previously mentioned model "A", while the second set of fixtures 434' on the support plate 414' comprises first and second fixture assemblies (only the second fixture assembly of which is shown at 436' in FIG. 28) adapted to grip upper and lower portions, respectively, of a side body structure 2 of a vehicle body for an automotive vehicle of the model "B". The first and second fixture assemblies 435 and 436 are arranged symmetrically to the first and second fixture assemblies, respectively, with respect to the axis of rotation of the jig carrier structure 413.

The first fixture assembly 435 comprises a bracket member 437 projecting from the support plate 414. The bracket member 437 has supported thereon a clamping base member 438 having two arm portions directed generally opposite to each other and a lug portion 439 protruding from between the two arm portions. The clamping base member 438 has one of its arm portions pivotally connected to an extension of the bracket member 437 by a pivot pin 440. The first fixture assembly 435 further comprises first and second fluid-operated power cylinders 441 and 442. The first power cylinder 441 has a cylinder body pivotally connected to a leading end portion of the bracket member 437 by a pivot pin 443 and a piston rod 444 pivotally connected at its leading end to the above mentioned one of the two arm portions of the clamping base member 438 by a pivot pin 445. On the other hand, the second power cylinder 442 has a cylinder body pivotally connected to the other arm portion of the clamping base member 438 by a pivot pin 446 and a piston rod 447 pivotally connected to one end portion of a clamping hook member 448 by a pivot pin 449. The clamping hook member 448 in turn is pivotally connected to the lug portion 439 of the clamping base member 438 by means of a pivot pin 450.

The clamping base member 438 is rockable with respect to the bracket member 437 about the pivot pin 440 between a first angular position inclined toward the support plate 414 of the jig carrier structure 413 and a second angular position inclined away from the support plate 414. On the other hand, the clamping hook member 448 is rockable with respect to the clamping base member 438 about the pivot pin 450 between first angular position inclined away from the lug portion 439 of the clamping base member 438 and a second angular position inclined toward the lug portion 439 of the base member 438.

The clamping base member 438 has on its lug portion 439 a guide surface 451 facing a free end portion of the clamping hook member 448 which has a hook portion 452 constituted by the free end portion thereof. When the clamping hook member 448 is held in the second angular position thereof with respect to the clamping base member 438, the hook portion 452 of the clamping hook member 448 is located adjacent the guide surface 451 of the clamping base member 438 and is operative to have an upper end portion of a side body structure 2 gripped between the guide surface 451 and the hook portion 452. Thus, the guide surface 451 of the clamping hook member 448 are shaped to conform to the cross sectional contour of the particular end portion of a side body structure 2 of an automotive vehicle of the model "A".

On the other hand, the second fixture assembly 437 comprises a bracket member 453 projecting from the support plate 414. The bracket member 453 has supported thereon a first clamping member 454 and a second clamping member 455. The first clamping member 454 has one end portion pivotally connected to an extension of the bracket member 453 by a pivot pin 456. The second clamping member 455 has one end pivotally connected to he bracket member 453 by a pivot pin 457. The clamping members 454 and 455 are thus rockable with respect to the bracket memaber 453 about the pivot pins 456 and 457, respectively, and are angularly movable toward and away from a surface portion 458 of the bracket member 453, the surface portion 458 constituting a guide surface of the bracket member 453. Each of the clamping member 454 and 456 is thus rockable between a first angular position angularly spaced apart from the guide surface 458 and a second angular position closer to the guide surface 458. Each of the clamping members 454 and 455 and the guide surface 458 of the bracket member 453 are shaped to conform to the cross sectional contour of a lower end portion of a side body structure 2 for an automotive vehicle of the model "A". When both of the clamping members 454 and 455 are held in the respective second angular positions thereof with respect to the bracket member 453, the clamping members 454 and 456 are operative to have the particular end portion of the side body structure 2 gripped therebetweeen and closely forced against the guide surface 458 of the bracket member 453.

The second fixture assembly 456 further comprises first and second power cylinders 459 and 460. The first fluid operated power cylinder 459 has a cylinder body pivotallly mounted on the bracket member 453 by a pivot pin 461 and a piston rod 462 pivotally connected at its leading end to the first clamping member 454 by a pivot pin 463. Likewise, the second power cylinder 460 has a cylinder body pivotally mounted on the bracket member 453 by a pivot pin 464 and a piston rod 465 pivotally connected at its leading end to the second clamping member 455 by means of a pivot pin 466.

The first and second fixture assemblies constituting the second set of fixtures 434' on the other support plate 414 of the jig carrier structure 413 are constructed and arranged similarly to the above described first and second fixture assemblies 435 and 436, respectivley, and are adapted to manipulate a side body structure 2 of a vehicle body for an automotive vehicle of the model "B".

The apparatus embodying the present invention as shown in FIGS. 20 to 28 further comprises fastening means by which the side body structure 2 conveyed into the fourth predetermined position $b_4$ thereof by the hereinbefore described side-body positioning means 384 is to be fastened to the floor structure 1 held in the previously mentioned second predetermined position thereof within the frame structure 312 (FIGS. 20 and 21). In the second embodiment of the present invention, such fastening means is constituted by upper welding means 467 (FIGS. 21, 23 and 26) adapted to weld the side body structure to upper portions of the floor structure 1 and lower welding means 468 (FIGS. 21, 26, 27 and 28) adapted to weld the side body structure 2 to lower portions of the floor structure 1.

As will be seen from FIGS. 21 and 32, the upper welding means 467 comprises a support beam 469 spanning between the front and rear inner columns in parallel with the lower side beam 315. A plurality of welding units 470 each having welding heads 471 are mounted on the support beam 469. On the other hand, the lower welding means 468 comprises a plurality of upright columns 472 upstanding from the stationary platform structure 311 as will be best seen from FIG. 26. The columns 472 have securely supported thereon a horizontal support structure 473 extending in a longitudinal direction of the frame structure 312. A plurality of welding units 474 each having welding heads 475 as shown in FIG. 28 are mounted on the support structure 473. The upper and lower welding means 467 and 468 arranged as above described are provided in one side-body assembling stage 310 (FIG. 20). Welding means similar to the welding means 467 and 468 are thus also provided in the other side-body assembling stage 310', though not shown in the drawings.

As in the first embodiment of the apparatus according to the present invention as previously described with reference to FIGS. 1 to 19 of the drawings, the second embodiment of the apparatus according to the present invention has provided therein means to convey a rear upper panel, cowl assembly and rear waist panel structure for forming a vehicle body into predetermined positions ready to be assembled to a floor structure 1. Such means are, however, constructed and arranged similarly to their respective counterparts in the embodiment of FIGS. 1 to 19 and, thus, will not be described herein.

Description will be hereinafter made regarding operation of the apparatus constructed and arranged as described hereinbefore.

During each cycle of operation of the apparatus, a floor structure 1 for an automotive vehicle of the model "A" or "B" is conveyed on the shuttle bar 309 driven to advance in a direction indicated by a' in FIG. 20. In the description to follow, the vehicle to be manufactured with this floor structure 1 will be assumed, by way of example, as being of the model "A".

At an incipient stage of each cycle of operation of the apparatus, the power cylinders 403 (FIG. 28) supported on the front and rear inner columns 314 and 314' are maintained in the conditions having their respective piston rods 405 and 405' axially extended. The link members 407 and 408 connected to the piston rod 405 and the link member 407' and 408' connected to the piston rod 405' are accordingly held in their respective first angular positions as previously described so that the rockable supporting base structure 388 is held in the downwadly inclined first angular position about the aligned center axes of the shafts 386 and 386' with the lower end wall portion of the base structure 388 received on the first stop plate 396 on the bracket members 395 as indicated by the dots-and-dash lines in FIG. 28. Thus, the jig carrier structure 413 held in an upright position with respect to the supporting base structure 388 assumes a position downwardly and outwardly inclined about the aligned center axes of the shafts 386 and 386' with respect to the stationary platform structure 311. Under these conditions, the weights of the supporting base structure 388 and all the members and structures carried on the supporting base structure 388 are mostly borne by the balacing power cylinder 391 having the piston rod 393 retracted.

While the floor structure 1 is being conveyed on the shuttle bar 309 advancing forwardly, the side body structures 2 and 2' to be assembled to the floor structure 1 are conveyed by the hanger assembly 324 into the previously mentioned first predetermined positions $b_1$ between the two side-body assembling stages 310 and 310' (FIG. 20) as will be seen from FIG. 21. The side body structure 2 and 2' thus held in the positions $B_2$ are suspended from the hook members 326 and 326' of the hanger arms 325 and 325', respectively, of the hanger assembly 324 which is located above the shuttle bar 309. The side body structures 2 and 2' being moved into the first predetermined positions $b_1$ thereof, the air motor 355 of the hoist assembly 342 is initiated into motion driving the endless chain 361 to travel between the sprocket wheels 358 and 359. This causes the carrier block 350 to move along the guide rails 349 and 349' toward the side body structure 2. When the carrier block 350 reaches a predetermined position close to the side body structure 2, the air motor 355 is brought to a stop and the power cylinder 362 is actuated to drive the piston rod 364 to axially protrude downwardly, causing the hanger 365 to turn about the pivot pin 366 from the downwardly inclined inoperative angular position to the upwardly raised operative angular position thereof as shown in FIG. 23. While the hanger 365 is being turned toward the upwardly raised operative angular position thereof, the hanger 365 has its hook portion brought into engagement with an upper end portion of the side body structure 2 suspended from the hanger assembly 324 and raises the side body structure 2 from the hook member 326. The side body structure 2 is thus disengaged from the hook member 326 and is transferred to the hanger 365 by the time when the hanger 365 reaches the raised operative angular position thereof. After the side body structure 2 is thus transferred to the hanger 365, the power cylinder 370 is actuated to cause its piston rod 374 to protrude. This causes the pressing member 372 to turn about the pivot pin 373 from the downwardly inclined first angular position to the horizontally extending second angular position and has its guide surface brought into pressing contact with a predetermined outer surface portion of the side body structure 2. The side body structure 2 is as a consequence caused to slightly incline about an upper end portion thereof toward the hanger assembly 324. After the side body structure 2 is received on the guide surface of the pressing member 372, the power cylinder 380 (FIG. 25) on the pressing member 372 is actuated to cause its piston rod 382 to protrude so as to cause the clamping member 376 to turn from the second angular position to the second angular position thereof about the pivot pin 377. Consequently, the side body structure 2 received on the pressing member 372 as shown in FIG. 23 has its vertically extending portion 2a clamped between the recessed guide surface portion 378 of the pressing member 372 and the guide surface portion 379 of the clamping member 376 as shown in FIG. 25. The air motor 355 is then actuated to drive the carrier block 350 to travel along the guide rails 349 and 349' toward the initial position close to the sprocket wheel 358. When the carrier block 350 reaches the initial position thereof, the air motor 355 is brought to a stop so that the carrier block 350 is held in the particular position with the side body structure 2 suspended from the hook portion of the hanger 365 and received on the guide surface of the pressing member 372, the side body structure 2 being thus held in the second predetermined position $b_2$ thereof as shown in FIGS. 21 and 22. Thereupon, the air motor 336 (FIG. 24) is actuated to drive its output shaft 337 for rotation in one direction about the center axis thereof. The rotation of the output shaft 337 is transmitted through the couping 338 and the shaft 333 to the sprocket wheels 334 and 334' and drives the endless chains 341 and 341' to travel vertically along the guide posts 330 and 330', respectively. As the endless chains 341 and 341' are thus driven to travel between the sprocket wheels 334 and 340 and between the sprocket wheels 334'and 340', the hoist assemlby 342 is caused to move downwardly along the guide posts 330 and 330' with the side body structure 2 suspended from the hanger 365, until the carrier block 350 reaches a predetermined lowermost position with respect to the frame structure 312. When the carrier block 350 is thus moved into the predetermined lowermost position, the air motor 336 is brought to a stop so that the carrier block 350 is held in the particular position. The side body structure 2 suspended from the hanger 365 and received on the guide surface of the pressing member 372 is held in the third predetermined position $b_1$ (FIG. 21) thereof and is located adjacent the first and second fixture assemblies 435 and 436 on the support plate 414 of the jig carrier structure 413 held in the first upright position thereof with respect to the downwardly inclined supporting base structure 388. By the time when the carrier block 350 reaches the lowermost position thereof, the shuttle bar 309 reaches a predetermined foremost position thereof with respect to the frame structure 312 and has the floor structure 1 held in the second predetermined position thereof with respect to the rockable side-body support assembly 398 (FIG. 26) by the aid of suitable floor-structure positioning means similar to the means 173 (FIGS. 12) in the first embodiment of the present invention. The shuttle bar 309 is thereupon driven to move backwardly to a predetermined rearmost position thereof with respect to the frame structure 312 for receiving thereon a floor structure 1' (FIG. 20) for use in the subsequent cycle of operation.

When the carrier block 350 of the hoist assembly 342 (FIGS. 23 and 24) is moved into the lowermost position thereof and the side body structure 2 is conveyed into the third predetermined position $b_3$ thereof as above discussed, the power cylinders 441 and 442 of the first fixture assembly 435 (FIG. 28) are actuated so that the piston rod 454 of the power cylinder 441 is driven to be retracted and the piston rod 447 of the second power cylinder 442 is driven to axially protrude. The clamping base member 438 which has been held in the first angular position about the pivot pin 440 is therefore caused to turn toward the second angular position thereof with respect to the bracket member 437 and, concurrently, the clamping hook member 458 which has also been held in the first angular position about the pivot pin 458 is caused to turn toward the second angular position thereof with respect to the clamping base member 438. The guide surface 451 of the lug portion 439 being thus turn is brought into sliding contact with the outer sruface of an upper end portion of the side body structure 2. On the other hand, the hook portion 452 of the clamping hook member 458 being turned toward the second angular position thereof is brought into retaining engagement with the upper end portion of the side body structure 2. The upper end portion of the side body structure 2 is in these manners firmly gripped between the guide surface 451 of the clamping base member 438 and the hook portion 452 of the clamping hook member 458 when the clamping base member 438 and the clamping hook member 448 are turned into their respective second angular positions thereof.

Simultaneously as the power cylinders 441 and 442 of the first fixture assembly 435 are actuated as described above, the power cylinders 459 and 460 of the second fixture assembly 436 are actuated so that each of the piston rods 462 and 465 thereof is driven to protrude. Each of the clamping members 454 and 455 which have been held in their respective first angular positions spaced apart from the guide surface 458 of the bracket member 453 is therefore turned toward the second angular position thereof about each of the pivot pins 456 and 457. As the clamping members 454 and 455 are thus turned toward their respective second angular positions thereof with respect to the bracket member 453, the clamping members 454 and 455 are brought into pressing engagement with a lower end portion of the side body structure 2. The lower end portion of the side body structure 2 is in these manners held against the guide surface 458 of the bracket member 453 and is firmly gripped between the first and second clamping members 454 and 455.

When the side body structure 2 held in the third predetermined position $b_3$ thereof is thus retained by the first and second fixture assemblies 435 and 436, the power cylinder 362 of the hoist assembly 342 (FIG. 23) is operated to cause its piston rod 364 to be retracted upwardly, causing the hanger 365 to turn from the raised operative angular position back to the downwardly inclined inoperative angular position thereof. The hanger 365 is in this manner disengaged from the upper end portion of the side body structure 2. On the other hand, the power cylinder 380 (FIG. 25) on the pressing member 372 is operated to cause its piston rod 382 to be retracted to cause the clamping member 376 to turn from the second angular position back to the first angular position thereof about the pivot pin 377. The guide surface portion 379 of the clamping member 376 is thus moved away from the portion 2a of the side body structure 2 and permits the side body structure 2 to be disengaged from the clamping member 376. The power cylinder 370 (FIG. 23) connected to the pressing member 372 is then operated to cause its piston rod 374 to be retracted so as to cause the pressing member 372 to turn about the pivot pin 373 from the second angular position back to the first angular position thereof, thereby permitting the side body structure 2 to be disengaged from the pressing member 372. The side body structure 2 is now retained in the third predetermined position b3 thereof solely by the first and second fixture assemblies 435 and 436 (FIG. 28).

The air motor 336 on the support beam 329 (FIG. 24) is then actuated to drive the hoist assembly 342 to move upwardly from the lowermost position thereof by means of the endless chains 341 and 341'. When the hoist assembly 342 reaches the initial uppermost position thereof, the air motor 326 is brought to a stop so that the hoist assembly 342 is held in the uppermost position thereof with respect to the frame structure 312.

After the hoist assembly 342 is thus withdrawn from the lowermost position thereof, the power cylinders 403 and 403' (FIGS. 26 to 28) on the front and rear inner columns 314 and 314', respectively, are actuated to cause their respective piston rods 405 and 405' to be retracted. This causes the link members 407 and 407' to turn from their respective first angular positions to their respective second angular positions about the pivot pins 410 and 410', respectively, and the link members 408 and 408' to turn from their respective first angular positions to their respective second angular positions about the pivot pins 411 and 411', respectively. The link members 407 and 407', 408 and 408' being thus moved into the positions indicated by the full lines in FIG. 28 in respect of the link members 407 and 408, the rockable supporting base structure 388 is turned from the downwardly inclined first angular position to the horizontal second angular position thereof about the aligned center axes of the shafts 386 and 386'. As a consequence, the jig carrier structure 413 on the supporting base structure 388 is allowed to assume an upright position with respect not only to the supporting base structure 388 but also to the stationary platform structure 311 as indicated by full lines in FIG. 28. The supporting base structure 388 being turned into the horizontal second angular position thereof, the abutment blocks 400 and 400' on the support frames 399 and 399' are brought into abutting engagement with the stop blocks 401 and 401' and, at the same time, the lower end wall portion of the supporting base structure 388 is brought into abutting engagement with the second stop plate 397 on the bracket members 397 (FIGS. 26 and 28). The supporting base structure 388 is thus correctly and stably held in the horizontal second angular position thereof by the four members which consist of the two stop plates 396 and 397 and the two stop blocks 401 and 401'. The jig carrier structure 413 being held in the first upright position with respect to the stationary platform structure 311, the side body structure 2 supported by the fixture assemblies 435 and 436 on the support plate 414 is held in the fourth predetermined position b4 thereof and is ready to be assembled to the floor structure 1 which has been moved into the second predetermined position thereof.

While the side body structure 2 and the side body structure 2' (FIGS. 21 and 23) as well is being stepwise conveyed from the first to second, third and fourth predetermined positions, b1, b2, b3 and b4 by the side-body transfer and positioning means 322 and 384, the rear upper panel, cowl assembly and rear waist panel structure (not shown) to be assembled to the floor structure 1 and the side body structures 2 and 2' are conveyed into predetermined positions ready to be welded to the floor and side body structures as in the embodiment described with reference to FIGS. 1 to 19. When the side body structure 2 and 2', rear upper panel, cowl assembly and rear waist panel structures are thus held in the respective positions ready to be welded to the floor structure 1, the welding units such as the welding units 470 and 474 of the upper and lower welding means 467 and 468, respectively, are put into operation so as to spot weld upper and lower end portions of the side body structure 2 to the floor structure 1.

Upon completion of the welding process, the power cylinders 441 and 442 of the fixture assembly 435 and the power cylinders 459 and 460 of the fixture assembly 436 on the jig carrier structure 413 (FIG. 28) are operated to cause the piston rod 444 of the power cylinder 441 to protrude and the respective piston rods 447, 462 and 465 of the power cylinders 442, 459 and 460 to be retracted. The piston rods 444 and 447 of the power cylinders 441 and 442 being thus extended and retracted, respectively, the clamping base member 438 is caused to turn from the second angular position back to the first angular position thereof and, likewise, the clamping hook member 448 is caused to turn from the second angular position back to the first angular position thereof. With the piston rods 462 and 465 of the power cylinders 459 and 460 retracted, furthermore, the first and second clamping members 454 and 455 are caused to turn from their respective second angular positions back to their respective first angular positions. The side body structure 2 which has been assembled to the floor structure 1 is consequently released from the fixture assemblies 435 and 436 on the jig carrier structure 413.

While the side body structure 2 is being thus disengaged from the fixture assemblies 435 and 436, the rear upper paned, cowl assembly and rear waist panel structure (not shown) are released from the transfer means which have retained these works in the positions to be welded to the floor structure 1. The vehicle body assembly now composed of the floor structure, side body structures, rear upper panel, cowl assembly and rear waist panel structure is then placed on the shuttle bar 309 (FIG. 22). The shuttle bar 309 is thereupon driven to advance forwardly in the direction of the arrow a' in FIG. 20 so that the vehicle body assembly is moved from the position between the side-body assembling stages 310 and 310' to a predetermined position S' so as to be transferred to a subsequent stage of the assembly line.

While the shuttle bar 309 is being driven to advance with the vehicle body assembly carried thereon, the power cylinders 404 and 403' (FIGS. 26 to 28) on the front and rear inner columns 314 and 314' are operated to cause their respective piston rods 405 and 405' to protrude. The link members 407 and 408 connected to the piston rod 405 and the link members 407' and 408' connected to the piston rod 405' are accordingly turned from their respective second angular positions back to their respective first angular positions so that the rackable supporting base structure 388 is turned from the horizontal second angular position block to the downwardly inclined first angular position thereof about the aligned center axes of the shafts 386 and 386' and has its the lower end wall portion received on the first stop plate 396 on the bracket members 395 as indicated by the dots-and-dash lines in FIG. 28. Thus, the jig carrier structure 413 held in the upright position with respect to the supporting base structure 388 resumes the position downwardly and outwardly inclined about the aligned center axes of the shafts 386 and 386' with respect to the stationary platform structure 311.

The apparatus hereinbefore described with reference to FIGS. 20 to 28 is now ready to assemble another body structure for an automotive vehicle of the model "A". If, in this instance, a body structure for an automotive vehicle of the model "B" is to be assembled in the subsequent cycle of operation, the side-body positioning means 384 is re-conditioned in the following manners.

In the first place, the power cylinders 428 and 428' (FIGS. 26 and 27) on the front and rear support frames 399 and 399', respectively, are operated to cause their respective piston rods 430 and 430' to be retracted. This causes the locking pins 433 and 433' to be withdrawn from the axial bores in the first front and rear locking sleeves 426 and 426', respectively, on the jig carrier structure 413 and makes the jig carrier structure 413 rotatable about the aligned center axes of the trunnions 417 and 417' with respect to the supporting base structure 388 held in the downwardly inclined first angular position thereof. The air motor 420 (FIG. 26) the rear support frame 399' is then actuated to drive the jig carrier structure 413 to make a half turn from the first upright position to the second upright position thereof with respect to the supporting base structure 388. When the jig carrier structure 413 is turned into the second upright position thereof, the jig carrier structure 413 has the support plate 414' on the inner side thereof and has the second front and rear locking sleeves 427 and 427' located in alignment with the locking pins 433 and 433', respectively. The power cylinders 428 and 428' are then operated to cause their respective piston rods 430 and 430' to protrude, thereby casing the locking pins 433 and 433' to move into the axial bores in the locking sleeves 427 and 427', respectively. The locking pins 433 and 433' being thus fitted into the locking sleeves 427 and 427', the jig carrier structure 413 is locked in the second upright position thereof with respect to the supporting base structure 388. When the supporting base structure 388 is turned from the downwardly inclined first angular position to the horizontal first angular position thereof about the aligned center axes of the shafts 386 and 386' during the subsequent cycle of operation, the first and second fixture assemblies forming part of the set of fixtures 434' on the support plate 414' are operable for manipulating a side body structure of a vehicle body for an automotive vehicle of the model "B".

When the jig carrier structure 413 is driven to make a half turn between the first and second upright positions with respect to the supporting base structure 388, the rotatable support member forming part of the rotary-type two-shift electric connector unit 424 supported by the support frame 399 (FIGS. 26 and 27) is caused to make a half turn together with the jig carrier structure 413. The set of lead-in terminal elements carried on the rotatable support member in the connector unit 424 is disconnected from one set of lead-out terminal elements and connected to the other set of lead-out terminal elements in the connector unit 424. The electrically operated units carried on the support plate 414 of the jig carrier structure 413 are thus disconnected from a power source and, instead thereof, the electrically operated units on the support plate 414' of the jig carrier structure 413 are connected to the power source through the wires and cables extending in the trunnion 417. Likewise, the rotary valve unit 425 is caused to shift from the condition providing communication from sources of wording fluids to the fluid-operated units on the support plate 414 to the condition providing communication from the fluid sources to the fluid-operated units on the other support plate 414' throught the pipings extending in the trunnion 417.

While it has been described that the second fixture assemblies on the support plates 414 and 414' of the jig carrier structure 413 are adapted to manipulate side body structures for automotive vehicles of different models, such fixtures may be modified to suit for the manipulation of side body structures for automotive vehicles of two different types such as the sedan and hardtop types.

While, furthermore, the jig carrier structure 102 or 413 in each of the embodiments hereinbefore described is arranged to assume an upright or slightly inclined position with respect to the stationary platform structure 79 or 311 when the jig carrier structure receives a side body structure from the hoist assembly 38 or 342., arrangements may be made so that the jig carrier structure is held in a horizontal position to receive a side body structure from the hoist assembly.

On the other hand, the jig carrier structure 102 or 413 in each of the embodiments described has two parallel surfaces each carrying the fixture assemblies thereon but may be substituted by a jig carrier structure having three or more surfaces each carrying fixture assemblies thereon.

What is claimed is:

1. A multi-shaft vehicle-body assembling apparatus for assembling a pair of side body structures to a floor structure to form part of a body structure of an automotive vehicle, comprising:
a frame structure,
means for conveying the floor structure to a predetermined position within the frame structure,
side-body transfer means for conveying a pair of side body structures to predetermined temporary positions within the frame structure,
side-body positioning means operative to receive from said side-body transfer means the side body structures conveyed into said predetermined temporary positions thereof and to thereafter move the side body structures to predetermined final positions ready to be assembled to the floor structure in said predetermined position thereof, the side-body positioning means comprising a pair of base structures which are movable toward and away from each other on both sides of the predetermined position of the floor structure and a pair of carrier structures respectively supported on said base structures and each having parallel opposite outer surfaces, the carrier structure being rotatable between diametrically opposite two upright positions with respect to said base structure about an axis which is fixed with respect to said base structure,
fastening means operative to fasten the side body structures in said predetermined final positions thereof to the floor structure in the predetermined position thereof,
wherein said side-body positioning means further comprises first and second fixtures carried on each of said outer surfaces of said carrier structure and operable for receiving from said side-body transfer means the side body structure conveyed to said predetermined temporary position, each of the first and second fixtures comprising first and second fixture assemblies which are rotatable between diametrically opposite two angular positions with respect to said carrier structure about a common axis substantially parallel with the axis of rotation of the carrier structure so that said first and second fixture assemblies are capable of gripping portions of the side body structures of automotive vehicles of two different models.

2. A multi-shift vehicle-body assembling apparatus as set forth in claim 23, in which said first and second fixtures carried on one of said outer surfaces of said carrier structure are arranged symmetrically to first and second fixtures carried on the other outer surface of said carrier structure with respect to the axis of rotation of said carrier structure.

3. A multi-shift vehicle-body assembling apparatus as set forth in claim 2, in which each of said first and second fixtures further comprises a bracket member secured to and projecting from said outer surface of said carrier structure, and a shifting arm having a middle portion pivotally mounted on a leading end portion of the bracket member, the shifting arm having supported thereon said first and second fixture assemblies which are arranged symmetrically to each other with respect to said common axis.

4. A multi-shift vehicle-body assembling apparatus as set forth in claim 3, in which each of said first and second fixture assemblies comprises a clamping base member and a clamping hook member which are pivotally mounted on said shift arm, and means for pivoting said clamping base and hook members to grip said portions of said side body structure.

* * * * *